US011314225B2

(12) United States Patent
Khoo et al.

(10) Patent No.: US 11,314,225 B2
(45) Date of Patent: Apr. 26, 2022

(54) SYSTEMS AND METHODS FOR EVALUATING ASSESSMENTS

(71) Applicant: The MathWorks, Inc., Natick, MA (US)

(72) Inventors: Yit Phang Khoo, Natick, MA (US); Jean-François Kempf, Westwood, MA (US); Kalyan Bemalkhedkar, Needham, MA (US); Mahesh Nanjundappa, Marlborough, MA (US)

(73) Assignee: The MathWorks, Inc., Natick, MA (US)

(*) Notice: Subject to any disclaimer, the term of this patent is extended or adjusted under 35 U.S.C. 154(b) by 0 days.

(21) Appl. No.: 16/707,941

(22) Filed: Dec. 9, 2019

(65) Prior Publication Data

US 2020/0192327 A1 Jun. 18, 2020

Related U.S. Application Data

(60) Provisional application No. 62/778,003, filed on Dec. 11, 2018.

(51) Int. Cl.
*G06F 11/36* (2006.01)
*G05B 19/4069* (2006.01)

(52) U.S. Cl.
CPC ...... *G05B 19/4069* (2013.01); *G06F 11/3684* (2013.01); *G05B 2219/33286* (2013.01)

(58) Field of Classification Search
CPC ............ G06F 11/3684; G05B 19/4069; G05B 2219/33286; G06Q 10/063
See application file for complete search history.

(56) References Cited

U.S. PATENT DOCUMENTS

| 10,318,653 | B1 | 6/2019 | Khoo et al. |
| 10,754,764 | B2* | 8/2020 | Lekivetz ............. G06F 11/3684 |
| 2009/0093961 | A1 | 4/2009 | Valero et al. |

FOREIGN PATENT DOCUMENTS

DE 4432714 C1 11/1995

OTHER PUBLICATIONS

R. Pietrantuono et al., Online Monitoring of Software System Reliability, IEEE, 2010, retrieved online Aug. 23, 2021, pp. 209-218. Retrieved from the Internet: <URL: https://ieeexplore.ieee.org/stamp/stamp.jsp?tp=&arnumber=5474180>. (Year: 2010).*

(Continued)

*Primary Examiner* — Hanh Thi-Minh Bui
(74) *Attorney, Agent, or Firm* — Cesari and McKenna, LLP; Michael R. Reinemann

(57) ABSTRACT

Systems and methods evaluate assessments on time-series data. An expression including temporal operators may be created for an assessment. The expression may be arranged in the form of an expression tree having nodes representing input data to the assessment and intermediate results of the expression. An assessment may be evaluated by performing a bottom-up traversal of the expression tree. One or more plots may be generated including a plot of the outcome of the assessment, e.g., pass, fail, or untested, plots of intermediate results of the expression and plots of input data as a function of time. Graphical affordance may be presented on the plots that mark the regions that may have contributed to a specific pass or fail result of the assessment, and points within the regions that resulted in the assessment passing or failing.

30 Claims, 25 Drawing Sheets

(56) References Cited

OTHER PUBLICATIONS

Bruel, Jean-Michel, "Stimulus Tutorial: Quick Start Guide," Version 1.0, Nov. 7, 2018, pp. 1-15.

Deshmukh, Jyotirmoy, et al., "Robust Online Monitoring of Signal Temporal Logic," Springer, Springer Science+Business Media, LLC, Formal Methods System Design, vol. 51, Jul. 27, 2017, pp. 5-30.

Dhananjayan, Amrith, et al., "A Metric Temporal Logic Specification Interface for Real-Time Discrete-Event Control," IEEE, IEEE Transactions on Systems, Man, and Cybernetics: Systems, vol. 44, No. 9, Mar. 11, 2014, pp. 1204-1215.

Donzé, Alexandre, et al., "On Temporal Logic and Signal Processing," Springer-Verlag Berlin Heidelberg, Automated Technology for Verification and Analysis, ATVA 2012, Lecture Notes in Computer Science, vol. 7561, Oct. 2012, pp. 92-106.

Gaucher, Fabien, et al., "Debugging Embedded Systems Requirements Before the Design Begins," ACM, SIGPLAN'05, Jun. 12-15, 2005, pp. 1-3.

Ho, His-Ming, et al., "Online Monitoring of Metric Temporal Logic," Springer, Cham, Springer International Publishing Switzerland, Runtime Verification, International Conference on Runtime Verification, RV 2014, Lecture Notes in Computer Science, vol. 8734, Sep. 2014, pp. 178-192.

Hoxha, Bardh, et al., "Towards Formal Specification Visualization for Testing and Monitoring of Cyber-Physical Systems," International Workshop on Design and implementation of Formal Tools and Systems, Oct. 2014, pp. 1-10.

Jeannet, Bertrand, et al., "Debugging Embedded Systems Requirements with STIMULUS: an Automotive Case-Study," 8$^{th}$ European Congress on Embedded Real Time Software and Systems (ERTS 2016), Toulouse, France, Mar. 22, 2016, pp. 1-9.

Koymans, Ron, "Specifying Real-Time Properties with Metric Temporal Logic," Kluwer Academic Publishers, Real-Time Systems, vol. 2, Nov. 1990, pp. 255-299.

Lemire, Daniel, "Streaming Maximum-Minimum Filter Using No. More Than Three Comparisons per Element," Nordic Journal of Computing, vol. 13, No. 4, Oct. 2006, pp. 328-339.

Ouaknine, et al., "Some Recent Results in Metric Temporal Logic," Springer-Verlag Berlin Heidelberg, Formal Modeling and Analysis of Timed Systems, FORMATS 2008, Lecture Notes in Computer Science, vol. 5215, Sep. 2008, pp. 1-13.

"Simulink®Test™: User's Guide," R2017b, The MathWorks, Inc., Sep. 2017, pp. 1-360.

Thati, Prasanna, et al., "Monitoring Algorithms for Metric Temporal Logic Specifications," RV'04 Preliminary Version, Mar. 5, 2004, pp. 131-147.

"European Search Report and Written Opinion," European Application No. 19215231.2-1222, Applicant: The MathWorks, Inc., dated Mar. 20, 2020, pp. 1-8.

\* cited by examiner

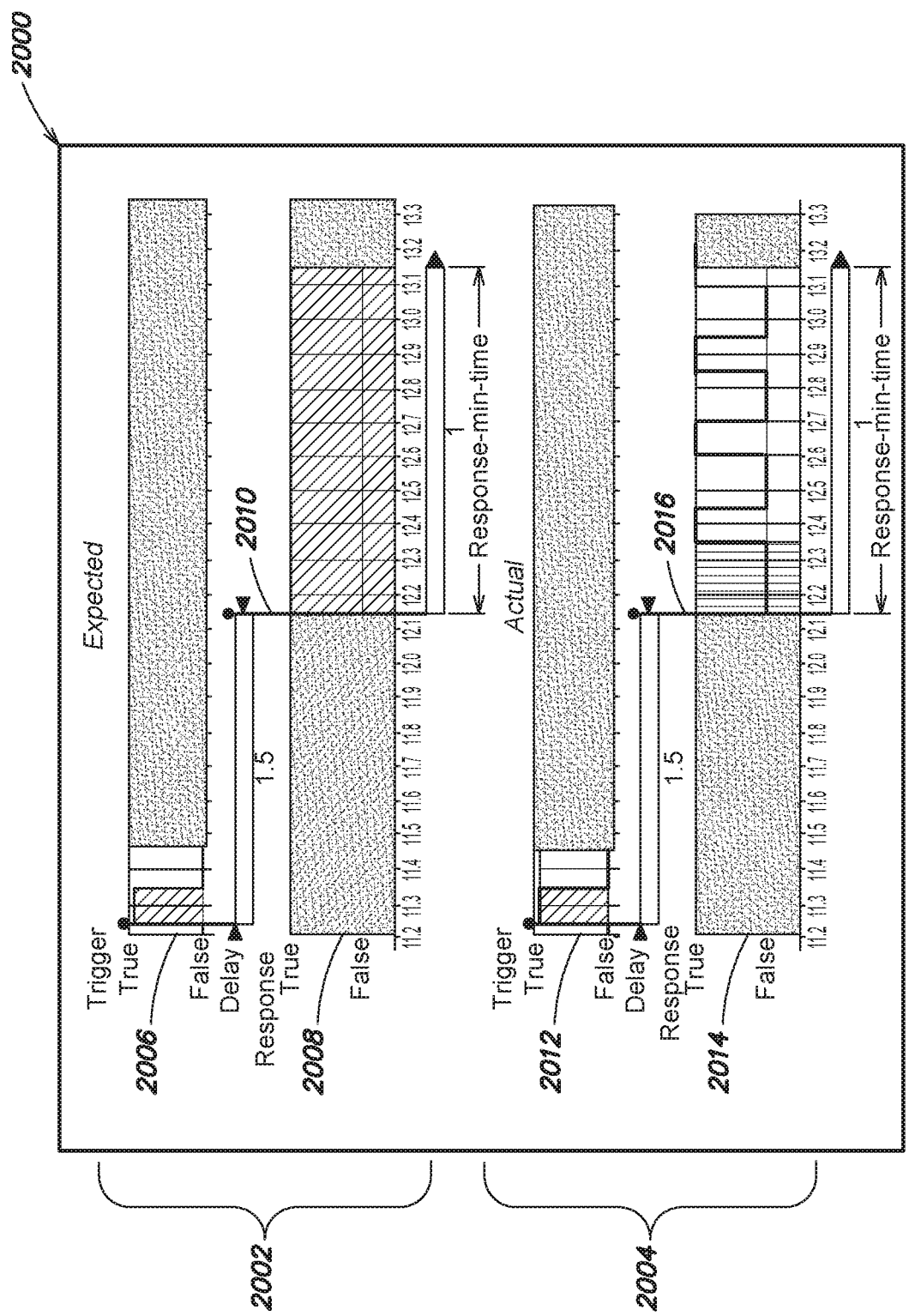

SYSTEMS AND METHODS FOR EVALUATING ASSESSMENTS

CROSS-REFERENCE TO RELATED APPLICATIONS

This application claims the benefit of Provisional Patent Application Ser. No. 62/778,003, filed Dec. 11, 2018, for Systems and Methods for Evaluating Assessments, which application is hereby incorporated by reference in its entirety.

BRIEF DESCRIPTION OF THE DRAWINGS

The description below refers to the accompanying drawings, of which:

FIG. 20 is an illustration of an example graphical depiction of a failure of an assessment in accordance with one or more embodiments.

DETAILED DESCRIPTION OF ILLUSTRATIVE EMBODIMENTS

Figure 1:
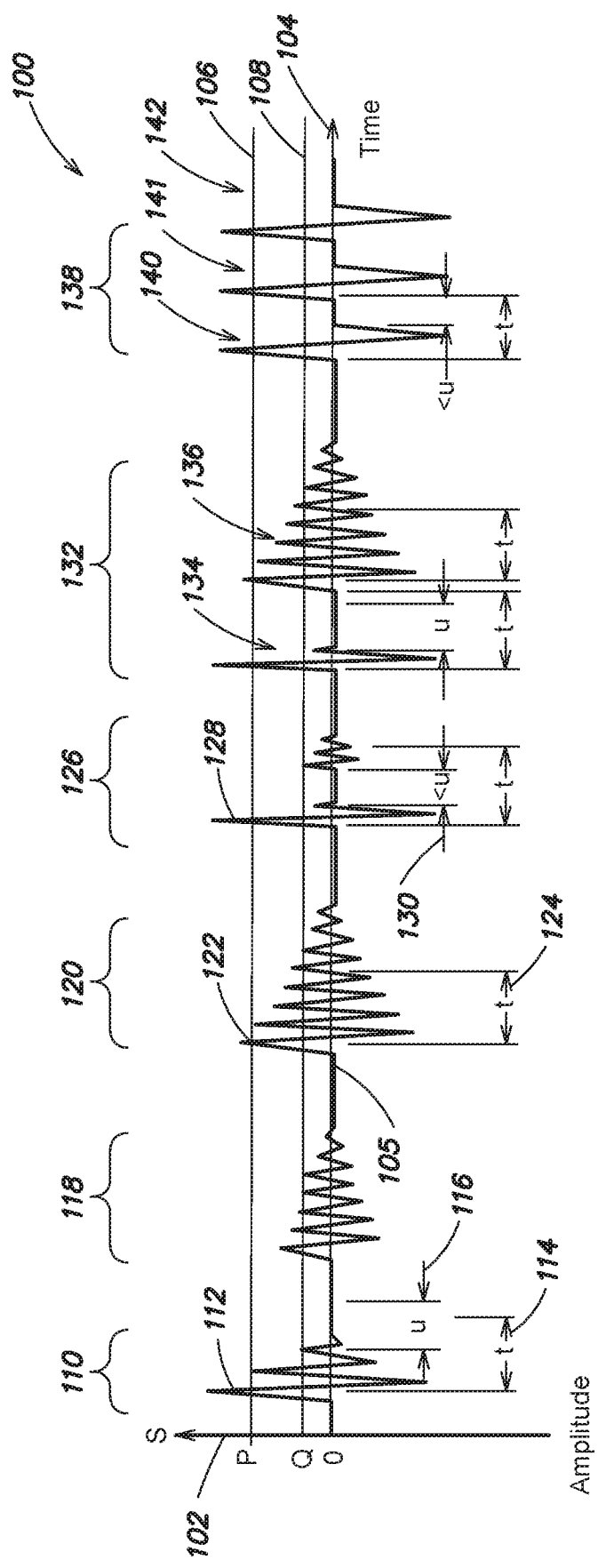
FIG. 1 is an example plot of the amplitude of a signal over time in accordance with one or more embodiments.

To develop a real-world system, such as a control system, a user may use a model-based design approach in which a simulation model may be created within a computer-based simulation environment. The simulation model may be executable and may be designed to simulate the behavior or operation of the control system being developed. During execution, sample inputs may be provided to the simulation model and sample outputs, such as control signals, may be computed based on those inputs and other data. The outputs may be evaluated to determine whether the simulation model behaves or operates as desired. In some embodiments, a simulation model may be a block diagram model. The blocks may perform operations or implement functionality for computing results and may be arranged, e.g., interconnected, to model the real-world system.

At least a portion of the desired behavior for the simulation model and/or the system being developed and/or designed may be described in one or more requirements. The requirements may specify how the simulation model and/or the system should behave in response to particular stimuli and/or conditions. For example, for a simulation model of a controller, a requirement may specify the characteristics of a computed command signal in response to a particular input. To determine whether the simulation model meets the specified requirements, the model may undergo functional testing. With functional testing, test inputs, expected outputs, and assessments may be defined based on the requirements. The evaluation of assessments may return pass, fail, or untested.

An assessment may be a condition that must be met by a component, for example a component of a simulation model or a component of physical system, to satisfy a specification and/or requirement specified for the simulation model and/or physical system. The condition may be expressed formally using a modal temporal logic with modalities referring to time, which may be simulation time of a model or physical time. Exemplary modalities of modal temporal logic include: a condition will eventually be true; a condition will be true until another condition becomes true; etc. Such a logic may be built up from a finite set of propositional variables, logical operators, and temporal modal operators. Assessment can refer to an augmented modal temporal logic formulae where the propositional variables can be replaced with one or more linear predicates. This may be described through symbolic logic as follows:

$$\Sigma_{i=1}^{m} a_i x_i \sim b_i y_i$$

where
$a_i, b_i \in \mathbb{R}$ are real coefficients,
$x_i, y_i$ are input variables, and
$\sim \in \{<, \leq, >, \geq, =\}$.

Modal temporal logic is restricted to bounded-time constraint operators. Input variables being assessed may be time-series data. Evaluation of an assessment against the input variables determines whether the logic is satisfied (Pass), unsatisfied (Fail) or unknown. Time-series data is a sequence of data points indexed in time order. Time-series data may be produced by sampling a signal at particular points in time, which can be simulation time or physical time. For example, a simulation environment may execute a simulation model over a time span, e.g., a simulation time, which may be user specified or machine specified. Simulation time is a logical execution time, and may begin at a simulation start time and end at a simulation end time. At successive points in time between the simulation start and end times, which points may be called simulation time steps, states, inputs, and outputs of model elements of the simulation model may be computed by the simulation environment. The duration of time between successive time steps may be fixed or may vary.

If one or more assessments fails, the simulation model may be debugged to determine the cause of the failure. Once the cause is understood, the model may be revised. The process of evaluating assessments and revising a simulation model may be repeated until the model implements the desired behavior, e.g., meets the specified requirements. In some cases, code may then be generated for the model. The code may be standalone code, e.g., executable outside of the simulation environment in which the model was run, and the generated code may be deployed to a real-world system, such as a physical controller, thereby resulting in the development of the real-world control system. In other cases, code may not be generated and the simulation may instead be used to evaluate and/or study the control system.

FIG. 1 is an example plot 100 of the amplitude of a signal (S) over time in accordance with one or more embodiments. The plot 100 includes a y-axis 102 that represents the amplitude of S, an x-axis 104 that represents time, and a trace 105 of the value of the amplitude of S over time. A requirement may specify that, if the magnitude of S exceeds one constant (P), then within a time period (t) the magnitude of S must settle below another constant (Q) and stay below Q for another time period (u). Such a requirement is an example of a so-called trigger-response requirement. It should be understood that the trigger and response need not come from the same signal. Instead, the trigger and the response may be separate signals. To assess whether the requirement is satisfied, an assessment is applied to S. The assessment may be represented by a mathematical formula, such as:

$$(|S|>P) \rightarrow (\Diamond_{[0,t]}(\Box_{[0,u]}(|S|<Q)))$$

where $\Diamond$ is the Metric Temporal Logic (MTL) eventually operator determined over the interval from 0 to t, and $\Box$ is the MTL globally operator determined over the interval from 0 to u.

It should be understood that temporal operators, such as the eventually operator, from other real-time temporal logics besides MTL may also be used. Other real-time temporal logics that may be utilized include Metric Interval Temporal Logic (MITL) and Signal Temporal Logic (STL).

When the trigger (in this example, the magnitude of S exceeds P) becomes true, an evaluation of the assessment is made based on whether the response is true or false. If the trigger becomes true and the response is true, then the assessment passes. If the trigger becomes true and the response is false, then the assessment fails. If the trigger does not become true or the trigger becomes true but the response is too short, e.g., the input time series data is less than time interval 't' or the time-series end time is smaller than 'u' to evaluate the response, the assessment is untested.

As a visual aid, the plot 100 further includes a line 106 indicating the value of P and another line 108 indicating the value of Q. The values of S may be generated by a simulation model and time may represent the model's simulation time. In other embodiments, the values of S may be generated by a physical system, such as a Hardware in the Loop (HIL) system, and time may be actual, e.g., real, time. The signal (S) may be a result computed by a simulation model or it may be a real-world measurement, such as streaming data over an Internet of Things application, among other sources of data. For example, it may be a damped signal produced by a simulation model of a radio transmitter, a spark gap transmitter, an oscillator system, etc.

A first region 110 passes the assessment because, while the magnitude of S exceeds P as indicated at 112, it settles below Q within t as indicated at 114 and stays below Q for u as indicated at 116. A second region 118 is untested because the magnitude of S never exceeds P. A third region 120 fails the assessment because the magnitude of S exceeds P as indicated at 122 but fails to settle below Q within t as indicated at 124. A fourth region 126 fails the assessment because the magnitude of S exceeds P as indicated at 128 but fails to stay below Q for u as indicated at 130. A fifth region 132 includes one segment 134 where the magnitude of S exceeds P and settles within t and another segment 136 that is within t+u of the segment 120. In this other segment 136, the magnitude of S exceeds P but fails to settle within t. A sixth region 138 includes three segments 140-142 that are within t of each other. In the first two segments 140 and 141, the magnitude of S does not settle below Q within t and thus the assessment fails.

In addition to a signal's settling behavior, other behaviors for which assessments may be defined include response to a step input, ringing, spiking, overshooting, undershooting, switching relationships among multiple signals, and steady state, e.g., the difference between a signal's final value and its desired value following some transient behavior.

To evaluate assessments, such as the above-described assessment for S, existing evaluation systems may import logged data generated during simulation of a model or operation of a physical system or hardware emulation. The evaluation systems may then perform, independently of the model, a processing of the logged data to determine whether the assessment passes or fails. That is, traceability to the original element producing the data might not be known to the evaluation system and traceability inside the simulation model or the physical system might not be possible. Existing evaluation systems may simply generate a Boolean measure of assessment result, i.e. either it passes or fails. As a result, debugging the simulation model or the physical system based on evaluation results may be difficult. Moreover, the complexity of evaluating temporal modal operators from which an assessment is built, might involve a rewriting of the original assessment for performance considerations, compromising traceability from the evaluation results to the original assessment.

Due to the underlying semantics of the logic used by existing evaluation systems, results may not distinguish vacuously true results from results that actually are not tested. Some evaluation systems may produce a quantitative measure, e.g., a distance to failure, instead of a Boolean result, with the same limitations as stated before regarding vacuously true results. To reduce the complexity of quantitative evaluation of assessments composed of temporal modal operators, evaluation systems may rewrite the assessment in a form that is amendable for backwards processing, a commonly used technique to evaluate this type of properties. However, this limits the scope where these systems can be used. For example, to perform real-time evaluation, backwards processing is not suitable because it requires the assessment system to wait for all data to be available before starting the evaluation process. While such systems can identify when the assessment passes or fails, they cannot determine what led to the passing or failing because of the lack of available traceability information or because of the rewriting process performed before evaluation.

The present disclosure relates to systems and methods for evaluating assessments on time-series data. The systems and methods may be directed to performing real-time evaluation of assessments, e.g., when time series data is streamed from one or more devices. In addition, it may be a problem to determine resources required by buffers of an expression tree and how to prevent memory and processor requirements associated with an expression tree from exceeding available resources. The systems and methods may receive the assessments, which may be based on requirements. In some embodiments, the systems and methods may include an assessment editor through which a user may define the assessments. The assessment editor may provide a wizard to facilitate the definition of the assessments. The wizard (setup assistant that provides a graphical user interface, possibly with a sequence of dialog boxes to lead a user through a series of steps) may guide the user in the definition of the assessments through natural language elements.

The systems and methods may further include an expression builder. The expression builder may automatically create a formal mathematical expression based on an assessment. The expression may give the assessment an unambiguous meaning by encoding it as an expression tree which may include one or more input variables, constants, logical operators, relational operators, temporal operators, and/or arithmetic operators. The expression tree may include nodes, such as leaf nodes and non-leaf nodes, interconnected by edges. The leaf nodes may represent the input variables and constants of the expression. The non-leaf nodes may represent logical, temporal, or arithmetic operators of the expression. At least some of the operations associated with the non-leaf nodes may correspond to subexpressions of the expression, and results of these operations may be referred to as intermediate results of the expression. A root node of the expression tree may be associated with an overall result of the assessment, e.g., whether the assessment passes, fails, or is untested.

In some embodiments, the expression as created by the expression builder may preserve the form of the original assessment. For example, the expression builder may not rewrite the assessment. Accordingly, the expression may provide traceability to the original assessment. The assessment definition and the corresponding expression may be agnostic to the context of evaluation. The context may be specified when associating leaf nodes with specific data, for example using a symbol mapper.

In some embodiments, the expression tree may be automatically annotated with traceability data to navigate from any node in the expression tree to its corresponding element in the assessment. The symbol mapper may automatically annotate at least some of the leaf nodes of the expression tree with time-series data and traceability information to navigate to the element producing the data. The time-series data may be produced by a data source, such as a simulation model, target hardware of a Hardware in the Loop (HIL) system, or a physical device, such as an Internet of Things (IoT) device, among other sources. If the assessments are defined and received before or during simulation of a simulation model, they can be evaluated online during simulation. If they are defined and/or received after simulation of a model has finished, they can be evaluated by post-processing simulation results.

The systems and methods may further include an assessment evaluator. The assessment evaluator may evaluate the expression against the time-series data. The assessment evaluator may perform a bottom-up traversal of the expression tree, e.g., from leaf nodes to the root node, to determine whether the assessment passes, fails, is untested, or to determine a quantitative measure (e.g., distance to passing or failure). The assessment evaluator may compute the result by post-processing logged data or it may compile the expression to produce an executable monitor which can run in conjunction with execution of a simulation model or the running of a physical system producing the input data to the assessment. For example, the assessment evaluator may automatically generate code, such as C or C++ code or HDL code, to produce an executable real-time monitor which can be deployed on a hardware target. Such a real-time monitor may be cosimulated with a simulation model or connected directly to a physical system. In some embodiments, operation time monitoring may be performed, for example in the form of a digital twin of a simulation model and/or a physical system, e.g., using synchronized time stamps. The assessment evaluator or the generated executable monitor may automatically compute the intermediate results associated with the non-leaf nodes and the overall result associated with the root node of the expression tree.

The assessment evaluator may evaluate the expression in online, offline, and/or streaming modes. In the online mode, the assessment evaluator may run concurrently with the execution of a simulation model producing the time-series data. For example, the assessment evaluator may run in a different process and/or thread than the execution of the simulation model. In the online mode, the assessment evaluator may operate as a reactive monitor. For example, if a failure is detected, an action can be performed or taken in real time. In the offline mode, time-series data generated by a simulation model or other data source may be logged and the assessment evaluator may analyze the logged data. The offline mode may be used during field testing and/or the testing of recorded and/or logged data. In the streaming mode, the assessment evaluator may analyze a stream of the time-series data as produced by the data source, which may be one or more Internet of Things (IoT) devices. The streaming mode may be used with long-running simulations where a user may not wish to store simulation data. The streaming mode may also be used in a digital twin embodiment.

The systems and methods may include a plotting tool. The plotting tool may generate one or more plots of the outcome of the assessment, e.g., pass, fail, or untested, as a function of time. The plotting tool may also generate one or more plots of the input data mapped to the input variables of the expression and of the intermediate results computed by the expression. The plotting tool may apply a graphical affordance to a plot associated with the root node of the expression tree designating the points in time at which the assessment passed, failed, and was untested. The plotting tool may apply another graphical affordance to the plots of the input data and intermediate results that mark the time regions or intervals of the input data and/or intermediate results that may have contributed to a specific pass or fail result. The assessment evaluator may determine the time regions by analyzing the expression tree. The plotting tool may apply a further graphical affordance that marks one or more values and/or ranges of values of the input data and intermediate results within the time regions that resulted in the assessment passing, failing or relating to a quantitative (e.g., distance) measure of an assessment.

By creating the expression tree for the assessment and computing and plotting intermediate results associated with the nodes of the expression tree, the systems and methods provide traceability between the time-series data and the elements of the assessment. The plots may be used to visualize the results of the assessment, including intermediate results. The plots and the graphical affordances aid in debugging the cause of failures of the assessment, for example through traceability to the assessment and/or to elements of a simulation model.

The assessment evaluator may store, e.g., buffer, a portion of the time-series data from the data source in a sliding window, and may perform forward processing on the time-series data in the window using a sliding-window algorithm. The assessment evaluator may utilize a specific data structure for the sliding window and may implement a specific sliding window algorithm to perform efficient evaluation of the time-series data. A suitable sliding window algorithm is described in D. Lemire "Streaming Maximum-Minimum Filter Using No More Than Three Comparisons Per Element", J. of Computing, Vol. 13, No. 4, pp. 328-339 (2006), which paper is hereby incorporated by reference in its entirety.

The systems and methods may further include an entity configured to determine fixed buffer sizes for the input data and intermediate results of the expression, for example for use in the streaming mode and/or for real-time monitoring. In some cases, buffers are used for non-leaf nodes when input data points are stored for certain operators (e.g., globally and/or eventually operators). Buffers may also be needed for non-leaf nodes associated with an operator (e.g., a Boolean or arithmetic operator) having two operands when a value for a first operand is available earlier than a value for a second operand (e.g., the buffer may be needed to store the value for the second operand). Buffers might not be needed for one or more of the following: leaf nodes, nodes associated with relational operators, nodes associated a logical NOT operator, nodes associated with an Absolute arithmetic operator.

The entity may analyze the expression tree to determine time intervals specified for a timed operator associated with the nodes of the expression tree. Using the time intervals as well as sample rates, which may include frame rates and refresh rates, at which the time-series data is generated and attributes of the time-series data, such as the data type, the entity may compute fixed buffer sizes for the input data and intermediate results. The entity may then sum the fixed buffer sizes to determine the overall memory size needed to evaluate the expression. The entity may perform these tasks after an expression is constructed and before evaluation of an assessment starts. As described, the entity may determine a bound on the overall memory size, e.g., it will not increase during evaluation of the assessment regardless of the length of the simulation and/or signal under evaluation. This may be advantageous when evaluating assessments in real-time and/or in streaming mode. In addition, computations for performing evaluations may remain linear in time.

Figure 2:
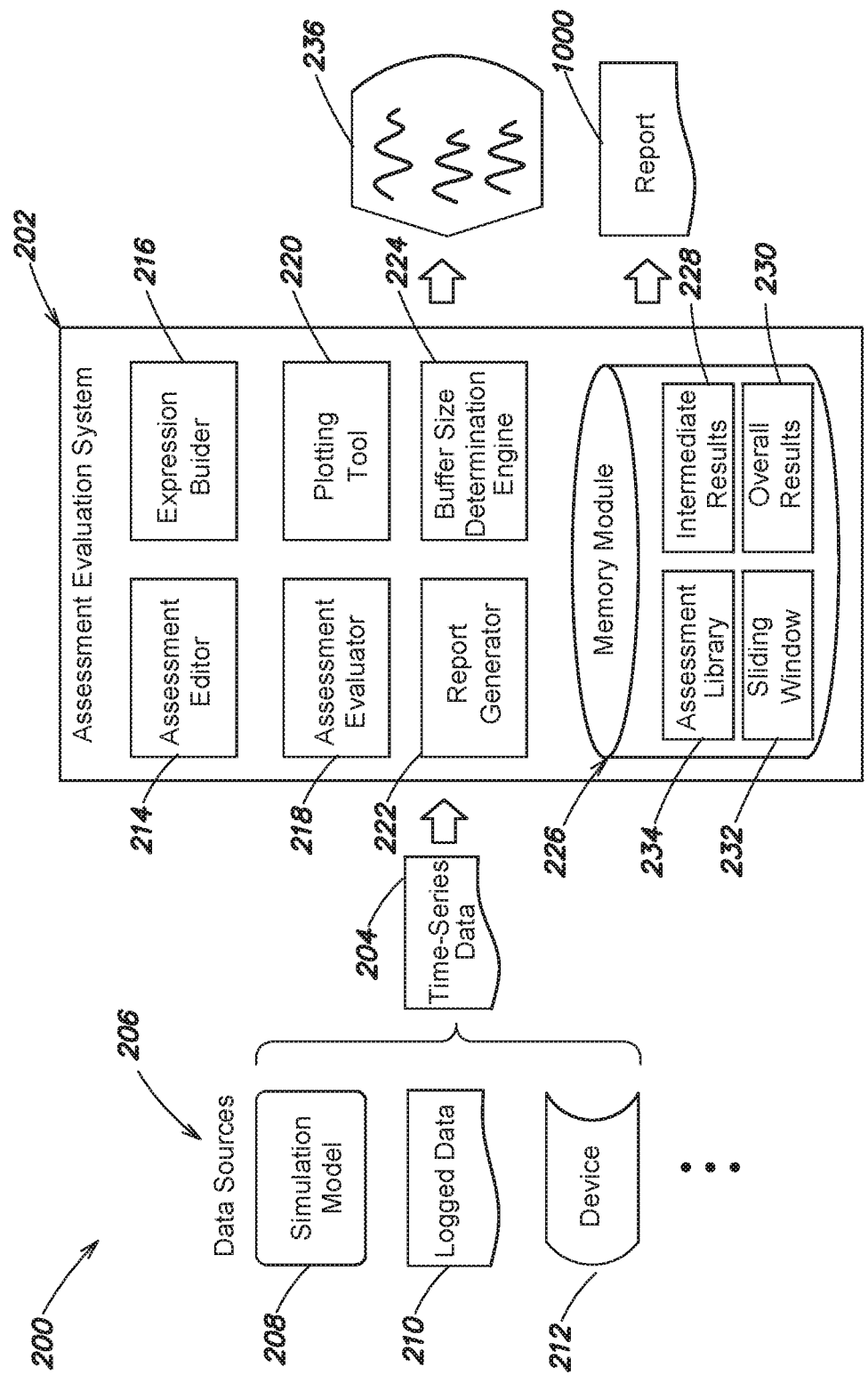
FIG. 2 is a schematic illustration of an example assessment environment for evaluating assessments in accordance with one or more embodiments.

FIG. 2 is a schematic illustration of an example assessment environment 200 for evaluating assessments in accordance with one or more embodiments. The environment 200 may include an assessment evaluation system 202 that may receive data, such as time-series data 204 from a data source indicated generally at 206. Exemplary data sources 206 include a simulation model 208 that may generate the time-series data 204 during execution, logged data 210, such as data generated during a previous execution run of the simulation model 208, and one or more devices, such as device 212, which may be a Hardware-in-the-Loop (HIL) device or an Internet of Things (IoT) device, such as a smart sensor, a smart controller, etc. Other sources include a game engine, such as the Unreal Engine game engine from Epic Games, Inc. of Cary, N.C. and the Unity game engine from Unity Technologies ApS of Copenhagen, Denmark, among others.

The assessment evaluation system 202 may include an assessment editor 214, an expression builder 216, an assessment evaluator 218, a plotting tool 220, a report generator 224, and an entity configured to determine buffer sizes for storing input data and intermediate results, such as a buffer size determination engine 224. The assessment evaluation system 202 also may include or have access to one or more memory modules, such as memory module 226.

The assessment evaluator 218 may evaluate an assessment using the time-series data 204. The assessment evaluator 218 may compute one or more intermediate results and an overall result for the assessment. The assessment evaluator 218 may store these results at the memory module 226, as indicated at 228 and 230. The assessment evaluator 218 may also maintain one or more sliding windows of intermediate results in or more data structures at the memory module 226, as indicated at 232. In some embodiments, one or more assessments may be stored in the memory module 226. For example, the memory module 226 may include an assessment library 234 for storing context-agnostic assessments. Accordingly, assessments can be reused, as opposed to constructing new assessments for each application.

The plotting tool 220 may generate one or more plots for the assessment. For example, the plotting tool 220 may generate plots of at least a portion of the time-series data 204, one or more of the intermediate results 228, and/or the overall results 230. The plotting tool 220 may present the one or more plots on a display 236. The report generator 222 may generate one or more reports as indicated at 1000. The report 1000 may include information explaining one or more failures of an assessment.

A user may author one or more assessments. The one or more assessments may be associated with one or more requirements for a simulation model or a physical system. For example, an assessment may determine whether or not a simulation model, when executed, satisfies a given requirement. In some embodiments, the assessment editor 214 may present one or more User Interfaces, such as a Graphical User Interface (GUI), to facilitate user definition of an assessment. The GUI may be in the form of an editor.

The assessment editor 214 may include templates for defining particular types of assessments. One type of assessment is a trigger-response assessment. When the trigger occurs, e.g., becomes true, a determination is made whether the response is true or false. In some embodiments, the assessment evaluation system 202 may perform one or more actions, e.g., at the simulation model 208 and/or the device 212.

Figure 3:
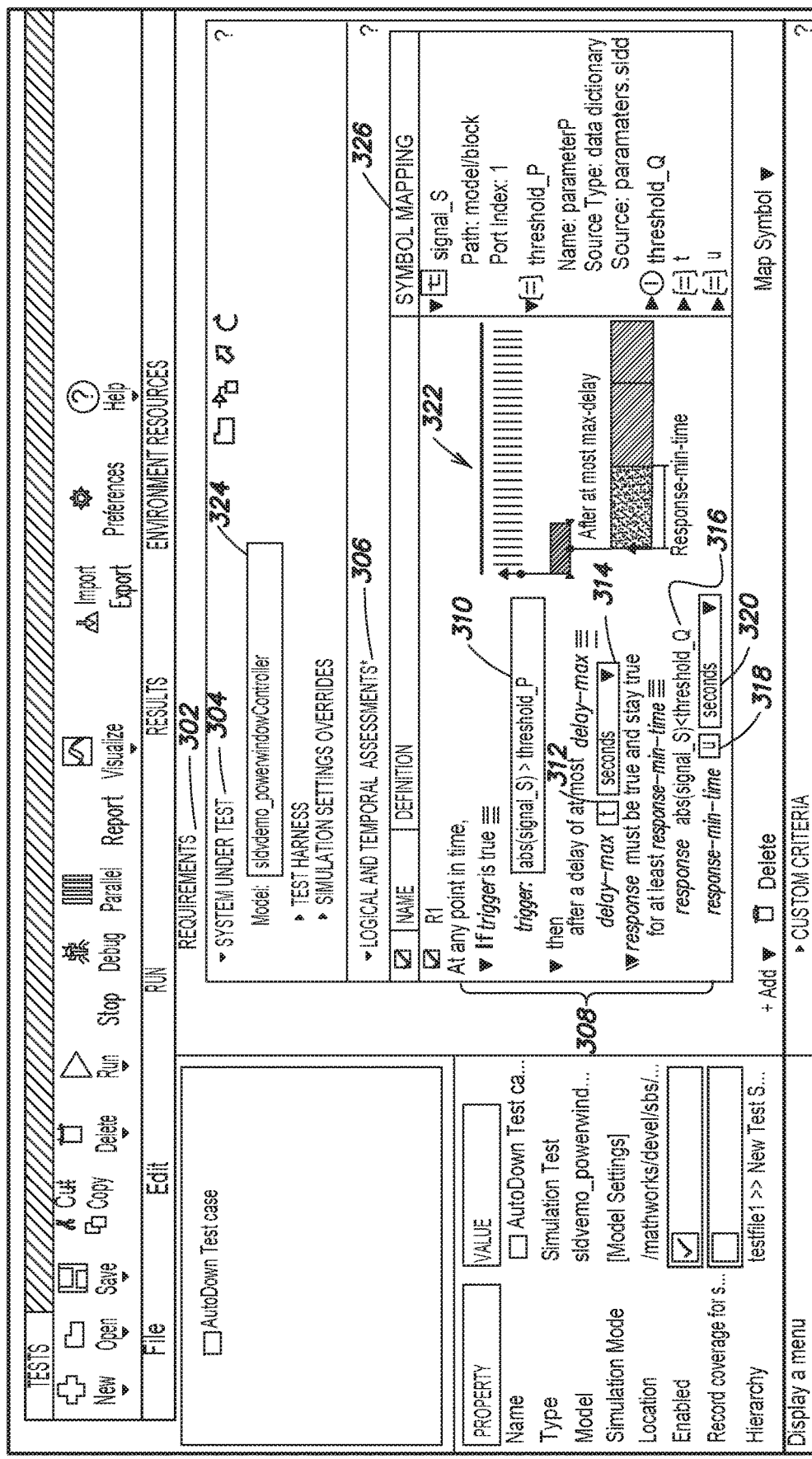
FIG. 3 is an illustration of an example editor for defining assessments in accordance with one or more embodiments.

FIG. 3 is an illustration of an example editor 300 for defining assessments in accordance with one or more embodiments. The editor 300 may include a requirements pane 302, a system under test pane 304, and an assessment pane 306. The requirements pane 302 is collapsed while the system under test pane 304 and the assessment pane 306 are expanded. The assessment pane 306 includes a wizard 308 for defining a trigger-response type of assessment. Specifically, the wizard 308 facilitates the definition of an assessment for which, if the trigger is true, then after a delay of at most a delay maximum (delay-max) time, a response must be true, and the response must stay true for a response minimum (response-min-time) time. The wizard 308 may include a data entry field 310 for defining the trigger. The user may enter an expression in the data entry field 310 to define the trigger. As shown, the trigger is defined by the expression:

> the absolute (abs) value of *a* variable named signal_*S* being greater than *a* variable named threshold_*P*.

The wizard 308 may include a data entry field 312 for defining the delay-max time and a data entry field 314 for specifying the units of time for the delay-max time. As shown, the delay-max time is set to a variable named t and the units are seconds. The wizard 308 may include a data entry field 316 for defining the response. As with the trigger, a user may enter an expression in the data entry field 316 to define the response. As shown, the response is defined by the expression:

> the absolute (abs) value of the variable named signal_*S* is less than *a* variable named threshold_*Q*.

The wizard 308 may include a data entry field 318 for defining the response-min-time time and a data entry field 320 for specifying the units of time for the response-min-time time. As shown, response-min-time is set to a variable named u and the units are seconds. The assessment pane 306 may provide a graphical representation 322 of the type of assessment that is being defined. The data entry fields of the wizard 308 may be arranged in the form of a template for defining the assessment. The editor 300 may include multiple different templates associated with different types or forms of assessments. A user may select one of the available templates to author a specific assessment. The editor 300 may present the template to define assessments in accordance with an assessment language grammar.

The system under test pane 304 may be used to identify the time-series data (or its source) to be evaluated by the assessment. For example, the system under test pane 304 may include a data entry field 324 for specifying a specific data source, such as a simulation model, to be evaluated. The name of the simulation model to be evaluated, e.g., sldvdemo_powerwindowController, may be entered in the data entry field 324.

To evaluate the assessment on time-series data from the identified data source, e.g., the sldvdemo_powerwindowController simulation model, the variables used in the assessment may be associated with variables included in the simulation model. The assessment pane 308 may include a symbol mapping area 326. The symbol mapping area 326 may be used to associate variables included in the assessment with specific variables in the simulation model. The association of variables included in an assessment with variables in time-series data may be performed manually, e.g., by the user of the assessment, automatically, or semi-automatically. For example, the symbol mapping area 326 may include an entry for each variable of the assessment. Each entry may be selected and a variable of the simulation model may be associated with the variable of the respective entry, e.g., through manual assignment. As illustrated, the signal_S variable of the assessment may be associated with a signal computed at a port of a block of the simulation model. The threshold_P, t, and u variables may be associated with parameters of the simulation model. If a variable of the assessment is left unassociated, the assessment editor 214 may provide a warning, such as the warning symbol for the threshold_Q variable.

In some embodiments, the assessment editor 214 may associate variables of an assessment with variables of a data source automatically or semi-automatically. For example, if the name of a variable included in an assessment uniquely matches the name of a variable of the data source, the assessment editor 214 may associate that variable of the assessment with the variable of the time-series data source with the same name. If the name of a variable included in an assessment matches more than one variable in the data source, the assessment editor 214 may present a list of those variables from the data source whose name matches the name of the variable of the assessment. The user may then select one of the names from the list. In response, the assessment editor 214 may associate the selected variable from the data source with the variable of the assessment.

The assessment editor 214 may bind the variables of the assessment to the respective variables identified in the symbol mapping area 326. Binding may refer to associating a symbol of an assessment to a data element, such as a variable or a constant, of a simulation model by storing a map from the symbol to the data element of the model. The map may include metadata for retrieving the data element. The metadata may include the name of the model, its location in memory, e.g., the file directory path, the name or type of a block or element, the name or type of a block port, the name or type of a block parameter, the name or type of a signal, event, or variable, etc.

By using variables in the definition of the assessment, the assessment may be reused with other data sources. For example, the assessment may be saved in the assessment library 234 and reused with more than one data sources. Assessments may be context agnostic. Context may be determined by symbol mapping which may link the assessment's variables to specific data, such as a signal in a simulation model, logged data, a stream of data, etc. Reuse of an assessment can be achieved by instantiating an assessment in different contexts, e.g., applying different symbol mapping to the same assessment definition.

It should be understood that other types of assessments may be defined using the editor 300. For example, in addition to assessments in which the condition is evaluated whenever a trigger is true, which may be a continuous trigger calling for the response to be checked continuously from the time the trigger becomes true until it becomes false, other types of triggers include:

whenever the trigger becomes true, which may be a discrete trigger calling for the response to be checked only at this specific discrete event, e.g., the rising edge of a Boolean signal, whenever the trigger becomes true and stays true for at least a trigger_minimum time;

whenever the trigger becomes true and stays true for at most a trigger_maximum time; and whenever the trigger becomes true and stays true for at least a trigger_minimum time and at most a trigger_maximum time, among others.

Furthermore, in addition to assessments in which the response must become true after a delay of at most a delay_max time and must stay true for a response_min time, other types of responses include:

the response is true at that point in time;

the response is true and stays true for at least a response_min time;

the response is true and stays true for at least a response_min time and at most a response_max time; and the response is true and stays true until a response_end time or becomes true within a response_max time, among others.

In some embodiments, the assessment editor may generate a text-based narrative description of the defined assessment and present it on the editor 300.

It should be understood that the editor 300 is presented for purposes of explanation and that assessments may be defined in other ways. For example, assessments may be authored using a graphical and/or textual programming language. An advantage of the wizard 308, however, is that it can hide the complexity of an assessment language grammar behind natural language template elements. This may simplify the process of authoring assessments by a user. In addition, the construction of a corresponding formal assessment expression may be automated based on information entered in the wizard, which may be less error-prone than manual authoring and/or editing of an assessment.

The expression builder 216 may generate an expression based on the assessment authored by a user. The expression builder 216 may generate the expression using an assessment language grammar. In some embodiments, the expression builder 216 may utilize the following assessment language grammar, which is described using symbolic logic symbols, to inductively define an expression assessment, $\varphi$, as:

$$\varphi := \varphi_L | \varphi_T | \varphi_W | \varphi_R$$

where $\varphi_L := \varphi \vee \varphi | \varphi \wedge \varphi | \neg \varphi$ defines a set of logical operators, e.g., OR, AND, and NOT, $\varphi_T := \varphi^{\underset{\leftarrow}{t}}$ defines a set of timed point-wise operators, $\varphi_W := \varphi \, \mathcal{U}_I \varphi | \square_I \varphi | \diamond_I \varphi$ defines a set of timed window operators, e.g., MTL operators, $\varphi_R := \varphi_a < \varphi_a | \varphi_a \leq \varphi_a | \varphi_a > \varphi_a | \varphi_a \geq \varphi_a | \varphi_a = \varphi_a | \varphi_a \neq \varphi_a$ defines a set of relational operators $\varphi_a := \varphi_a + \varphi_a | \varphi_a - \varphi_a | \varphi_a * \mu | | \varphi_a | | \tau | \mu$ defines a set of arithmetic operators where, $\tau$ is a timed trace, which may be defined over monotonically increasing time, and $\mu$ is a scalar constant.

A timed trace T may be defined as a finite time sequence, $\tau_1, \tau_2, \ldots \tau_n$ where $\tau_i$ is a tuple $\{t_i, \upsilon_i, \delta_i\}$, in which $t_i \in \mathbb{R}$, is a point in time, $\upsilon_i \in \mathcal{D}$ is the corresponding value of the timed trace at that time, and $\delta_i \in \mathbb{R}$ is the derivative of the timed trace at that time. $\mathcal{D}$ is the domain defined by a numeric data type, such as double precision floating-point, single precision floating-point, integer, etc.

A function $\vartheta_i(\tau,t)$ returns the value of the timed trace $\tau$ at time t either returned directly if there is a sample i such that $t_i = t$, or is interpolated using the derivative function $\delta_i$.

As an example, the following equation can be built from this grammar:

$$s_1 + s_2 < s_3$$

$(s_1 + s_2)$ and $s_3$ are of type $\varphi_a$
and $\varphi_a < \varphi_a$ is a valid rule.

At least some of the temporal operators define specific time intervals, which specify timing constraints for the operator. For example, the 'eventually' operator may be associated with a time interval [a,b], which when applied to a logical predicate B, e.g., in the form eventually [a,b] (B), means that B must eventually be true between 'a' seconds and 'b' seconds or other time units. Temporal operators may require a certain amount of data to be buffered to determine whether the assessment passes or fails at any given point in time. The result can be determined instantaneously for logical, arithmetic, and relational operators. That is, no buffering mechanism is required for these operators.

The expression builder 216 may utilize the following semantics for MTL operators when creating an expression:

Eventually: $\diamond_I \varphi$ reads as eventually in interval I, $\varphi$ must be true and is evaluated using the following formula:

$$\forall t \in \mathbb{R}, \vartheta(\diamond_I \varphi, t) = \begin{cases} \text{true} & \text{if } \exists t' \in t + I, \vartheta(\tau, t') = \text{true} \\ \text{false} & \text{otherwise} \end{cases}$$

Globally: $\square_I \varphi$ reads as globally (or always) in interval I, $\varphi$ must be true and is evaluated using the following formula:

$$\forall t \in \mathbb{R}, \vartheta(\square_I \varphi, t) = \begin{cases} \text{true} & \text{if } \forall t' \in t + I, \vartheta(\tau, t') = \text{true} \\ \text{false} & \text{otherwise} \end{cases}$$

Until: $\varphi^1 \, \mathcal{U}_I \varphi^2$ reads as $\varphi^1$ must be true until $\varphi^2$ becomes true in the interval I and is evaluated using the following formulae:

Let $\varphi^3$:

$$\forall t \in \mathbb{R}, \vartheta(\varphi^1 u_I \varphi^2, t) =$$

$$\begin{cases} \text{true} & \text{if } \exists t' \in t + I, \vartheta(\tau^2, t') = \text{true} \wedge \forall t'' \in [t, t'], \vartheta(\tau^1, t') = \text{true} \\ \text{false} & \text{otherwise} \end{cases}$$

An expression may be an in-memory, intermediate formal representation of an assessment which can be compiled to a form that is machine executable.

In some embodiments, the expression builder 216 may utilize a context free grammar when generating the expression for an assessment. In some implementations, a user may define an assessment using a MATLAB Application Programming Interface (API) configured to allow the user to express an assessment in the assessment language grammar. In other embodiments, the expression builder may generate an expression that conforms to the syntax and semantics of a programming language, e.g., C, C++, or MATLAB code, among others, to generate a real-time monitor.

Suppose, for example, that a user utilizes the editor 300 to author an assessment for determining if whenever the magnitude of a signal named S exceeds a constant named P then within a time period named t the magnitude of the signal S must settle below a constant named Q and stay below Q for another time period named u.

The expression builder 216 may construct the following if-then expression for this assessment:

if (|S|>p)
then $\diamond_{[0,t]} \square_{[0,u]} |S| < q$
where
  $\diamond$ is the MTL eventually operator, determined over the interval from 0 to t, and
  $\square$ is the MTL globally operator, determined over the interval from 0 to u.

In some embodiments, the expression builder 216 may be configured to utilize one or more rules to generate an expression from an assessment. One rule may be to formulate trigger-response type assessments into if-then expressions. Another rule may be to use the MTL eventually operator for that portion of an assessment which specifies a condition that must become true in some time interval or period. A further rule may be to use the MTL globally operator for that portion of an assessment which specifies a condition that must remain true for some time interval or period. Yet another rule may be to use the MTL until operator for that portion of an assessment that specifies a first condition that must be true until a second condition is true. Another rule may be to use a logical AND operation for the then term of the if-then expression created for a trigger-response type of assessment.

In some embodiments, the expression builder 216 may generate an expression for the assessment based on the defined assessment language grammar. For example, the expression builder 216 may generate the following expression, e.g., logical formulae, for the user authored assessment:

$$\varphi := \neg(|S|>P) \vee (\Diamond_{[0,t]}(\Box_{[0,u]}(|S|<Q)))$$

The expression generated by the expression builder 216 may maintain or preserve the assessment as it was authored by the user. Accordingly, the expression generated by the expression builder 216 may be used to perform forward analysis of time-series input data. The expression builder 216 may not rewrite the assessment, which may be required with systems performing backwards analysis on time-series input data.

The expression builder 216 may arrange the generated expression into an expression tree. For example, the expression builder 216 may encode the generated expression as an expression tree in which the non-leaf nodes of the expression tree represent operators from the grammar.

In some embodiments, the expression tree may be in the form of a directed acyclic graph and may include a plurality of nodes interconnected by edges. The tree may include a root-level node and one or more branches.

The expression builder 216 may use the following process to create the expression tree. The expression builder 216 may analyze, e.g., parse, the authored assessment to identify the operations, operands, and time instances and intervals of the assessment. The expression builder 216 may utilize operators from the assessment language grammar to construct parsed portions of the expression for computer execution. The expression builder 216 may also arrange the operators in the expression so that execution of the expression equates to evaluating the naturally authored assessment.

In an example, for a trigger-response type of assessment, the expression builder 216 may place the portion of the expression that corresponds to the trigger, which may be the 'if' part of the 'if-then' expression, in one branch of the tree. It may place the portion of the expression that corresponds to the response, which may be the 'then' part of the 'if-then' expression, in another branch of the tree. It may assign the implication operation as the root node of the tree. It may place the variables of the time-series data being evaluated to respective leaf nodes of the tree. It may place constants utilized in the expression to some other leaf nodes of the tree. It may place the first operation applied to the time-series data to a parent node of the leaf node for the time-series data. It may place the first operation applied to a constant to a parent node of the leaf node for the constant. It may place the operation applied to the result of the first operation to a parent node of the node for the first operation and so on until reaching the root node. Edges, which may be in the form of arrows may be added from parent to child nodes of the expression tree to identify the operands of the operation associated with the parent node.

Figure 4:
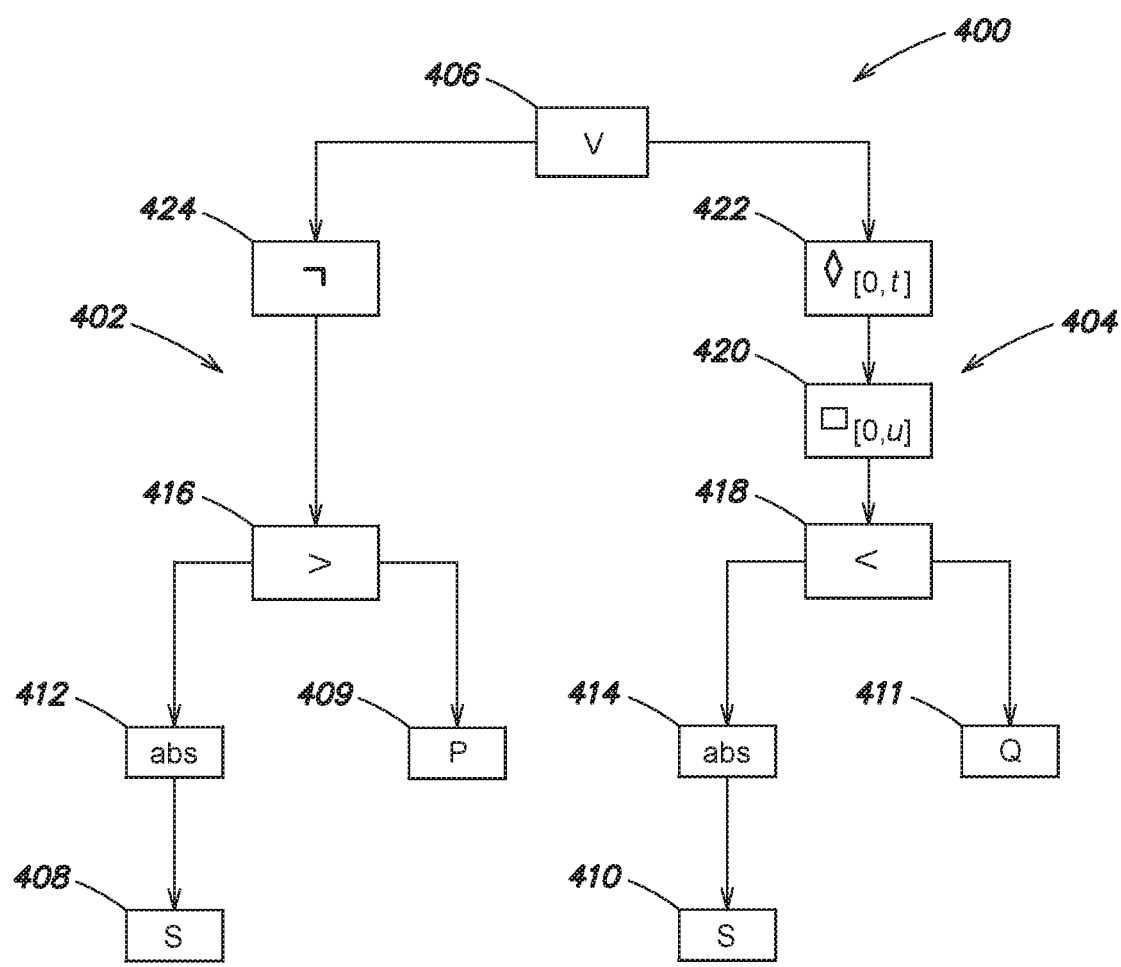
FIG. 4 is an illustration of an example expression tree in accordance with one or more embodiments.

FIG. 4 is a schematic illustration of an example expression tree 400 constructed for the assessment for determining if whenever the magnitude of a signal S exceeds a constant P then within a time period t the magnitude of S must settle below a constant Q and stay below Q for another time period u in accordance with one or more embodiments. The expression tree 400 includes two branches 402 and 404 and a root-level node 406. The branch 402 corresponds to the if portion of the expression, which is the trigger portion of the assessment. The branch 404 corresponds to the then portion of the expression, which is the response portion of the assessment. The root node 406 represents the implication operator of the expression. The root node 406 thus separates the trigger portion of the assessment from the response portion of the assessment.

The expression tree 400 includes four leaf nodes 408-411. Leaf nodes 408 and 410 represent the time-series S. Leaf node 409 represents the constant P and leaf node 411 represents the constant Q. Two non-leaf nodes 412 and 414 represent the two absolute value operations of the expression, which both determine the absolute value of the time-series S. The non-leaf nodes 412 and 414 are parent nodes of leaf nodes 408 and 410, respectively. Two other non-leaf nodes 416 and 418 represent the greater than and less than operators, respectively, of the expression. One non-leaf node 420 represents the MTL globally operator of the expression and another non-leaf node 422 represents the MTL eventually operator of the expression. In some embodiments, the expression builder 216 may replace an assessment that is in the form of a conditional statement, or a logical implication (a→b), with a disjunction (¬a∨b), which is understood as being logically equivalent to the implication. The expression builder 216 may thus include a non-leaf node 424 that represents a negation of the sub-expression 416. The nodes the expression tree, e.g., the root node 406, the leaf nodes 408-411, and the non-leaf nodes 412-422 may be connected by arrows that identify the operands of the operations represented by those nodes.

The non-leaf nodes 412-422 may be associated with intermediate results computed as part of the expression. For example, the non-leaf nodes 412 and 414 are associated with the intermediate result that is computed by taking the absolute value of the time-series S. The non-leaf node 416 is associated with the intermediate result, e.g., true or false, computed by determining whether the absolute value of the time-series S is greater than the constant P. In some embodiments, values, such as intermediate results, may be reused.

The assessment evaluator 218 may evaluate an expression encoded as an in-memory expression tree, such as the tree 400, in a bottom up manner. During evaluation every node of the expression tree may be annotated with a time trace that encodes the node's result.

Figure 12:
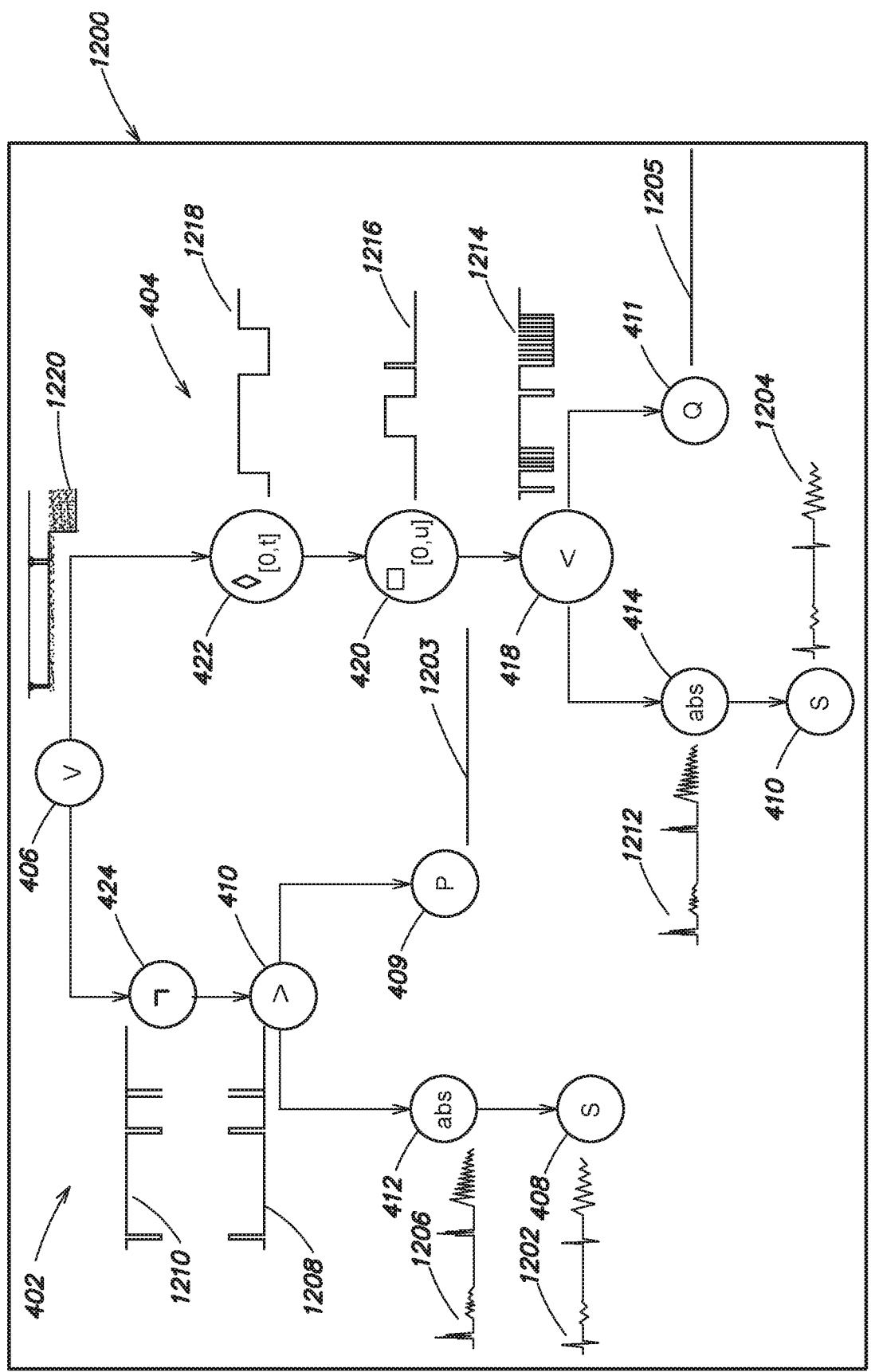
FIG. 12 is a schematic illustration of an example expression tree annotated with time traces in accordance with one or more embodiments.

FIG. 12 is a schematic illustration of an example expression tree 1200 annotated with time traces in accordance with one or more embodiments. The leaf nodes 408-411 may not require an explicit evaluation process by the assessment evaluator 218 as they are the result of the mapping process. The assessment evaluator 218 may associate time traces 1202-1205 with the leaf nodes 408-411. The assessment evaluator 218 may evaluate the non-leaf nodes in the following order: 412, 416, 424, 414, 418, 420, 422, and 406. For example, for a trigger-response type of assessment, the assessment evaluator 218 may start processing that portion of the expression tree that corresponds to the trigger portion of the assessment, e.g., the branch of the tree that corresponds to the trigger. The assessment evaluator 218 may then process that portion of the tree that corresponds to the response portion of the assessment.

In other embodiments, the assessment evaluator 218 may process the nodes in other orders. The assessment evaluator 218 may evaluate the entire tree 400 at each time increment of the time-series data 204.

To process the leaf nodes, the assessment evaluator 218 may obtain, e.g., read, the values of the variables from the time-series data 204 associated with the respective leaf nodes. For example, for the leaf nodes 408 and 410, the assessment editor 218 may read the value of the variable from the time-series data 204 that was associated with the variable S of the assessment. As noted, the assessment evaluator 218 may read the value of the associated variable at each time series increment of the time-series data 204. For the leaf nodes 409 and 411, the assessment evaluator 218 may access the values of the variables that were associated with the variables P and Q. As indicated, these values may be constants. The assessment evaluator 218 may then perform the computation associated with the non-leaf, parent nodes to the leaf nodes utilizing the time-series or other data associated with the leaf nodes as operands for the computation. The result of the computation associated with a non-leaf parent node is an intermediate result of the expression. Traversing the expression tree 400 in a bottom up direction, the assessment evaluator 218 may then perform the computations associated with the next higher non-leaf nodes utilizing the intermediate results as operands for the computation.

Referring to the expression tree 400 of FIG. 12, for non-leaf node 412, the assessment evaluator 218 may compute the absolute value of the value for S from the time-series data 204 and annotate the node 412 with a timed trace 1206 encoding the result. The assessment evaluator 218 may next determine whether the computed absolute value of S is greater than the constant P for non-leaf node 416 and annotate the node 416 with a timed trace 1208 encoding the result, e.g., true or false. The assessment evaluator 218 may compute an intermediate result for non-leaf node 424 and annotate the node 424 with a timed trace 1210 encoding the result.

The assessment evaluator 218 may also compute intermediate results for the non-leaf nodes of the branch 404 of the expression tree 400. For example, for non-leaf node 414, the assessment evaluator 218 may compute the absolute value of S and annotate the node 414 with a timed trace 1212 encoding the result. For the non-leaf node 418, the assessment evaluator 218 may determine whether the computed absolute value is less than the constant Q and annotate the node 418 with the result, e.g., a Boolean-valued trace 1214 where the high value is true and the low value is false. The assessment evaluator 218 may compute intermediate results for the non-leaf nodes 420 and 422 and annotate the nodes 420 and 422 with timed traces 1216 and 1218 encoding the results. The intermediate results for the non-leaf nodes 420 and 422 may be true or false.

The assessment evaluator 218 may compute a result for the root node 406. This result may be the overall result for the assessment, e.g., pass, fail, or untested. The untested result may be a state that accounts for timed window operators, such as the operators associated with nodes 420 and 422, that require one or more buffers to compute the overall result for the assessment. The assessment evaluator 218 may utilize the intermediate results computed for the non-leaf nodes 416 and 422 to compute the overall result. As described, in some embodiments, an overall result may be computed in two steps. First, intermediate assessment values may be computed at the time steps, e.g., at each time step. Second, a logical conjunction of the computed intermediate assessment values may be performed to produce the overall result. For example, the computation for the root node 406 may be a logical OR operation. Thus, the overall result for the assessment will be true if either node 424 or node 422 evaluates to true. The assessment evaluator 218 may annotate the node 406 with a timed trace 1220 of the overall result, e.g., true, false, or untested. It may also store the overall result at the final results 230 portion of the memory module 226.

In some embodiments, the assessment evaluator 218 may keep track of elapsed time from some event, such as the trigger portion of an assessment becoming true, to determine whether the assessment passes or fails at a current time increment of the time-series data 204 based on an intermediate result computed at the current time increment.

The plotting tool 220 may generate one or more plots of the time-series data 204, the intermediate results, and/or the overall results determined or computed by the assessment evaluator 218. The plotting tool 220 may access the time-series data 204, the intermediate results 226 and/or the overall results 228 stored at the memory module 224 and generate the one or more plots. Plotting may be done incrementally while streaming and evaluating assessments. In some embodiments, the plotting tool 220 may present the time-series data 204, the intermediate and/or the overall results in a form having the same structure that was used to author an assessment to aid in analysis, such as debugging.

In some embodiments, portions of an expression tree presented on a display may be iteratively folded and unfolded to aid in understanding. For example, in response to user selection of command buttons or other graphical affordances, the UI engine 1402 may fold or unfold portions of an expression tree.

Figure 13:
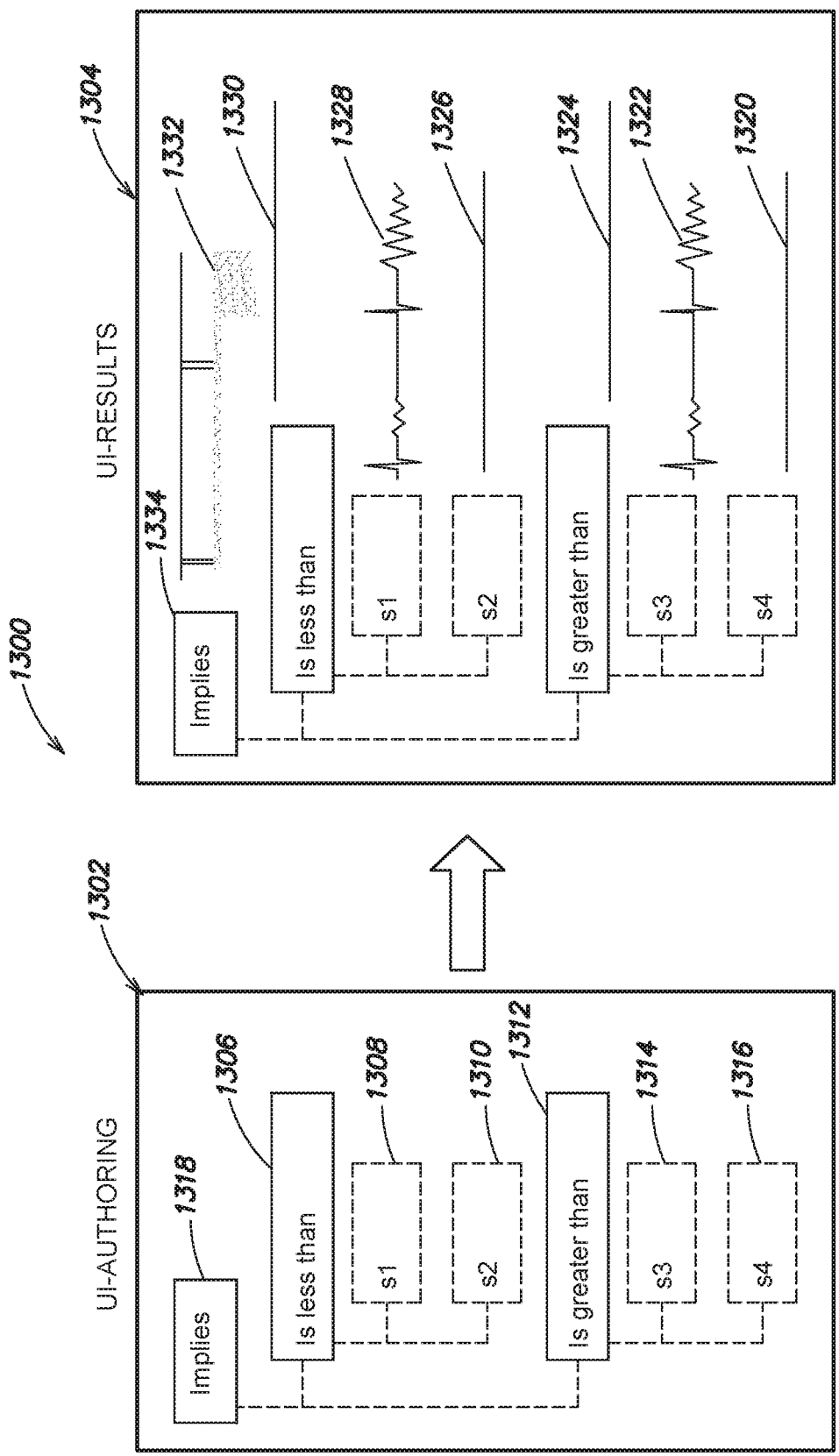
FIG. 13 is a schematic illustration of example plots of assessment arranged in a same structure as an authored assessment in accordance with one or more embodiments.

FIG. 13 is a schematic illustration of an example comparison 1300 of the structure 1302 of an assessment and the structure 1304 of results generated for that assessment in accordance with one or more embodiments. The assessment may apply the less than relational operator as indicated at entry 1306 to a signal s1 and a constant s2 indicated at entries 1308 and 1310. The assessment may further apply a greater than relational operator as indicated at entry 1312 to a signals s3 and a constant s4 indicated at entries 1314 and 1316. The assessment may further include an imply operator as indicated at entry 1318. Implies (a→b) is an alias, e.g., a template, for (¬a\/b).

In some embodiments, implication (a→b) is implemented using a stricter semantics $(a \overset{*}{\rightarrow} b)$:

$$\forall t \in \mathbb{R}, \vartheta\big((a \overset{*}{\rightarrow} b), t\big) = \begin{cases} \text{true} & \text{if } \vartheta(a, t) = \text{true} \wedge \vartheta(b, t) = \text{true} \\ \text{false} & \text{if } \vartheta(a, t) = \text{true} \wedge \vartheta(b, t) = \text{false} \\ \text{untested} & \text{if } \vartheta(a, t) = \text{false} \end{cases}$$

In some embodiments, the structure 1302 of the assessment may be defined by the wizard or other tool that guided a natural language definition of the assessment.

The plotting tool 220 may arrange the presentation of the results of the evaluation of the assessment using the same structure as used to author the assessment. For example, the plotting tool 220 may align the plots of intermediate results with the respective entries of the structure 1302 used to author the assessment. For example, a plot 1320 of the constant s4 may be aligned with the entry 1316 that identified the constant s4. A plot 1322 of the signal s3 may be aligned with the entry 1314 that identified the signal s3. A plot 1324 of the results of the greater than operation of the expression may be aligned with the entry 1312 for that relational operator. A plot 1326 of the constant s2 may be aligned with the entry 1310 that identified the constant s2. A plot 1328 of the signal s1 may be aligned with the entry 1308 that identified the signal s1. A plot 1330 of the results computed for the less than operation of the expression may be aligned with the entry 1306 for that relational operator. A plot 1332 of the results computed for the implies operation of the expression may be aligned with the entry 1318 for that operator.

In some embodiments, the plotting tool 220 may include a presentation 1334 of the structure of the assessment as authored in side-by-side relationship with the presentation of computed results. In some embodiments, expand and collapse buttons may be provided with the plots of results to show or hide plots, e.g., in response to user input. In response to selection of the expand and collapse buttons, the plotting tool 220 may show or hide the identified plot and the respective entry of the presentation 1334 of the structure of the assessment.

Figure 5A:
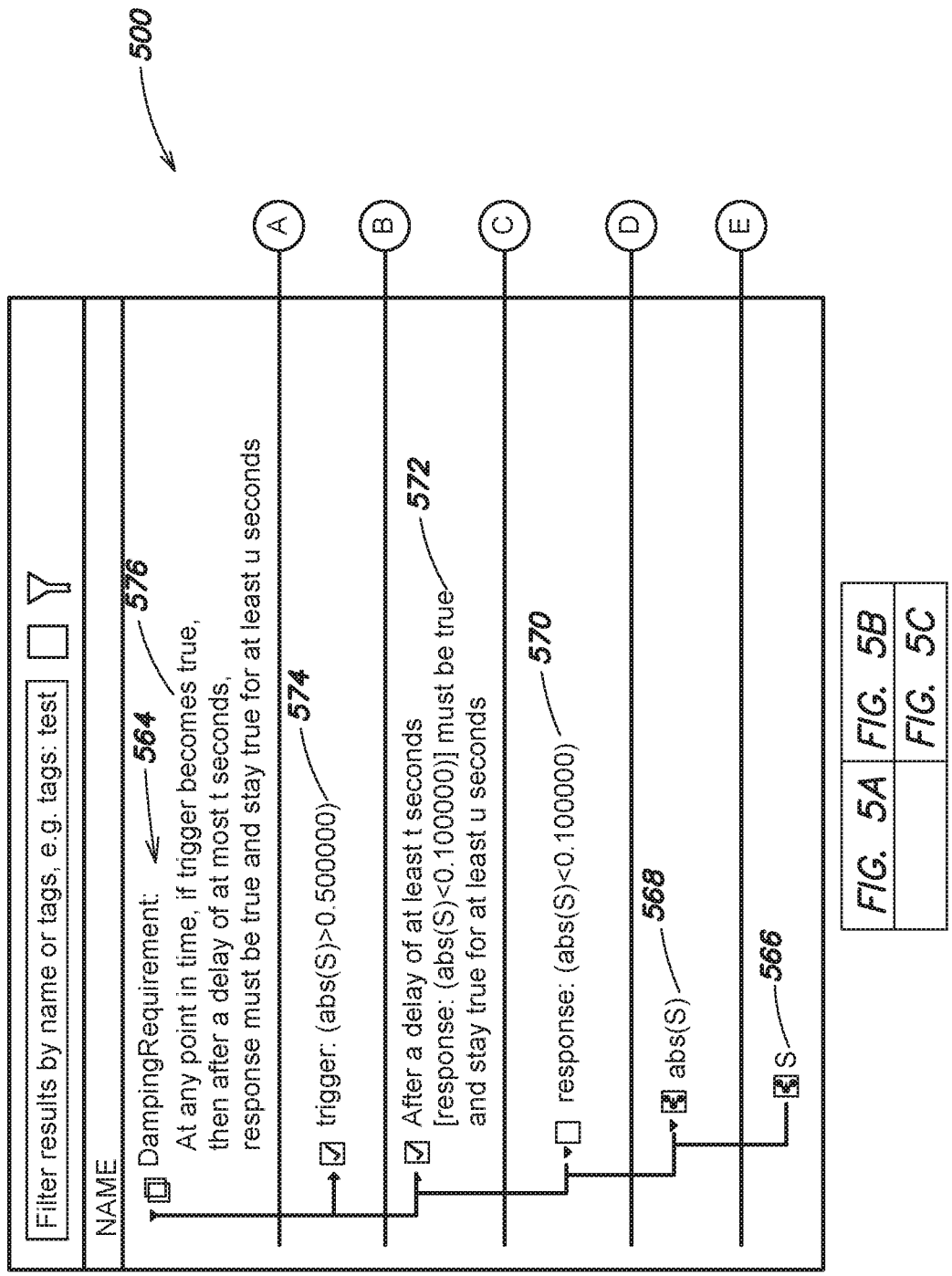
FIGS. 5A-C are partial views of an illustration of an example plot display in accordance with one or more embodiments.
Figure 5B:
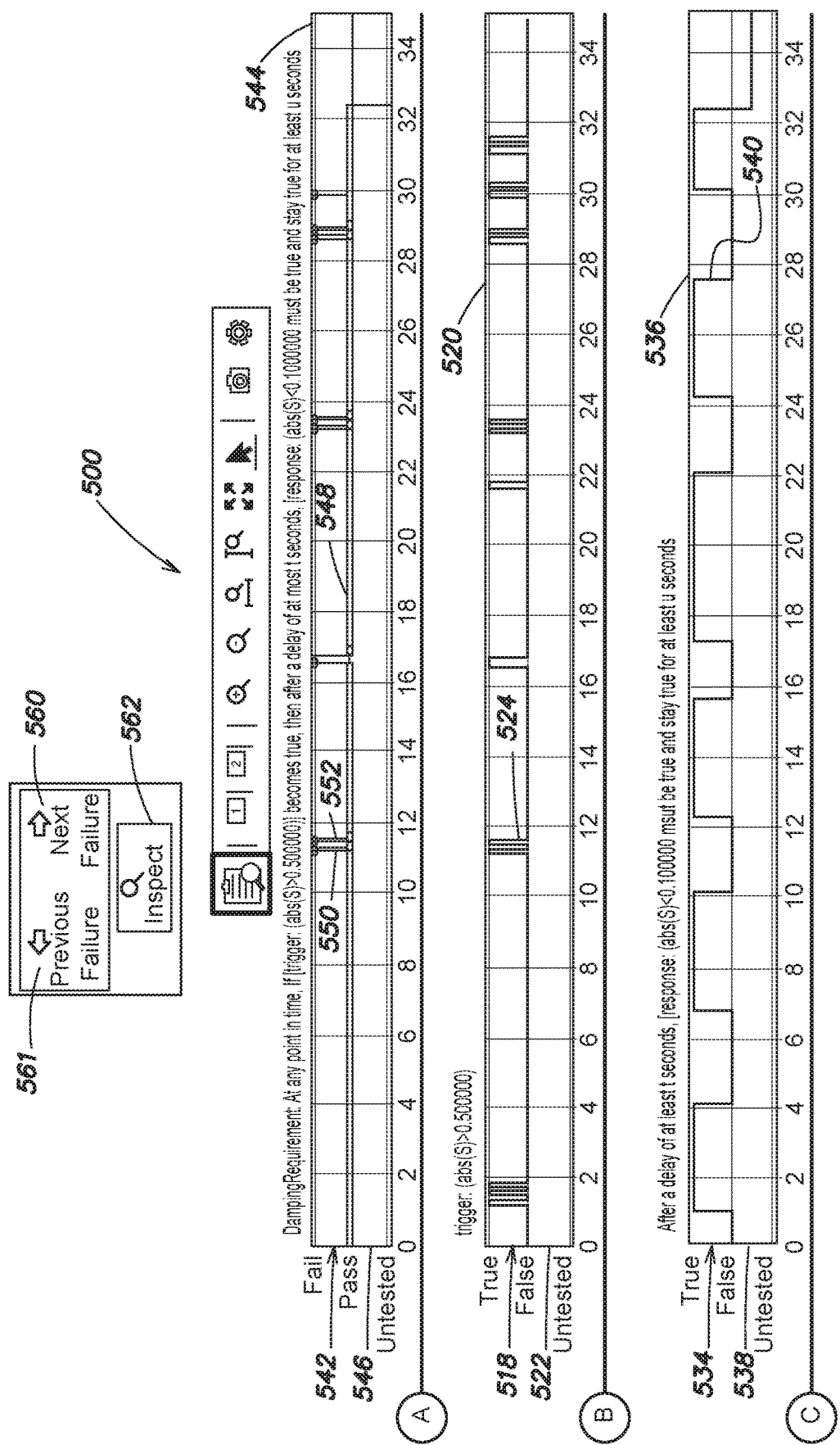
Figure 5C:
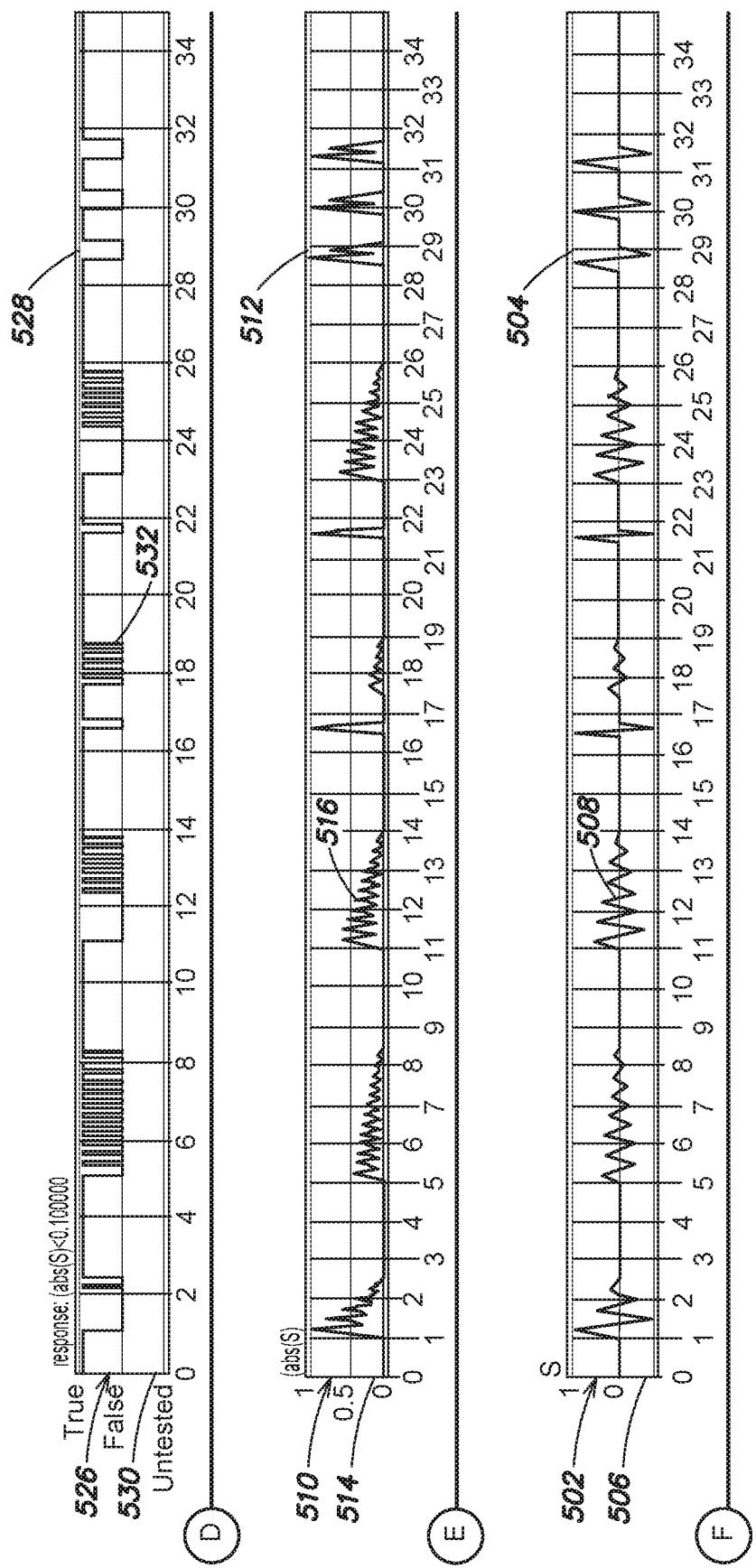

FIGS. 5A-C are partial views of an illustration of an example plot display 500 for an assessment in accordance with one or more embodiments. The plot display 500 may include one or more plots of time-series inputs to the assessment evaluation system 202, one or more plots of intermediate results, and a plot of the overall result determined for the assessment. The plots may be a function of the time of the time-series data being analyzed. As noted, the plots may be arranged in the same or similar form as the structure used to author the assessment.

The plot display 500 may be for a trigger-response type of assessment in which the trigger is the absolute value of a time-series input named S becoming greater than 0.5. The response determines whether the absolute value of S falls below 0.1 within at most 1 second and stays below 0.1 for at least 1.5 seconds.

The plot display 500 presented by the plotting tool 220 may include a plot 502 of the value of the time-series input, e.g., S, for the leaf node 410 of the expression tree 400. An x-axis 504 of the plot 502 is time and a y-axis 506 is the value of the time-series input, S. The time-series input S may be generated during execution of a simulation model and the time may be the simulation time for the model. The simulation environment may compute a value of S at each simulation time step, and each such value may be associated with the point in the simulation time at which it was computed. In other embodiments, the time-series input may be generated by a device and the time may be real time.

A trace 508 in the plot 502 represents the value of the time-series input S over at least a portion of the evaluation time, which may be simulation time or real-time.

The plot display 500 may also include a plot 510 of the absolute value of the time-series input S as associated with the non-leaf node 414 of the expression tree 400. The plot 510 may include an x-axis 512 representing the simulation time and a y-axis 514 representing the absolute value of the time-series input S. A trace 516 represents the absolute value of the time-series input S over the simulation time.

The plot display 500 may further include a plot 518 of the result of the determination whether the absolute value of the time-series input S is greater than 0.5 as associated with the non-leaf node 416 of the expression tree 400. This is a determination of the trigger portion of the assessment. The possible values for this intermediate result are true, false, and untested. The plot 518 may include an x-axis 520 representing the simulation time and a y-axis 522 representing the determination, e.g., true or false. A trace 524 represents the determination whether the absolute value of the time-series input S is greater than 0.5 over the simulation time.

The plots 502, 510, and 518 illustrate values computed or determined by the assessment evaluator 218 in a bottom up traversal of the expression tree 400 along nodes 408, 414, and 416.

The plot display 500 may include a plot 526 of the result of the determination whether the absolute value of the time-series input S is less than 0.1. This determination is the intermediate result of the assessment computed at non-leaf node 418 of the expression tree 400. The possible values for this intermediate result are True, False, and Untested. The plot 526 may include an x-axis 528 representing the simulation time and a y-axis 530 representing the determination, e.g., true or false. A trace 532 represents the determination whether the absolute value of the time-series input S is less than 0.1 over the simulation time.

The plot display 500 may include a plot 534 of the result of the determination whether the absolute value of S falls below 0.1 within at most t seconds after the trigger becomes true and stays below 0.1 for at least u seconds, where t and u are 1 and 1.5 seconds respectively. This determination is the intermediate result of the assessment computed at non-leaf node 422, which is an MTL operators of the expression tree 400. The possible values for this intermediate result are true, false, and untested. The plot 534 may include an x-axis 536 representing the simulation time and a y-axis 538 representing the determination, e.g., true, false, or untested. A trace 540 represents the determination whether the absolute value of S the falls below 0.1 within at most 1 second after the trigger becomes true and stays below 0.1 for at least 1.5 seconds over the simulation time.

The plots 526 and 534 illustrate values computed or determined by the assessment evaluator 218 in a bottom up traversal of the expression tree 400 along nodes 418 and 422.

The plot display 500 may further include a plot 542 of the overall result of the assessment. This determination is computed at the root node 406 of the expression tree. The possible values of the overall result of the assessment are True, False, and Untested. The plot 542 may include an x-axis 544 representing the simulation time and a y-axis 546 representing the determination, e.g., true, false, or untested. A trace 548 represents the determination whether, when the absolute value of a time-series input S becomes greater than 0.5, the absolute value of S falls below 0.1 within at most 1 second and stays below than 0.1 for at least 1.5 seconds over the simulation time.

In some embodiments, at least some of the plots 502, 510, 518, 526, 534, and 542 may be vertically stacked together when presented on a display such that the time axes of the plots 502, 510, 518, 526, 534, and 542 are aligned with each other. In this way, the relationships between the time-series input S, the computed intermediate results, and the overall result of the assessment may be compared against each other.

The plot 542 of the overall result shows that during the simulation time, the assessment evaluator 218 determined that the assessment was true for some time periods, false for some time periods, and untested for some time periods. For example, from simulation time 0.0 seconds to simulation time 10.0 seconds, the assessment evaluator 218 determined that the assessment was true. The plotting tool 220 may present this determination using one or more graphical affordances, such as colors, animations, etc.

The plot 518, which presents the trigger portion of the assessment, shows that the assessment evaluator 218 determined that the trigger was true on three occurrences between simulation time 0.0 seconds and simulation time 2.0 seconds. An examination of the plot 534, which presents the response portion of the assessment, shows that the assessment evaluator 218 determined that the response was also true during these occurrences at which the trigger evaluated to true. Accordingly, an examination of the plot 542 of the overall result indicates that the assessment evaluator 218 determined that the assessment evaluated to true between simulation time 0.0 seconds and simulation time 2.0 seconds.

The plot 518 further shows that the assessment evaluator 218 determined that the trigger was true on two occurrences between simulation time 10.0 seconds and 12.0 seconds. An examination of the plot 534 shows that the assessment evaluator 218 determined that the response portion of the assessment was false during the two occurrences of the simulation time between 10.0 seconds and 12.0 seconds when the trigger was true. Accordingly, an examination of the plot 542 of the overall result indicates that the assessment evaluator 218 determined that the assessment evaluated to false twice between simulation times 10.0 seconds and 12.0 seconds as indicated at 550 and 552.

In some embodiments, the plotting tool 220 may present one or more command buttons for navigating about the plot display 500 and/or providing other functionality. For example, the plotting tool 220 may present three command buttons 560-562 labeled 'Next Failure', 'Previous Failure', and 'Inspect'. In response to receiving a selection of the Next Failure button 560, e.g., from user input, the plotting tool 562 may move a cursor from a current position to a next occurrence when the assessment evaluator 218 determined that the assessment failed, moving in a direction of increasing simulation time. In response to receiving a selection of the Previous Failure button 561, the plotting tool may move the cursor from a current position to a previous occurrence when the assessment evaluator 218 determined that the assessment failed, moving in a direction of decreasing simulation time. In response to receiving a selection of the Inspect button 562, the plotting tool may annotate one or more of the plots 502, 510, 518, 526, 534, and 542, as described herein.

In some embodiments, the plotting tool 220 may combine the plots of the plot display 500 with a presentation 564 of the assessment. The presentation 564 of the assessment may include entries or elements that provide information, such as textual descriptions, of the portions, e.g., subexpressions, of the assessment associated with the plots 502, 510, 518, 526, 534, and 542.

In addition, the plotting tool 220 may arrange the plots to have the same structure as the elements of the assessment, and place the plots and respective elements in side-by-side relationship. For example, an entry 566 associated with the plot 502 may provide a description that the plot 502 is of the value of the time-series input S. An entry 568 associated with the plot 510 may provide a description that the plot 510 is of the absolute value of the time-series input S. An entry 570 associated with the plot 526 may provide a description that the plot 526 is a determination whether the absolute value of the time-series input S is less than 0.1. An entry 572 associated with the plot 534 may provide a description that the plot 534 is a determination whether the absolute value of S the falls below 0.1 within at most 1 second after the trigger becomes true and stays below than 0.1 for at least 1.5 seconds. An entry 574 associated with the plot 518 may provide a description that the plot 518 is a determination whether the absolute value of the time-series input S is greater than 0.5. An entry 576 associated with the plot 542 may provide a description that the plot 542 is a determination of the overall result of the assessment.

In addition, in response to user input, the plotting tool 220 may show or hide one or more plots. For example, plots of one or more intermediate results may be hidden to ease visualization of computed results. The plotting tool 220 may include expand and collapse arrow buttons with at least some of the entries 566-576 and/or the plots 502, 510, 518, 526, 534, and 542. In response to the selection of the expand and collapse arrow buttons, the plotting tool may show or hide the respective entry and/or plot. For example, the entries or elements may be arranged as a tree that is the same as or similar to the structure of the expression tree. In particular, the plotting tool 220 may generate a plot or trace for each node of the expression tree. There may be a one-to-one association or mapping of nodes of the expression tree to plots or traces. By operating the expand and collapse arrows, a user may select which entries and/or plots to include in the plot display 500.

In some embodiments, the plotting tool 220 may export one or more of the computed results for visualization in one or more external tools, such as the Simulink Data Inspector tool from The MathWorks, Inc. The information generated and presented by the assessment evaluation system 202 including the plot display 500 and the assessment presentation 564 can aid in debugging a simulation model or other entity that produced the time series data. As noted, the assessment evaluation system 202 may determine and present when, during the simulation time, the assessment fails. As described, the assessment evaluation system 202 may provide information useful for debugging a simulation model. For example, the assessment evaluation system 202 may provide information such as time intervals contributing to a failure for each sub-expression and traceability to model elements computing the input data. Using this information, debugging can be done using one or more features of the modeling environment, such as replay, pause, step, and/or model slicer, among others. For example, a model slice may be generated from the simulation model where the model slice includes model elements contributing to and/or involved in the failure. A user may then evaluate, e.g., debug, the model slice.

For example, breakpoints may be set to pause execution of the simulation model at the simulation time steps at which the assessment failed. The simulation model may then be re-executed. When the simulation time steps at which the assessment failed are reached, execution of the simulation model is paused due to the breakpoints. The state of the simulation model at this simulation time step may be evaluated. In some embodiments, the simulation environment may be configured to capture and store the simulation state of the simulation model at the simulation time steps at which the assessment fails. The simulation state of a simulation model may represent all or some portion of the information associated with a snapshot of the simulation of the model where the snapshot is taken at one or more simulation time steps. This information may include the values computed for the model and for elements of the model, e.g., signals, block parameters, chart states, the continuous and discrete states of the model elements included in the model, the simulation time step, the simulation time, and the simulation start time. The simulation state may include previous state values, previous simulation time state output values, and current time step input values. Exemplary simulation states include the SimState and ModelOperatingPoint data objects of the Simulink® simulation environment.

In some embodiments, execution of the simulation model may proceed from a breakpoint in a step-by-step manner. For example, the Simulink Debugger from The MathWorks, Inc. may be used to set breakpoints and perform other debugging operations with regard to a simulation model.

In some embodiments, the plotting tool 220 may be configured to include or apply one or more graphical affordances to the plot display 500. The one or more graphical affordances may aid a user in determining why an assessment failed at one or more points in time of the time-series data.

As noted, a user-defined assessment may include one or more temporal characteristics or features. When creating an expression for such an assessment, the expression builder 218 may utilize one or more MTL operators to implement the temporal characteristics or features of the assessment. Suppose the assessment evaluator 218 analyzes time-series data and determines that the assessment fails at a given point in time. In some embodiments, the plotting tool 220 may add one or more graphical affordances to the plot display 500 to indicate which values from the time-series input data and/or the intermediate results could have contributed to the assessment failing at the given point in time. In this way, a user may focus debugging or other efforts to those values to understand why the assessment failed. Without such a feature, a user may be left solely with the indication that the assessment failed, but no information as to what may have contributed to that failure.

In some embodiments, the assessment evaluator 218 may compute a time range for the time-series input data and the intermediate results of an assessment where the computed time range includes all values of the time series input data and intermediate results that could have contributed to any given failure of the assessment. If a sub-expression is reused in an expression, multiple time ranges may be computed. The time ranges may define bounds for the time-series input data and the intermediate results where only values within these bounds could have contributed to the given failure of the assessment. Values of the time-series input data and/or the intermediate results that are outside of these bounds could not have contributed to the given failure of the assessment. The plotting tool 220 may utilize one or more graphical affordances to present the computed time ranges or bounds on the plot display 500.

The time ranges may be computed once per assessment. The time ranges may then be used with a time of interest in the computed results for the assessment, e.g., for a simulation run of a model. To compute the time ranges, the assessment evaluator 218 may perform a top-down traversal of the expression tree 400.

As noted, nodes of the expression tree may be evaluated at each point in time of the time-series input data. In addition, the intermediate results associated with at least some of the nodes of the expression tree may be evaluated over a time interval, such as nodes associated with temporal modal operators. For each node of the expression tree, the assessment evaluator 218 may determine a local time interval over which the values of the respective node are evaluated as part of the evaluation of the expression for the assessment. The assessment evaluator 218 may define the local time interval for a given node by determining a minimum and a maximum or a start and end time. For nodes associated with time-series input data, constants, and point-wise operators the assessment evaluator 218 may define the local time interval as starting and ending at zero, e.g., [0,0]. For constants and time-point wise operators, these are at the point of evaluation, i.e., [0,0] time units around. For eventually and always operators with ranges [0,t], it means up to t time units later than the time of evaluation, the intermediate result can affect the evaluation of the parent node at that given evaluation time. For nodes associated with temporal characteristics or features of an assessment, such as nodes implementing temporal modal operators, the assessment evaluator 218 may define the local time interval as starting at zero and ending at the time associated with the MTL operator. For example, for the non-leaf node 420 which is associated with the MTL globally operator that evaluates the time-series data to the value of the variable u, the assessment evaluator 218 may define the local time range as starting at zero and ending at u, e.g., [0,u]. For the non-leaf node 422, which is associated with the MTL eventually operator that evaluates the time-series data to the value of the variable t, the assessment operator may define the local time interval as starting at zero and ending at t, e.g., [0, t].

The assessment evaluator 218 may then determine time ranges for the nodes of the expression tree. The time ranges may be a function of the local time intervals determined for the nodes. For example, the assessment evaluator 218 may determine the time ranges by summing the local time intervals during top down traversal, which may be opposite to the bottom up traversal, from the root node to the leaf nodes of the expression tree.

Figure 6:
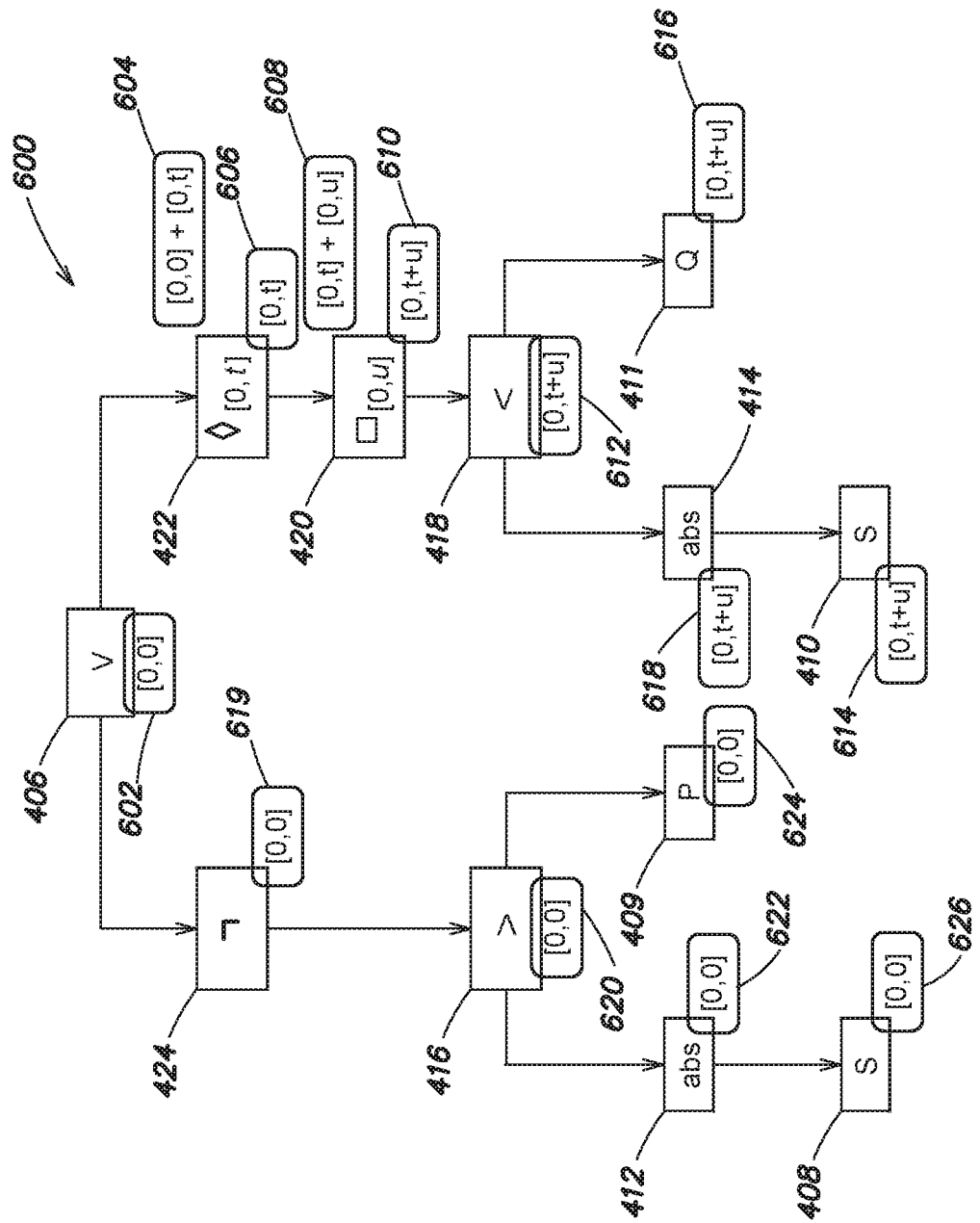
FIG. 6 is an illustration of example processing associated with an expression tree in accordance with one or more embodiments.

FIG. 6 is a schematic illustration of an example expression tree 600 illustrating the determination of local time intervals and time ranges in accordance with one or more embodiments. The expression tree 600 is similar to the tree 400 and includes the root node 406, the leaf nodes 408-411, and the non-leaf nodes 412-422. The local time interval associated with the root node 406 may be [0,0] and this value may also be specified as the time range for the root node, as indicated at 602. Moving in a downward traversal of the tree 600, the assessment evaluator 218 may next process the non-leaf node 422, which is a child node of the root node 406. The local time interval for the non-leaf node 422 may be [0,t], and the assessment evaluator 218 may perform a set addition this local time interval with the local time interval determined for the parent node, e.g., [0,0], as indicated at 604. The assessment evaluator 218 may associate the result of the sum operation, e.g., [0,t], as the time range for the non-leaf node 422, as indicated at 606.

Continuing the downward traversal of the tree 600, the assessment evaluator 218 may next process the non-leaf node 420, which is the child node of node 422. The local time interval for non-leaf node 420 may be [0,u], and the assessment evaluator 218 may sum this local time interval value with the time range computed for the parent node, e.g., [0,t], as indicated at 608. The assessment evaluator 218 may associate the resulting value, e.g., [0,t+u], as the time range for the node 420, as indicated at 610. The assessment evaluator 218 may next process the non-leaf node 418, which is the child node of node 420. The local time interval of the non-leaf node 418 may be [0,0], and the assessment evaluator 218 may sum this local time interval with the time range computed for the parent node, e.g., [0,t+u]. The assessment evaluator 218 may associate the resulting value, e.g., [0,t+u], as the time range for the node 418, as indicated at 612. Because the local time intervals of nodes 410, 411, and 414 are each [0,0], the assessment evaluator 218 computes time ranges of [0,t+u] for these nodes, as indicated at 614, 616, and 618.

Returning to the root node 406, the assessment evaluator 218 may process nodes 424, 416, 412, 409, and 408 in a downward traversal of the tree 600. Because the local time intervals of each of the nodes 424, 416, 412, 409, and 408 is [0,0], the time ranges computed for each of these nodes 424, 416, 412, 409, and 408 is also [0,0]. The assessment evaluator 218 may associate the computed time ranges, e.g., [0,0], with the nodes 424, 416, 412, 409, and 408, as indicated at 619, 620, 622, 624, and 626.

Designating Cones of Influence

Figure 7:
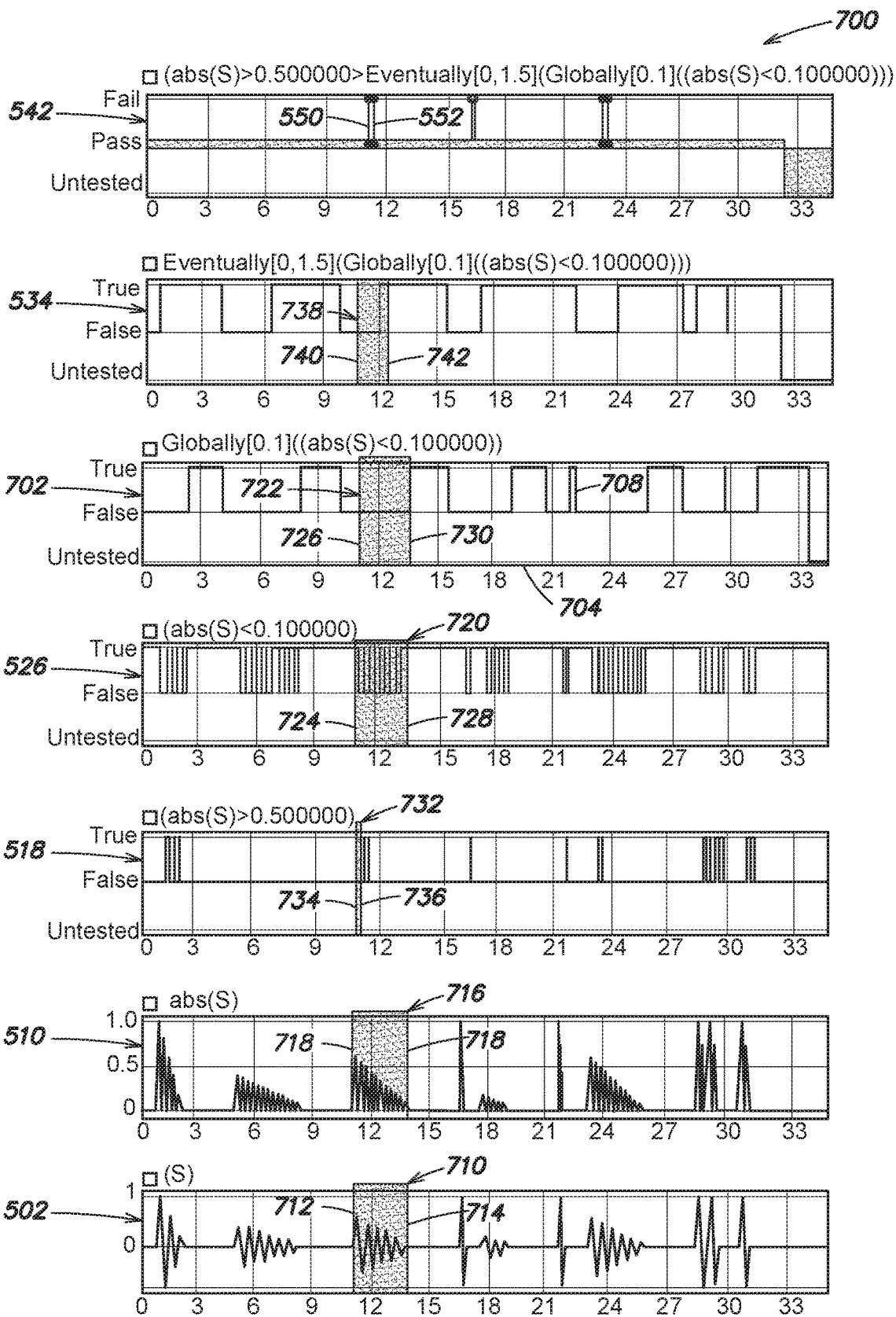
FIG. 7 is an illustration of an example plot display in accordance with one or more embodiments.

FIG. 7 is a schematic illustration of an example plot display 700 in accordance with one or more embodiments. The plot display 700, which is similar to the plot display 500 (FIGS. 5A-C), includes the plot 542 of the overall result of the assessment. In addition, the plot display 700 includes the plot 502 of the time-series input S as associated with the leaf node 410 and the plot 510 of the intermediate result, the absolute value, of the time-series input S as associated with the non-leaf node 414. The plot display 700 further includes the plots 518, 526, and 534.

The plot display 700 also includes a plot 702 of the intermediate result from determination whether the absolute value of S falls below 0.1 within 1 second after the trigger becomes true as associated with the non-leaf node 420. The possible values for this intermediate result are true, false, and untested. The plot 702 may include an x-axis 704 representing the simulation time and a y-axis 706 representing the determination, e.g., true, false, or untested. A trace 708 represents the result whether the absolute value of S falls below 0.1 within 1 second after the trigger becomes true as determined by the assessment evaluator 218.

In response to user input, the plotting tool 220 may apply one or more graphical affordances to the plot display 700 to designate portions of the plots that contain the input values and the intermediate results that could possibly have contributed to a given fail determination of the assessment. The plotting tool 220 may utilize one or more graphical affordances to identify the portions, which may be referred to as cones of influence. A non-exhaustive list of exemplary graphical affordances includes shading, coloring, shadows, blinking, animation, shimmer, and sparkle.

The cones of influence for each plot may have starting points, and the sizes of the cones of influence may correspond to the time ranges computed for the nodes of the expression tree, e.g., the time ranges computed in FIG. 6. The plotting tool 220 may place the starting points of the cones of influence for each plot at the time at which the trigger portion of the failed assessment 550 became true. If the determined time range is [0,0] for a node, the plotting tool 218 may create a cone of influence with a width of a single time increment. If the determined time range is [0,2], the plotting tool may create a cone of influence with a width of two seconds, and so on. It should be understood that other units of time besides seconds may be used, such as microseconds, minutes, etc.

Referring to FIG. 7, suppose the user selects the first fail occurrence 550 of the assessment as indicated in the plot 542. The plotting tool 220 may present cones of influence on one or more of the plots of the input data and the intermediate results that indicate which sets of values may have contributed to the first fail occurrence 550 of the assessment. Based on the determination made by the assessment evaluator 218 for the non-leaf node 416 which is associated with the trigger portion of the assessment, the assessment evaluator 218 may determine that, for the first fail occurrence 550, the trigger portion of the assessment became true at 11.0 seconds simulation time. Accordingly, the cones of influence created by the plotting tool 220 may start at the simulation time of 11.0 seconds.

The local time range determined for the leaf node 410 of the expression tree 600 is [0,2.5]. The plotting tool 220 may present a cone of influence 710 (FIG. 7) at the plot 502. As noted, the graphical affordance used for the cone of influence may be shading. The plotting tool 220 may present the cone of influence 710 starting at the simulation time of 11.0 seconds and the cone of influence 710 may extend for 2.5 seconds. The cone of influence 710 may thus have a starting edge 712 at the simulation time of 11.0 seconds and an ending edge 714 at 13.5 seconds, i.e., 11.0+2.5. The set of values of the time series input S that may have contributed to the first fail occurrence 550 are within the cone of influence 710. Values of the time series input S that are outside of the cone of influence 710, for example values at simulation times 8.0 seconds, 10.0 seconds, 14.0 seconds, etc., could not have contributed to the first fail occurrence 550.

The plotting tool 220 may present a cone of influence 716 at the plot 510, which is associated with the non-leaf node 414. The time range determined for the non-leaf node 414 is also [0,2.5]. Similar to the cone of influence 710 for the plot 502, the cone of influence 716 for the plot 510 has a starting edge 718 at the simulation time 11.0 and an ending edge 718 at the simulation time of 13.5 seconds. The set of intermediate results computed for the non-leaf node 414 that are within the cone of influence 716 may have contributed to the first fail occurrence 550. Intermediate results computed at simulation times outside of the cone of influence 716 could not have contributed to the first fail occurrence 550.

The plotting tool 220 may present cones of influence 720 and 722 for the plots 526 and 702, respectively. The plots 526 and 702 present the intermediate results computed for non-leaf nodes 418 and 420, respectively. As with the plots 502 and 510, the time ranges determined for the non-leaf nodes 418 and 420 are [0,2.5]. The plotting tool 220 may thus present the cones of influence 720 and 722 with starting edges 724 and 726 at the simulation time of 11.0 and ending edges 728 and 730 at the simulation time of 13.5 seconds.

The plot 518 is associated with the non-leaf node 416, which is the determination of the trigger portion of the assessment. The time ranges determined for the non-leaf node 416 is [0,0]. The plotting tool 220 may present a cone of influence 732 for the plot 518 with a starting edge 734 at the simulation time of 11.0 seconds. In some embodiments, the plotting tool 220 may use a width of one time increment of the time series data for cones of influence associated with time ranges of [0,0], so that these cones of influence are visible on the plot display 700. Suppose the time increment of the time series data is 0.1 seconds. The cone of influence 732 may thus have an ending edge 736 at 11.1 seconds. In other embodiments, the plotting tool 220 may use a minimum width for cones of influence associated with time ranges of [0,0].

The plotting tool 220 may present a cone of influence 738 at the plot 534, which is associated with the non-leaf node 422. The time range determined for the non-leaf node 422 is [0,1.5]. The cone of influence 738 for the plot 534 may include a starting edge 740 at the simulation time 11.0 and an ending edge 742 at the simulation time of 12.5 seconds, e.g., 11.0+1.5. The set of intermediate results computed for the non-leaf node 422 that are within the cone of influence 738 may have contributed to the first fail occurrence 550.

Intermediate results computed at simulation times outside of the cone of influence 738 could not have contributed to the first fail occurrence 550.

The presentation of the cones of influence 710, 716, 720, 722, 732, and 738 may aid in debugging the cause of the first fail occurrence 550 of the assessment. While prior systems may have been able to identify that failures of assessments occurred, the cones of influence of the present disclosure identify the sets of both input data and intermediate results that could have contributed to a given failure of the assessment. To determine what caused a specific failure, an analysis of the sets of values within the cones of influence may be performed. There is no need to analyze values outside of the cones of influence since they could not have contributed to the specific failure under consideration As described, the cones of influence may provide automatic highlighting of one or more regions that contribute to a failure of the assessment.

The plotting tool 220 may present cones of influence for other failures of the assessment. For example, in response to a selection of another failure, such as the second fail occurrence 552, the plotting tool 220 may present one or more cones of influence on one or more of the plots 502, 510, 518, 526, 534, and 702. These new cones of influence may identify the sets of values of the input data and the intermediate results that could have contributed to the second fail occurrence 552.

Marking Values Causing Failures

Within a given cone of influence, one or more of the values of the respective input data or intermediate results may have resulted in the respective failure of the assessment. In some embodiments, the assessment evaluator 218 may identify such values and the plotting tool 220 may apply graphical affordances to indicate the occurrence of these values in one or more of the plot displays.

Suppose, the plotting tool 220 receives an indication, e.g., from a user, to identify one or more of the values that resulted in the first fail occurrence 550 of the assessment.

Figure 8:
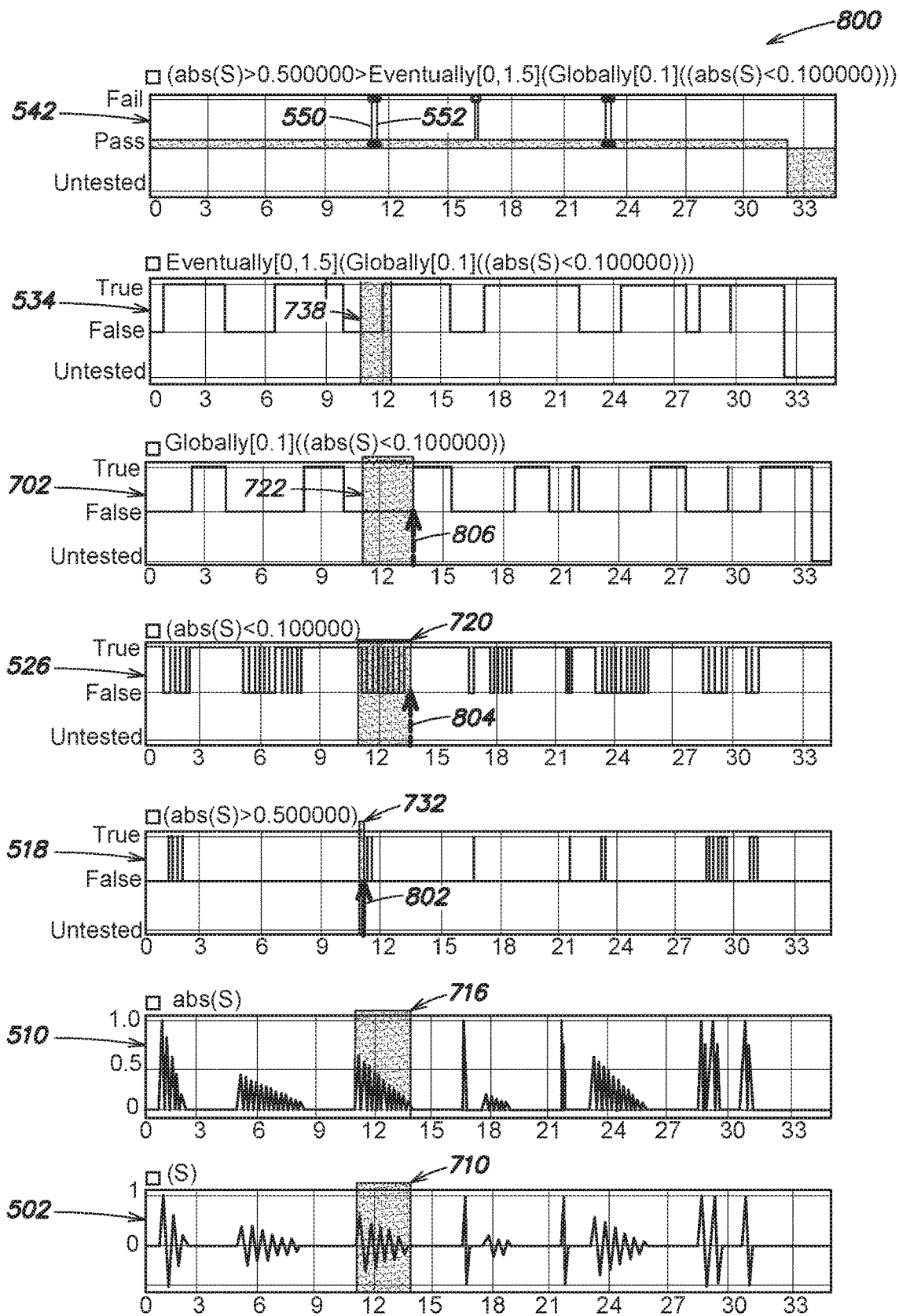
FIG. 8 is a schematic illustration of an example plot display in accordance with one or more embodiments.

FIG. 8 is a schematic illustration of an example plot display 800 in accordance with one or more embodiments. The plot display 800, which is similar to the plot display 700 (FIG. 7), includes the plots 502, 510, 518, 526, 534, 542, and 702, and the cones of influence 710, 716, 720, 722, 732, and 738. The plotting tool 220 may apply a graphical affordance that marks at least one of the values within the sets of values identified by the cones of influence 710, 716, 720, 722, 732, and 738, that resulted in the first fail occurrence 550 of the assessment.

Referring to the plot 518, the plotting tool 220 may apply a graphical affordance, e.g., a solid arrow 802, that marks a value on the plot 518 that resulted in the first fail occurrence 550. The solid arrow 802 may indicate when the trigger portion of the assessment became true for the first fail occurrence 550.

Referring to the plot 526, the plotting tool 220 may apply another graphical affordance, e.g., a dashed arrow 804, that marks a value on the plot 526 that resulted in the response portion of the assessment being false for the first fail occurrence 550. Referring to the plot 702, the plotting tool 220 may apply this other graphical affordance, e.g., another dashed arrow 806, that marks a value on the plot 702 that resulted in the response being false for the first fail occurrence 550.

As with the cones of influence 710, 716, 720, 722, 732, and 738, the arrows 802, 804, 806 aid in determining what caused the first fail occurrence 550 of the assessment. It should be understood that graphical affordances may be applied to other fail occurrences, if any.

As a further example, suppose a simulation model is created to model a controller for a power window of a car. Suppose further that a requirement of the power window controller is that, if a window down button is pressed for no more than 1.0 seconds, then the controller must issue a window down command, e.g., to the motor that lowers the window, until the window is fully down, e.g., until an indication that the window is fully down is reached, which must occur within 20 seconds. The indication may be provided by an event that the window and/or the motor reached an end position. An assessment may be defined for this requirement. The expression builder 216 may create an expression for the assessment and the assessment evaluator 218 may create an expression tree for the assessment. The assessment evaluator 218 may evaluate this assessment against time-series data generated during execution of the simulation model of the power window controller. Input data for evaluating the assessment may include a down button pressed (downButtonPressed) signal, a window down command (windowDownCommand), and an end reached (endReached) signal or event.

Figure 9:
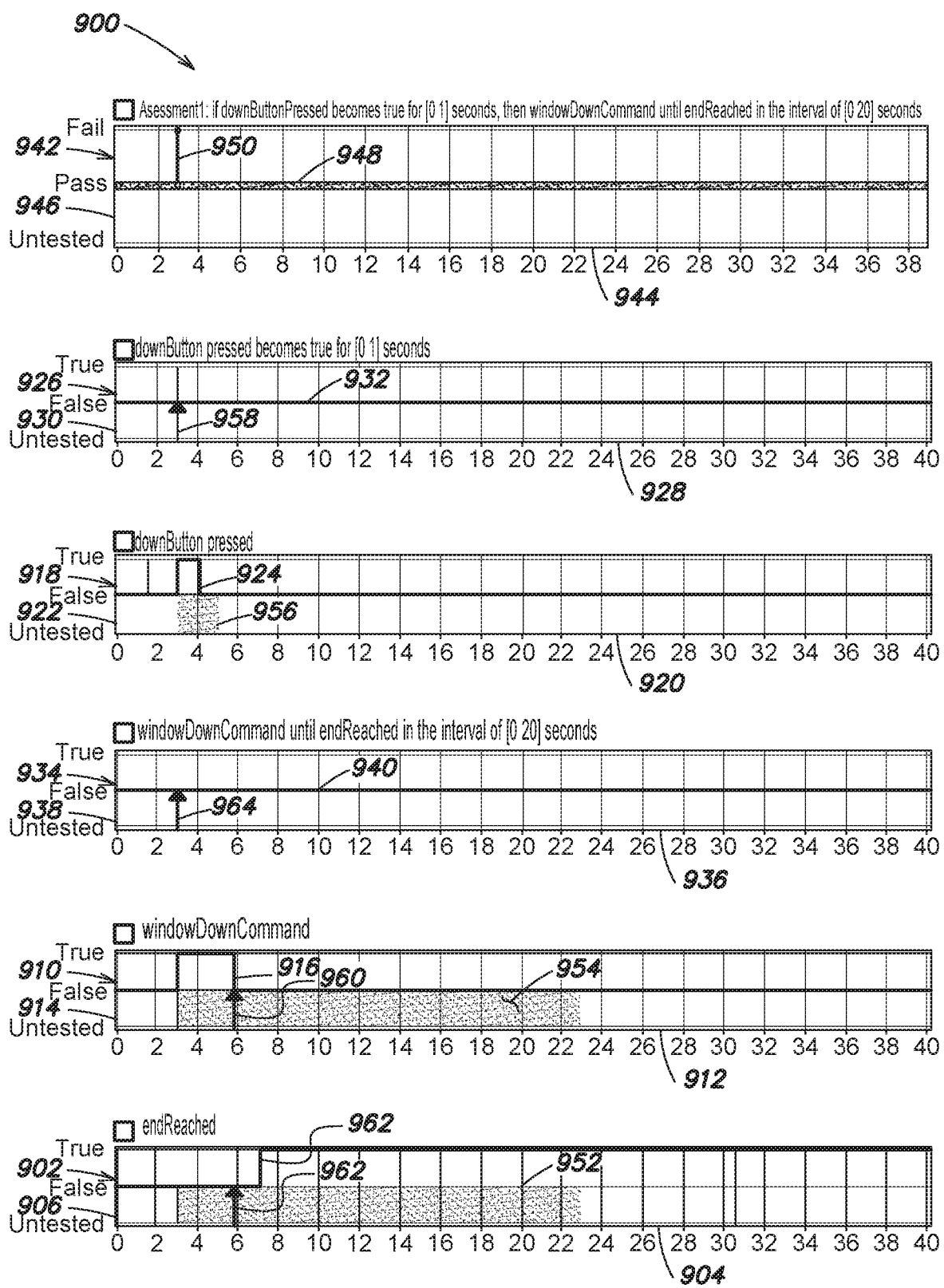
FIG. 9 is an illustration of an example plot display in accordance with one or more embodiments.

FIG. 9 is an illustration of an example plot display 900 presented by the plotting tool 220 on a display in accordance with one or more embodiments. The plot display 900 may include a plot 902 of the value of the endReached signal generated during execution of the simulation model. An x-axis 904 of the plot 902 is simulation time and a y-axis 906 is the value of the endReached signal, which may be true or false. A trace 908 represents the value of the endReached signal as generated during execution of the simulation model. The plot display 900 may also include a plot 910 of the windowDownCommand command. The plot 910 may include an x-axis 912 representing the simulation time and a y-axis 914 representing the value of the windowDownCommand command, which may be true or false. A trace 916 represents the value of the windowDownCommand command over the simulation time. The plot display 900 may further include a plot 918 of the downButtonPressed signal. The plot 918 may include an x-axis 920 representing the simulation time and a y-axis 922 representing the value of the downButtonPressed signal, which may be True or False. A trace 924 represents the value of the downButtonPressed signal over the simulation time.

The plot display 900 may also include plots of intermediate results associated with non-leaf nodes of the expression tree created for the expression in order to evaluate the assessment. Specifically, the plot display 900 may include a plot 926 of a determination whether the downButtonPressed signal is true for at least 1.0 seconds. The possible values for this intermediate result are True or False or untested. The plot 926 may include an x-axis 928 representing the simulation time and a y-axis 930 representing the determination, e.g., True or False or untested. A trace 932 represents the determination whether the downButtonPressed signal is true for at least 1.0 seconds. The plot display 900 also may include a plot 934 of a determination whether the windowDownCommand command remained true until the endReached event occurred in up to 20.0 seconds. The possible values for this intermediate result are true, false, or untested. The plot 934 may include an x-axis 936 representing the simulation time and a y-axis 938 representing the determination, e.g., true, false, or untested. A trace 940 represents the determination whether the windowDownCommand command remained true until the endReached event occurred in up to 20.0 seconds.

The plot display 900 may further include a plot 942 of the overall result of the assessment. This determination is associated with the root node of the expression tree. The possible values of the overall result of the assessment are true, false, and untested. The plot 942 may include an x-axis 944 representing the simulation time and a y-axis 946 representing the determination, e.g., True, False, or Untested. A trace 948 represents the determination whether, when the downButtonPressed becomes true for less than 1.0 seconds, then the windowDownCommand command becomes true and stays true until the endReached event occurs in up to 20.0 seconds.

A review of the trace 948 of the plot 942 shows that the assessment fails once over the simulation time, as indicated at 950. The plotting tool 220 may include graphical affordances indicating cones of influence on one or more of the plots of the plot display 900 in connection with the failure 950 of the assessment. For example, the plotting tool 220 may include a graphical affordance 952 at the plot 902 marking the cone of influence for the failure 950 of the assessment. The plotting tool 220 may include a graphical affordance 954 at the plot 910 marking the cone of influence. The plotting tool 220 may include a graphical affordance 956 at the plot 918 marking the cone of influence. As described, the cones of influence 952, 954, and 956 designate the times of the respective input data and/or intermediate results that may have contributed to the respective failure, e.g., the failure 950.

The presentation of the plot display 900 aids in diagnosing why the assessment failed during the execution of the simulation model. For example, referring to the plot 918, the trace 924 shows that the downButtonPressed signal became true at 3.0 seconds and remained true for exactly 1.0 seconds afterwards. Accordingly, as indicated by the trace 932 of the plot 926, the trigger portion of the assessment became true precisely at time 3.0. The plotting tool 220 may present a graphical affordance, such as an arrow 958, at the plot 926 indicating that the trigger portion of the assessment became true. While the value of the downButtonPressed signal that resulted in the trigger portion of the assessment becoming true occurred over simulation time 3.0 seconds to 4.0 seconds, the assessment evaluator 218 may determine that the trigger portion of the assessment became true at 3.0 seconds, e.g., the start of the downButtonPressed signal becoming true. The plotting tool 220 may thus present the arrow 958 at simulation time 3.0 seconds.

Referring to the plot 910, the windowDownCommand command becomes true at 3.0 seconds and stays true until 5.8 seconds at which time it becomes false. Referring to the plot 902, the endReached event becomes true at simulation time 7.0 seconds which is within 20.0 seconds from 3.0, but later than the simulation time at which the windowDownCommand command becomes false, which is 5.8 seconds. In other words, the windowDownCommand command did not remain true until the endReached event occurred, thus leading to the assessment failing. The plotting tool 220 may present additional graphical affordances marking one or more input values and/or intermediate results that led to the failure 950 of the assessment. For example, the plotting tool 220 may present an arrow 960 at the plot 910. The plotting tool 220 may place the arrow 960 so that it marks the point along the trace 916, e.g., 5.8 seconds, at which the windowDownCommand command becomes false, even though the endReached event is not yet true. The plotting tool 220 also may present an arrow 962 at the plot 902. The plotting tool 220 may place the arrow 962 so that it marks the point along the trace 908, e.g., 5.8 seconds, at which the endReached event is still false even though the windowDownCommand command has become false.

The plotting tool 220 may present an arrow 964 at the plot 934 that marks the point determined by the assessment evaluator 218 at which the response portion of the assessment is false resulting in the failure 950 of the assessment. As indicated, the assessment evaluator 218 may determine that the response portion of the assessment that results in the failure 950 of the assessment occurs at 3.0 seconds.

Reports

The report generator 222 may generate one or more reports following the evaluation of the assessment.

Figure 10:
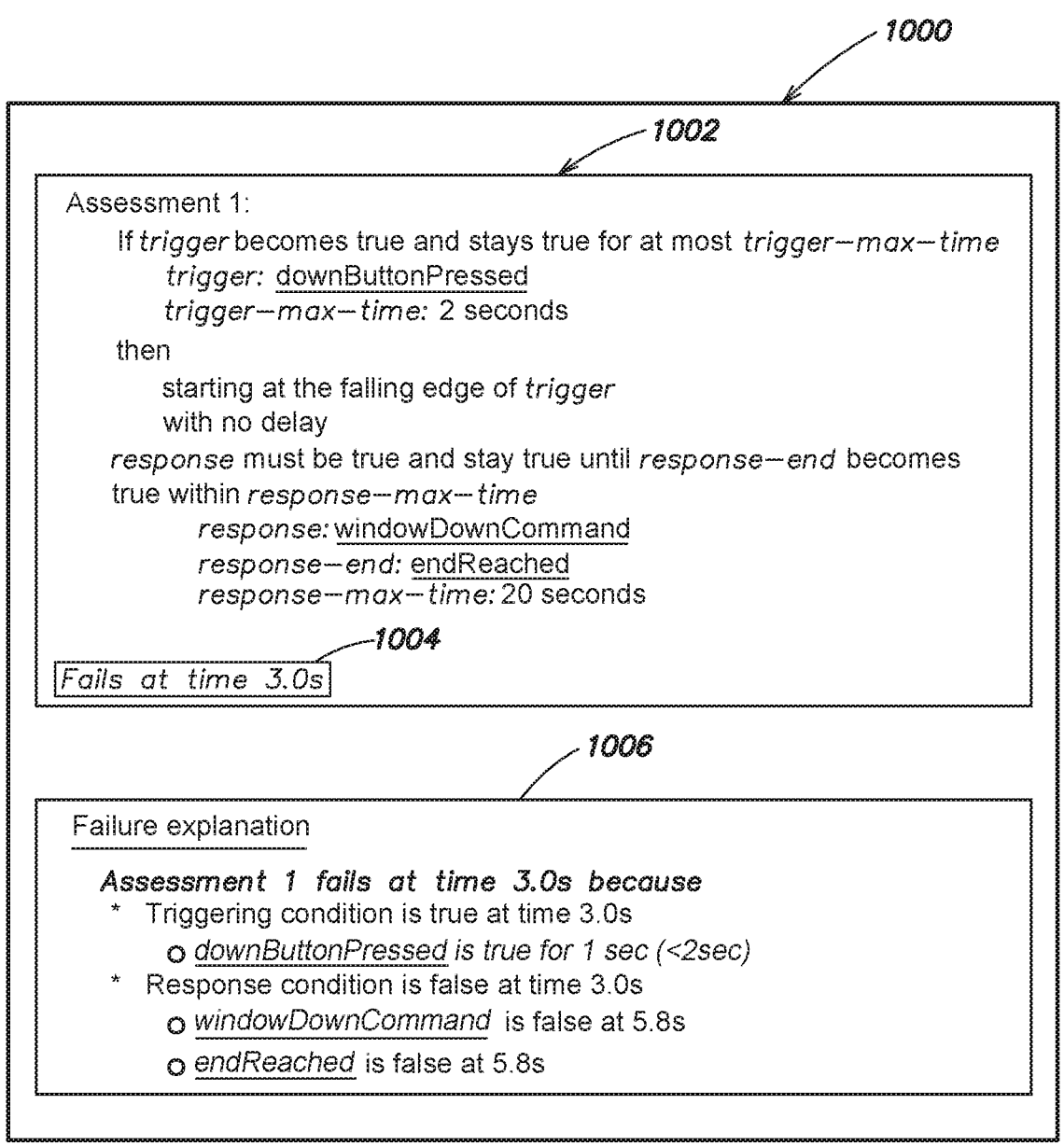
FIG. 10 is an illustration of an example report in accordance with one or more embodiments.

FIG. 10 is an illustration of an example report 1000 in accordance with one or more embodiments. The report 1000 may include a portion 1002 that presents a textual description of the assessment. The report generator 222 may include an entry 1004 in the portion 1002 indicating that the assessment failed. The report generator 222 may include a graphical affordance, such as entry 1004, indicating the time at which the assessment failed. The report 1000 may include another portion 1006 that presents information generated by the assessment evaluation system 202 explaining why the assessment failed. As explained in the portion 1006, the assessment failed because when the trigger portion of the assessment became true, the windowDownCommand command became false before the endReached event became true. In some embodiments, the report generator 222 may generate the report 1000 following the analysis of the time-series data 204. In other embodiments, the report generator 222 may generate and/or update the report 1000 during the analysis of the time-series data as failures of the assessment are detected.

The report generator 222 may include one or more elements in the report 1000 that link to the plots, such as the plots of the plot display 900, and/or to the simulation model producing the time-series data 204. For example, in response to selection, e.g., by a user, of the entry 1004, the report generator may open at least that portion of the plot display 900 corresponding to the failure, e.g., at time 3.0 seconds. In addition, parts of the portion 1006, such as the reporting that the trigger condition is true and/or that the response condition is false may be linked to the respective portions of the plots of the plot display 900. In addition, the portion 1006 indicating that the windowDownCommand is false at time 5.8 s may be linked to the portion of the simulation model that computes the windowDownCommand.

In some embodiments, the one or more reports may include additional information, such as one or more graphical depictions of a failure, such as a snapshot.

FIG. 20 is an illustration of an example graphical depiction 2000 of a failure of an assessment in accordance with one or more embodiments. The graphical depiction 2000 or portions thereof may be included with and/or accessible from the report 1000 (FIG. 10). The graphical depiction 2000 may include an expected trace 2002 and an actual trace 2004. The expected trace 2002 may illustrate a signal that passes the assessment. The actual trace 2004 may illustrate the portion of the evaluated signal that failed the assessment. The expected trace 2002 may include a trigger portion 2006 and a response portion 2008. A graphical affordance, such as a line 2010 and shading 2012, may indicate a point in time of the time series data at which the assessment passed. The actual trace 2004 may include a trigger portion 2012 and a response portion 2014. A graphical affordance, such as a line 2016, may indicate a point in time of the actual time series data at which the assessment failed.

Buffer Size Determination

In some cases, buffers may need to be established for operations associated with one or more nodes of an expression tree. For example, buffers may be needed to store data points when evaluating globally and eventually operators. Buffers may also be needed to store one or more data points for a first operand of an operator while the second (or other) operand is being computed.

Performing real-time evaluation of assessments on time series data can overwhelm memory and/or processor resources of a data processing device, and may lead to errors or failures. For example, over time, buffers allocated at a data processing device to store the time-series data 204 and/or portions thereof may become overloaded causing the evaluation to fail. In some cases, computations performed by a processor in order to evaluate an assessment may be unbounded and may grow over time, e.g., when evaluating an assessment in a streaming mode.

In some embodiments, the buffer size determination engine 224 may determine a fixed size, e.g., bounds, for one or more buffers for storing at least a portion of the time-series data 204 and/or intermediate results associated with an expression generated for one or more assessments. That is, the buffer size determination engine 224 may determine a bound on the memory requirements. For example, the engine 224 may determine the memory requirements for each node of an expression tree, e.g., the sizes of the buffers for the nodes. The engine 224 may then sum the local buffer sizes determined for the nodes to determine an overall memory requirement or buffer size for evaluating the one or more assessments.

In order to determine an overall memory requirement, the engine 224 may determine the local time intervals and the data types associated with the nodes of the expression tree 400. The engine 224 may evaluate the operations of the expression tree 400 in a bottom-up traversal, e.g., starting at the leaf nodes and traversing the tree to the root node, to associate a time window to the nodes by performing a set addition of the local time interval of the current node with the time window computed for the current node's parent node(s).

Leaf nodes, nodes associated with relational operators, e.g., "less than", and non-leaf nodes associated with a logical NOT operator and an Absolute (Abs) arithmetic operator may output their data and/or compute their respective results for a time t at time t. Therefore, no buffering of data is required for such nodes. Non-leaf nodes associated with the globally and eventually operators compute a result for a time t after evaluating data within a specified window, e.g., [t+l, t+u]. Therefore, a buffer is required to store input data points for nodes associated with the globally and eventually operators. Non-leaf nodes associated with logical AND and OR operators and the Addition, Subtraction, Multiplication, and Division arithmetic operators compute a result for a time t when the values for the two operands at time t are available. If the value of one of the operands for time t is available earlier than the other operand, then a buffer is required to store the result for the operand that is available earlier.

In some embodiments, the buffer size determination engine 224 may perform a bottom-up traversal of the tree 1100 starting at the leaf nodes 408-411. For example, the buffer size determination engine 224 may determine the delays (if any) associated with the tree's nodes and sum the delays during the bottom-up traversal. Specifically, the buffer size determination engine 224 may set the value of the delay at the leaf nodes at zero, since leaf nodes do not introduce any delay. The buffer size determination engine 224 may proceed with the bottom-up traversal summing the current value of the delay (e.g., zero starting at the leaf nodes) with the delay determined for the current node. The buffer size determination engine 224 may recursively apply one or more of the following rules:

If the current node is associated with a relational operator, a logical NOT operator, or an Absolute (Abs) arithmetic operator, the delay is zero so the current delay is unchanged, e.g., current delay+0.

If the current node is associated with an eventually or a globally operator, the delay is determined by adding the size of the time interval associated with the eventually or a globally operator to the current delay, e.g., current delay+ (u−l).

If the current node is associated with an AND or OR logical operator or an Addition, Subtraction, Multiplication, and Division arithmetic operator, the delay is the larger of the delay determined for the left or right operand, e.g., max(L, R).

Figure 11:
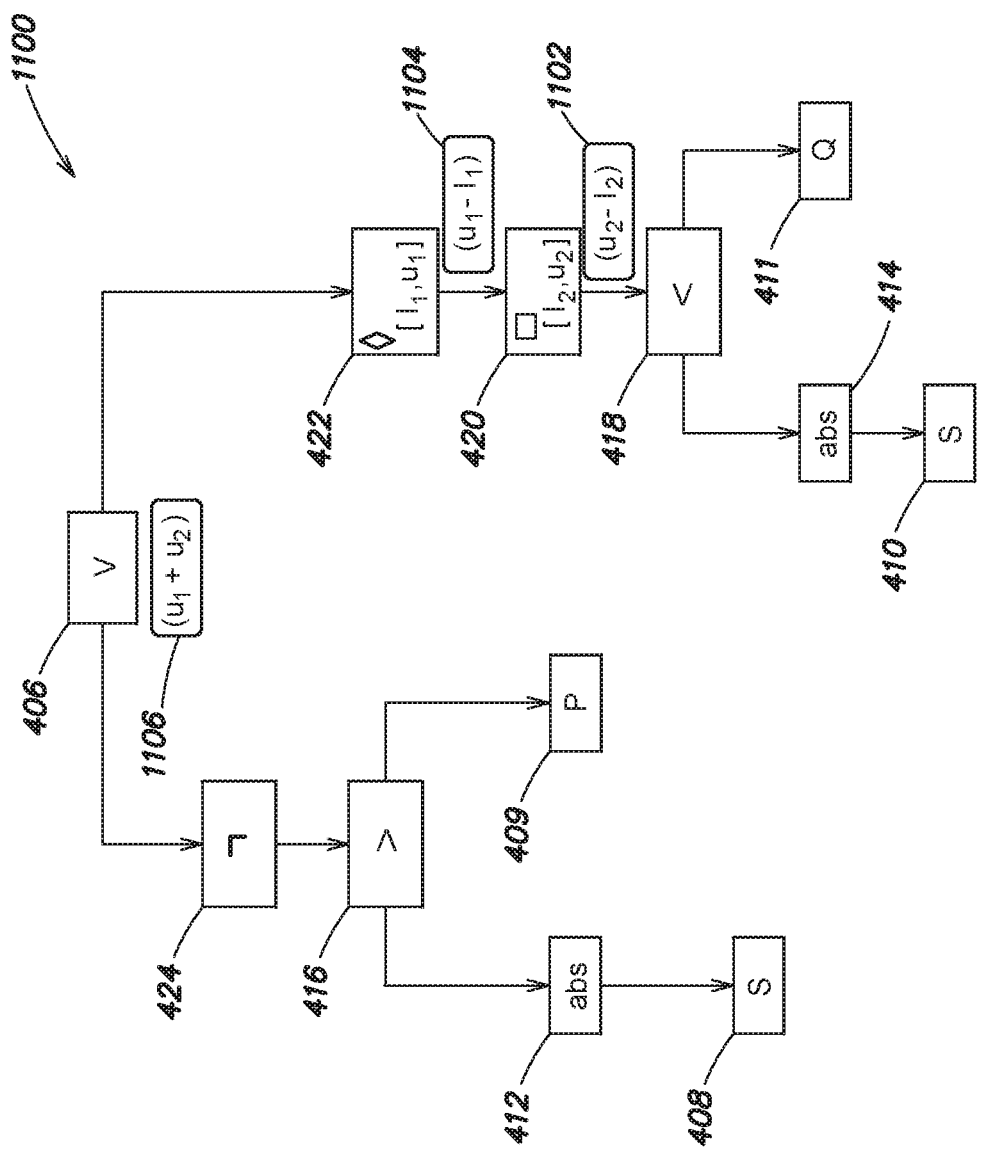
FIG. 11 is an illustration of example processing associated with an expression tree in accordance with one or more embodiments.

FIG. 11 is a schematic illustration of an example expression tree 1100 in accordance with one or more embodiments. The expression tree 1100 is similar to the expression tree 400 of FIG. 4. Leaf nodes 408 and 410 are associated with the input signal S and leaf nodes 409 and 411 are associated with the constants P and Q. The values of the input signal S and the values for the constants P and Q for time t can be determined at time t, so no data needs to be buffered for these nodes and the delay is zero. Non-leaf nodes 412 and 414 are associated with an absolute operator, which computes its result for time t at time t. Therefore, no buffers are needed for non-leaf nodes 412 and 414 and the delay is zero. Non-leaf nodes 416 and 418 are associated with relational operators, greater than and less than, respectively, which compute their results for time t at time t. Therefore, no buffers are needed for non-leaf nodes 416 and 418 and the delay is zero. Non-leaf node 424 is associated with a negation operation, which computes its result for time t at time t. Therefore, no buffer is needed for non-leaf node 424 and the delay is zero.

Non-leaf node 420 is associated with the globally operator. To compute a result for time t, a window of values, e.g., results computed at non-leaf node 418, need to be evaluated. Therefore, the buffer size determination engine 224 may determine that a buffer is needed for the non-leaf node 420. The buffer size determination engine 224 may determine the size of the buffer needed at the non-leaf node 420, which may be a function of the time interval of the globally operator. In some embodiments, the buffer size determination engine 224 may determine the size of the buffer based on the difference between the upper bound and the lower bound of the time interval for the globally operator, e.g., $(u_2-l_2)$, as indicated at 1102.

Non-leaf node 422 is associated with the eventually operator. To compute a result for time t, a window of values, e.g., results computed at non-leaf node 420, need to be evaluated. Therefore, the buffer size determination engine 224 may determine that a buffer is also needed for the non-leaf node 422. The buffer size determination engine 224 may determine the size of the buffer needed at the non-leaf node 422, which may be a function of the time interval of the eventually operator. In some embodiments, the buffer size determination engine 224 may determine the size of the buffer based on the difference between the upper bound and the lower bound of the time interval for the eventually operator, e.g., $(u_1-l_1)$, as indicated at 1104.

Root node 406 is associated with the logical AND operator. To compute a result for time t, the AND operator needs the values for its two operands at time t. The sum of the delays for the left operand is zero. The sum of the delays for the right operand is $u_1+u_2$. The buffer size determination engine 224 may compute the buffer for the root node 406 by taking the absolute difference of the left and right operand delays, e.g.:

$abs(0-(u_1+u_2))$, which equals $(u_1+u_2)$ as indicated at 1106.

The buffer size determination engine 224 may determine the number of data samples per time unit of the time series data 204. For example, suppose the time series data 204 is produced during execution of the simulation model 208 by a simulation environment. Suppose further that the simulation environment generates κ samples per second. For example, the simulation environment may use a fixed step solver in the execution of the simulation model 208 and the fixed step solver may produce κ data samples per second. In other cases, the simulation environment may use a variable step solver. Here, the engine 220 may assume a worst case scenario in which the variable step solver takes the minimum step size. For example, a minimum step size may be specified for and/or determined by a variable step solver.

Sample rate may be a parameter of a simulation model and the buffer size determination engine 224 may access, e.g., read, this parameter. In other embodiments, the buffer size determination engine 224 may receive, e.g., from a user, the sample rate of the time-series data 204 or the frame rate or refresh rate of streaming data, among other examples.

The buffer size determination engine 224 may determine the local buffer sizes associated with the nodes of the expression tree based on the determined time intervals, the size of memory allocated for the data type, and the number of data type samples as follows:

buffer size for Node $x=(1+κ*(\text{time interval or delay synchronization size computed for node } x))*$
(size of data type of node $x$)

where the value 1 is for holding a current result,
κ is the data samples per unit of time, e.g., seconds, and
delay synchronization size refers to using the absolute difference of the left and right operand delays.

Regarding the size of memory required for storing data of different data types, the MATLAB programming language as an example uses 1-byte to store values having a Boolean data type, 4-bytes to store values having a single precision floating point data type format (single), and 8-bytes to store values having a double precision floating data type format (double). Other programming languages or environments may use different memory sizes to store values of various data types.

Suppose the assessment corresponding to the expression tree 1100 has the following interval definitions and sample time:

$[l_1,u_1]=[0,2]$
$[l_2,u_2]=[0,5]$
Sample time=10 samples/sec.

The buffer size determination engine 224 may compute buffer sizes for the nodes of the tree 1100 as follows:

For the root node 406, which holds a Boolean value, the buffer size determination engine 224 may compute the buffer size as follows:

(1+10 samples/s*abs(0−(2s+5s)))*1 byte=71 bytes.

For non-leaf node 424, which holds a Boolean value:

(1+10 samples/s*0)*1 byte=1 bytes.

For non-leaf node 416, which holds a Boolean value:

(1+10 samples/s*0)*1 byte=1 bytes.

For non-leaf node 412, which holds a double value:

(1+10 samples/s*0)*8 bytes=8 bytes.

For leaf node 408, which holds a double value:

(1+10 samples/s*0)*8 bytes=8 bytes.

For leaf node 409, which holds a double value:

(1+10 samples/s*0)*8 bytes=8 bytes.

For the non-leaf node 422, which holds a Boolean value:

(1+10 samples/s*(2s−0s))*1 byte=21 bytes.

For the non-leaf node 420, which holds a Boolean value:

(1+10 samples/s*(5s−0))*1 byte=51 bytes.

For the non-leaf node 418, which holds a Boolean value:

(1+10 samples/s*0)*1 byte=1 bytes.

For the non-leaf node 414, which holds a double value:

(1+10 samples/s*0)*8 bytes=8 bytes.

For leaf node 410, which holds a double value:

(1+10 samples/s*0)*8 bytes=8 bytes.

For leaf node 411, which holds a double value:

(1+10 samples/s*0)*8 bytes=8 bytes.

Having determined the local buffer sizes for the nodes of the expression tree, the engine 224 may then determine the total amount of memory required to evaluate the assessment. The total memory may be the sum of the all of the buffer sizes for the nodes of the expression tree. Here, the total buffer size is 194 bytes.

Quantitative Semantics

As described, the assessment evaluator 218 may apply a Boolean semantics during evaluation of an expression generated for an assessment. In some embodiments, the assessment evaluator 218 may apply a different semantics, such as a quantitative semantics, to one or more of the operators of an expression generated for an assessment. A quantitative assessment may compute a distance to failure of an assessment instead of computing a pass/fail value as with the Boolean semantics. Table 1 below compares the quantitative semantics to the Boolean semantic for different operators of an expression.

TABLE 1

| Operator | Boolean semantics | Quantitative semantics |
| --- | --- | --- |
| $\varphi_1 > \varphi_2$ | $\varphi_1 > \varphi_2$ | $\varphi_1 - \varphi_2$ |
| $\varphi_1 \vee \varphi_2$ | $\varphi_1 \vee \varphi_2$ | $\max(\varphi_1, \varphi_2)$ |
| $\varphi_1 \wedge \varphi_2$ | $\varphi_1 \wedge \varphi_2$ | $\min(\varphi_1, \varphi_2)$ |
| $\neg \varphi$ | $\neg \varphi$ | $-\varphi$ |
| $\square_I \varphi$ | $\bigwedge_{t \in I} \varphi(t)$ | $\min_{t \in I} \varphi(t)$ |
| $\diamond_I \varphi$ | $\bigvee_{t \in I} \varphi(t)$ | $\max_{t \in I} \varphi(t)$ |

Simulation Environment

Figure 14:
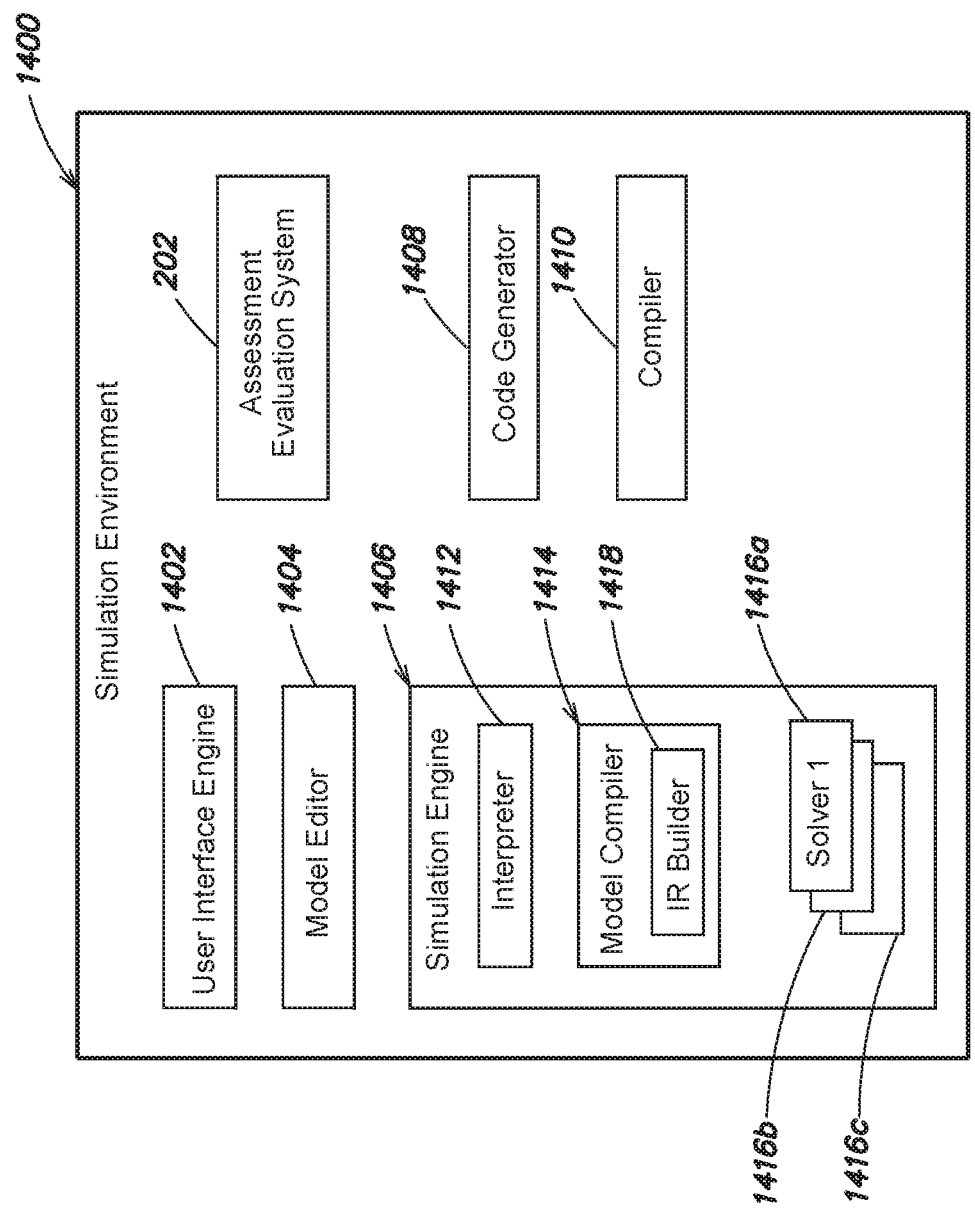
FIG. 14 is a partial functional diagram of a simulation environment in accordance with one or more embodiments.

FIG. 14 is a schematic diagram of a simulation environment 1400 in accordance with one or more embodiments. The simulation environment 1400 may include a User Interface (UI) engine 1402, a model editor 1404, a simulation engine 1406, the assessment evaluation system 202, a code generator 1408, and a compiler 1410. The UI engine 1402 may create and present one or more User Interfaces (UIs), such as Graphical User Interfaces (GUIs) and/or Command Line Interfaces (CLIs), on a display of a workstation or other data processing device. The UIs may be operated by a user to initiate various model-related tasks, such as opening, constructing, and saving simulation models. The model editor 1404 may perform selected operations, such as open, construct, edit, and save, in response to user inputs.

The simulation engine 1406 may include an interpreter 1412, a model compiler 1414, and one or more solvers, such as solvers 1416*a-c*. The model compiler 1414 may include one or more Intermediate Representation (IR) builders, such as IR builder 1418. The simulation engine 1406 may execute, e.g., compile and run or interpret, computer-generated simulation models, created or opened by the user, using one or more of the solvers 1416*a-c*. Exemplary solvers include one or more fixed-step continuous solvers, which may utilize integration techniques based on Euler's Method or Heun's Method, and one or more variable-step solvers, which may be based on the Runge-Kutta and Dormand-Prince pair. The code generator 1408 may generate code for a simulation model or portion thereof automatically, such as source or object code. The generated code may be in form suitable for execution outside of the simulation environment 1400, and may be referred to as standalone code. The compiler 1410 may compile the generated source code for execution by a target computer platform.

In some embodiments, the code generator 1408 may generate code for one or more assessments, e.g., to implement a real-time monitor.

In some embodiments, the assessment evaluation system 202 and/or one or more of the parts thereof may be implemented through one or more software modules or libraries containing program instructions pertaining to the methods described herein. The software modules may be stored in a memory, such as a main memory, a persistent memory and/or a computer readable media, of a workstation, server, or other data processing machine or device, and executed by one or more processors. Other computer readable media may also be used to store and execute these program instructions, such as non-transitory computer readable media, including optical, magnetic, or magneto-optical media. In another embodiment, the assessment evaluation system 202 and/or one or more of the parts thereof may comprise hardware registers and combinational logic configured and arranged to produce sequential logic circuits for implementing the methods described herein. In alternative embodiments, various combinations of software and hardware, including firmware, may be utilized to implement the described methods.

In some embodiments, the assessment evaluation system 202 and/or one or more parts thereof may be separate from the simulation environment 1400. In such cases, the assessment evaluation system 202 may communicate with the simulation environment 1400, e.g., through local procedure calls (LPCs), remote procedure calls (RPCs), an Application Programming Interface (API), or another communication or interface technology.

The simulation environment 1400 may be a high-level modeling application program. Suitable high-level modeling application programs include the MATLAB® language/programming environment and the Simulink® model-based design simulation environment from The MathWorks, Inc. of Natick, Mass., as well as the Simscape physical modeling system, the SimEvents® discrete event simulation tool, and the Stateflow® state chart tool also from The MathWorks, Inc., the MapleSim physical modeling and simulation tool from Waterloo Maple Inc. of Waterloo, Ontario, Canada, the LabVIEW virtual instrument programming system and the NI MatrixX model-based design product from National Instruments Corp. of Austin, Tex., the Visual Engineering Environment (VEE) from Keysight Technologies, Inc. of Santa Rosa, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, and the System Generator system from Xilinx, Inc. of San Jose, Calif. Models created in the high-level modeling environment 1400 may contain less implementation detail, and thus operate at a higher level than certain programming languages, such as the C, C++, C #, and SystemC programming languages.

Those skilled in the art will understand that the MATLAB language/programming environment is a math-oriented, textual programming environment for digital signal processing (DSP) design, among other uses. The Simulink model-based design simulation environment is a block-diagram based design environment for modeling and simulating dynamic systems, among other uses. The MATLAB and Simulink environments provide a number of high-level features that facilitate algorithm development and exploration, and support model-based design, including late binding or dynamic typing, array-based operations, data type inferencing, sample time inferencing, and execution order inferencing, among others.

In some embodiments, a lower level programming language, such as the C, C++, C #, and SystemC, programming languages, among others, may be used to create one or more models.

Models constructed in the simulation environment 1400 may include textual models, graphical models, and combinations of graphical and textual models. A model, when executed, may simulate, e.g., approximate the operation of, a system. Exemplary systems include weather systems, financial systems, plants, communication systems, and controllers, such as factory automation systems, control units used in vehicles, such as engine control units (ECUs), power window controllers, and anti-lock braking systems (ABS), among others, flight controllers, such as control units used in manned aircraft, drones, and rockets, control units used in power plants, etc. Execution of a simulation model by the simulation environment 1400 may also be referred to as simulating or running the model.

The simulation environment 1400 may implement a graphical programming language having a syntax and semantics, and models may be constructed according to the syntax and semantics defined by the simulation environment 1400. In particular, at least some model elements may represent dynamic systems whose outputs are signals where a signal is a time varying quantity having a value at all points in time during execution of a model, for example at each simulation or time step of model execution. A signal may have a number of attributes, such as signal name, data type, numeric type, and dimensionality.

The generation of execution instructions and the execution of a simulation model may involve several phases, such as an initialization phase, a simulation (or run) phase, zero, one, or more reset phases, and a termination phase. Model execution may involve receiving and processing input data and generating output data. During the run phase, the simulation engine 1406 may enter a simulation loop or iteration loop stage during which the simulation engine 1406 successively obtains inputs and computes the states and outputs of the model elements at particular simulation time steps from the simulation start time to the simulation end time. At each step, new values for the model elements' inputs, states, and outputs may be computed, and the model elements may be updated to reflect the computed values. The length of time between steps is called the step size. The step sizes depend on the type of solver selected to execute the model, the model's fundamental sample time, and whether the model's continuous states have discontinuities, such as zero crossings. The steps of the simulation or iteration loop may be repeated until the simulation end time is reached. At the end of the simulation time, the model reflects the final values of the model element's inputs, states, and outputs. In some embodiments, a model may be executed without a preset simulation end time.

Exemplary Flow Diagrams

The following flow diagrams are for illustrative purposes only. In some embodiments, one or more of the illustrated steps may be omitted, additional steps may be added, the order of the illustrated steps may be changed, one or more illustrated steps may be subdivided into multiple steps, multiple illustrated steps may be combined into a single step, and/or one or more of the flow diagrams may be separated into multiple, distinct flow diagrams.

Figure 17A:
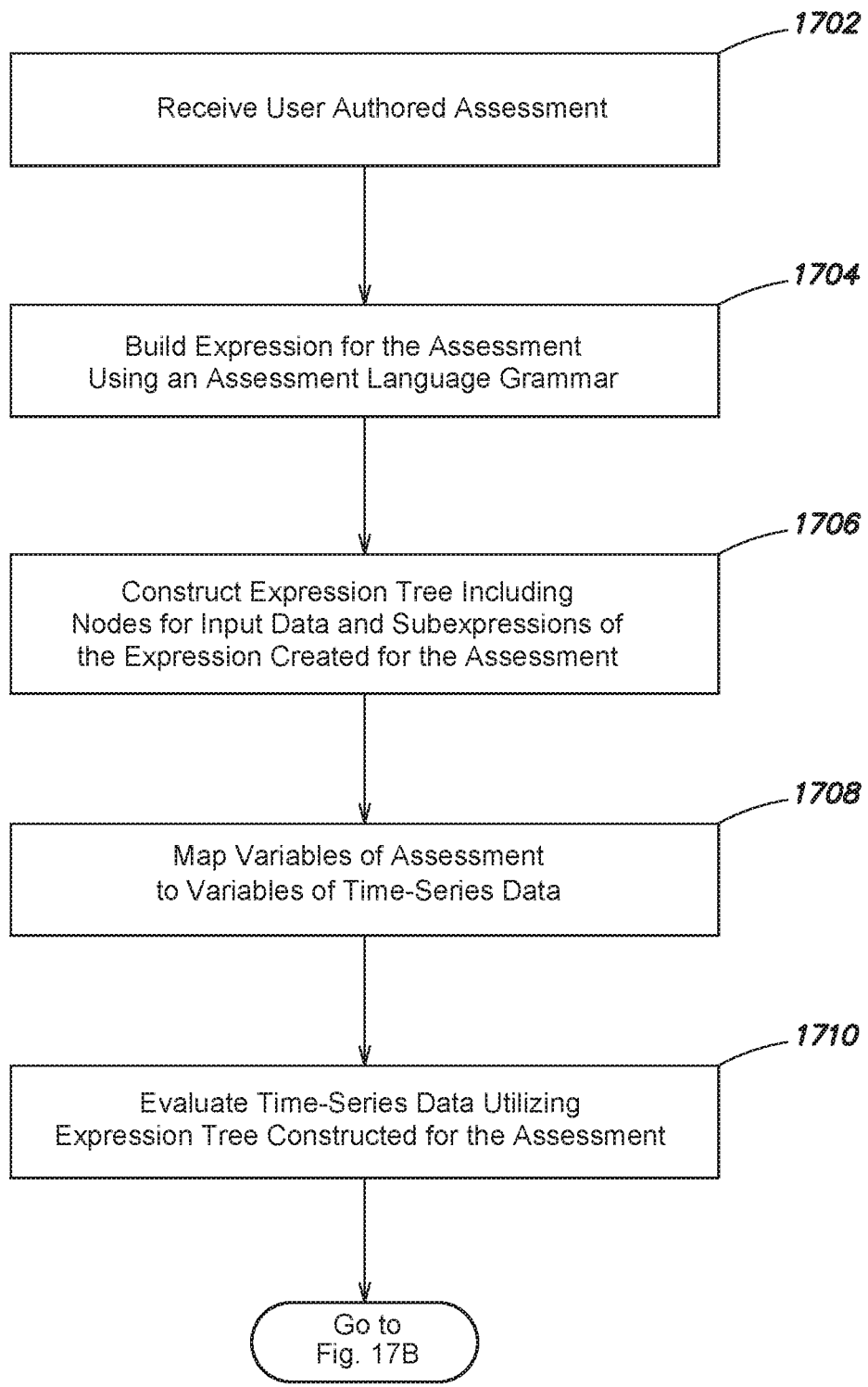
FIGS. 17A-B are partial views of a flow diagram of an example method in accordance with one or more embodiments.
Figure 17B:
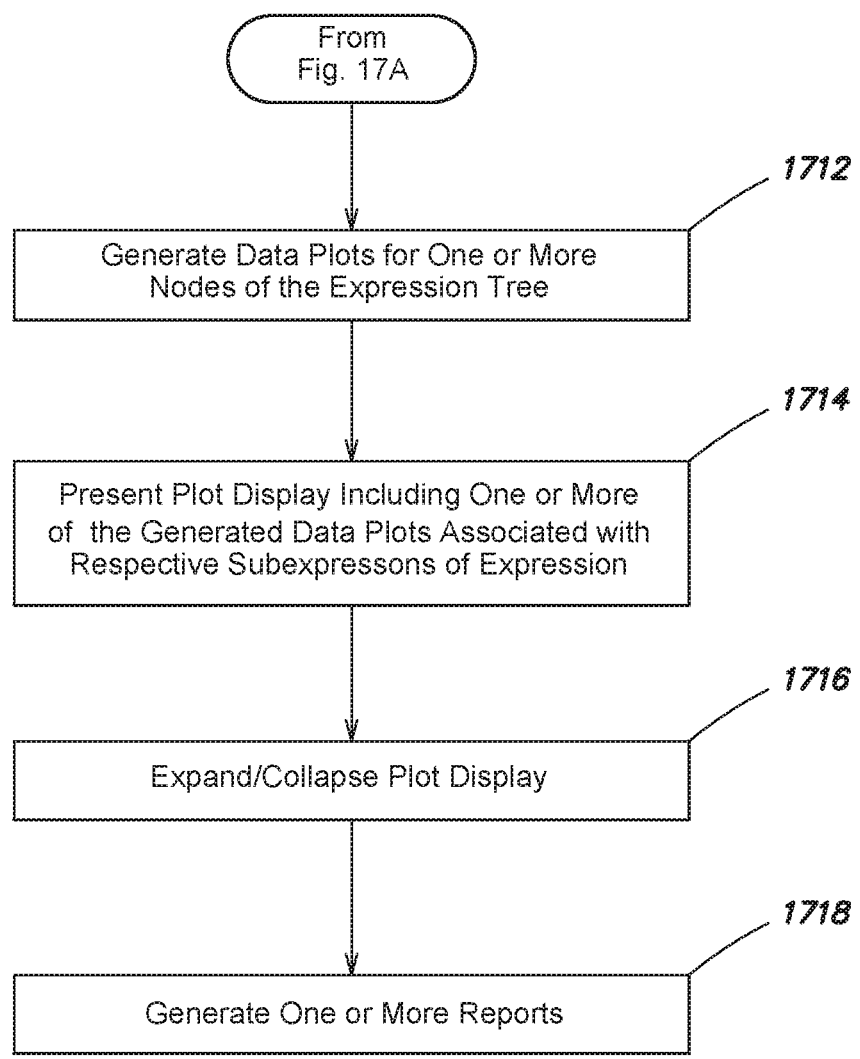

FIGS. 17A-B are partial views of a flow diagram of an example method for building an expression tree and evaluating an assessment in accordance with one or more embodiments. The assessment evaluation system 202 may receive an assessment, as indicated at step 1702, such as a user authored assessment. In some embodiments, the user may operate the assessment editor 214 to author an assessment or to revise a saved assessment. The expression builder 218 may construct an expression for the assessment, as indicated at step 1704. The expression builder 218 may utilize an assessment language grammar to build the expression. The expression builder 218 may create an expression tree from the expression, as indicated at step 1706. The expression tree may include nodes representing input data and subexpressions of the assessment. The expression builder 218 may map one or more variables defined within the assessment to one or more variables of time series data to be evaluated, as indicated at step 1708. The assessment evaluator 218 may utilize the expression tree to evaluate time series data, as indicated at step 1710.

The plotting tool 220 may generate one or more data plots based on the data associated with respective nodes of the expression tree as indicated at step 1712 (FIG. 17B). The plotting tool 220 may generate a plot display that includes the one or more data plots as indicated at step 1714. The plotting tool 220 may expand and/or collapse the plot display, e.g., presenting additional and/or fewer plots, for example in response to user input, as indicated at step 1716. The report generator 222 may generate one or more reports for presentation that indicate whether a respective assessment passed or failed and a time and explanation if the assessment failed as indicated at step 1718. Processing may then be complete.

Figure 18A:
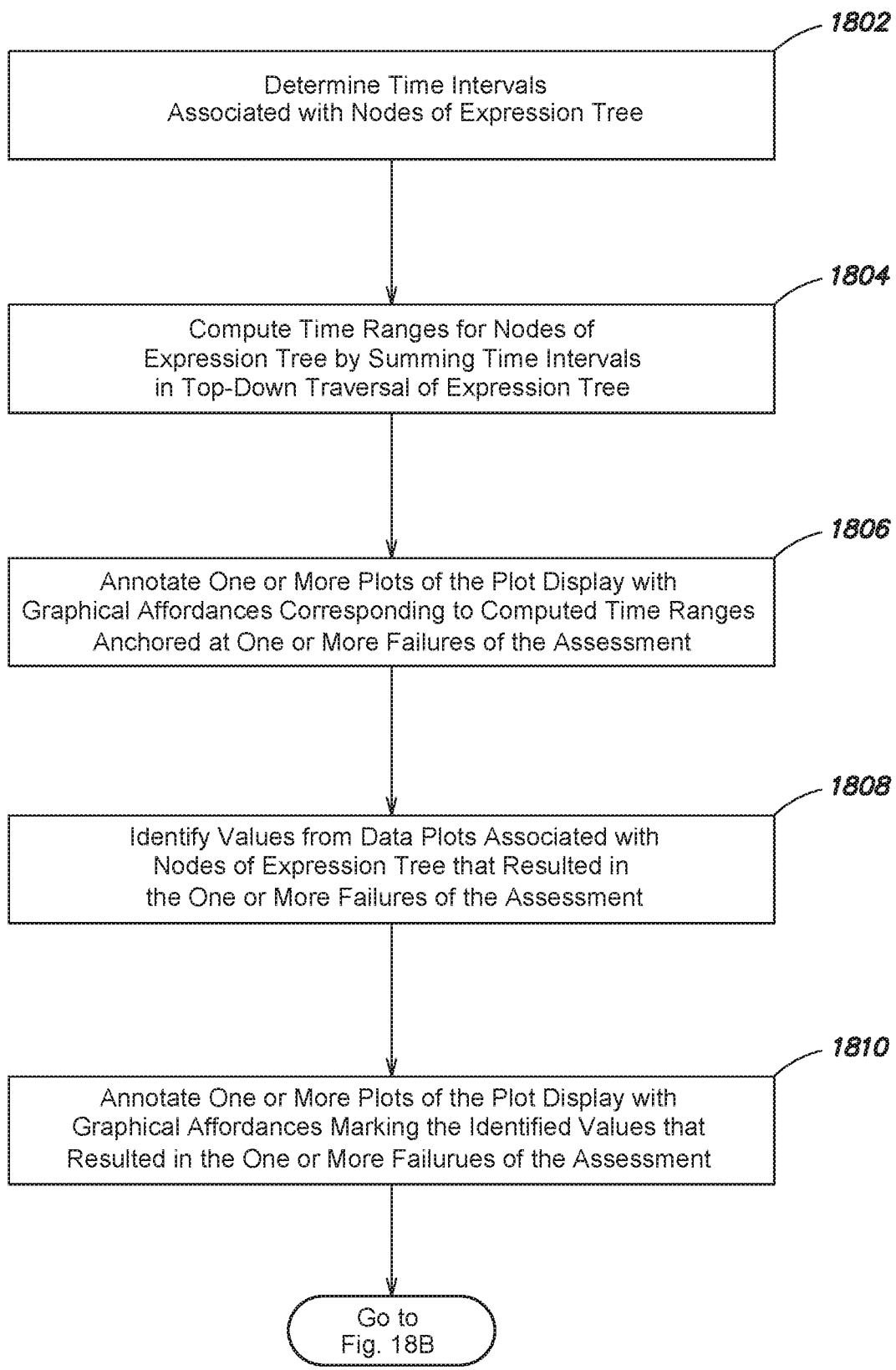
FIGS. 18A-B are partial views of a flow diagram of an example method in accordance with one or more embodiments.
Figure 18B:
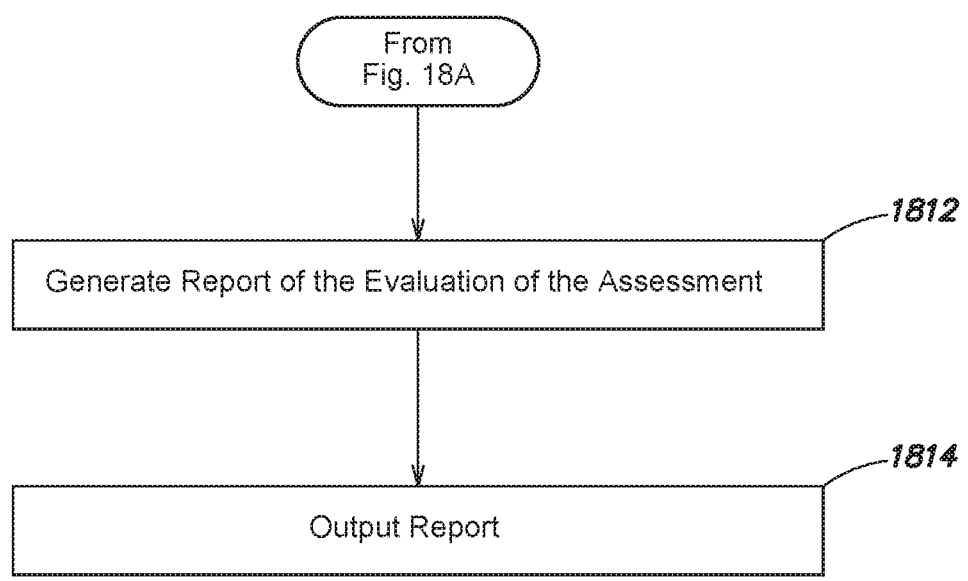

FIGS. 18A-B are partial views of a flow diagram of an example method for determining and presenting cones of influence associated with a failure of an assessment in accordance with one or more embodiments. The assessment evaluator 218 may determine local time intervals associated with the nodes of an expression tree as indicated at step 1802. The assessment evaluator 218 may determine cumulative time ranges associated with the nodes of the expression tree as a function of the local time intervals as indicated at step 1804. The plotting tool 220 may annotate one or more data plots utilizing graphical affordances to identify time regions, e.g., the cones of influence, which may be anchored at one or more failures of an assessment as indicated at step 1806. The assessment evaluator 218 may identify one or more of the values of input data and/or intermediate results that may have resulted in an assessment failing, for example in response to user input, as indicated at step 1808. The plotting tool 220 may use graphical affordances to indicate the occurrence of these values in one or more plot displays as indicated at step 1810. The report generator 222 may generate a report, which may include the values of the input data and/or intermediate results that caused the assessment to fail, as indicated at step 1812 (FIG. 18B), and the report generator 222 may output the report, e.g., on a display, as indicated at step 1814.

Figure 19A:
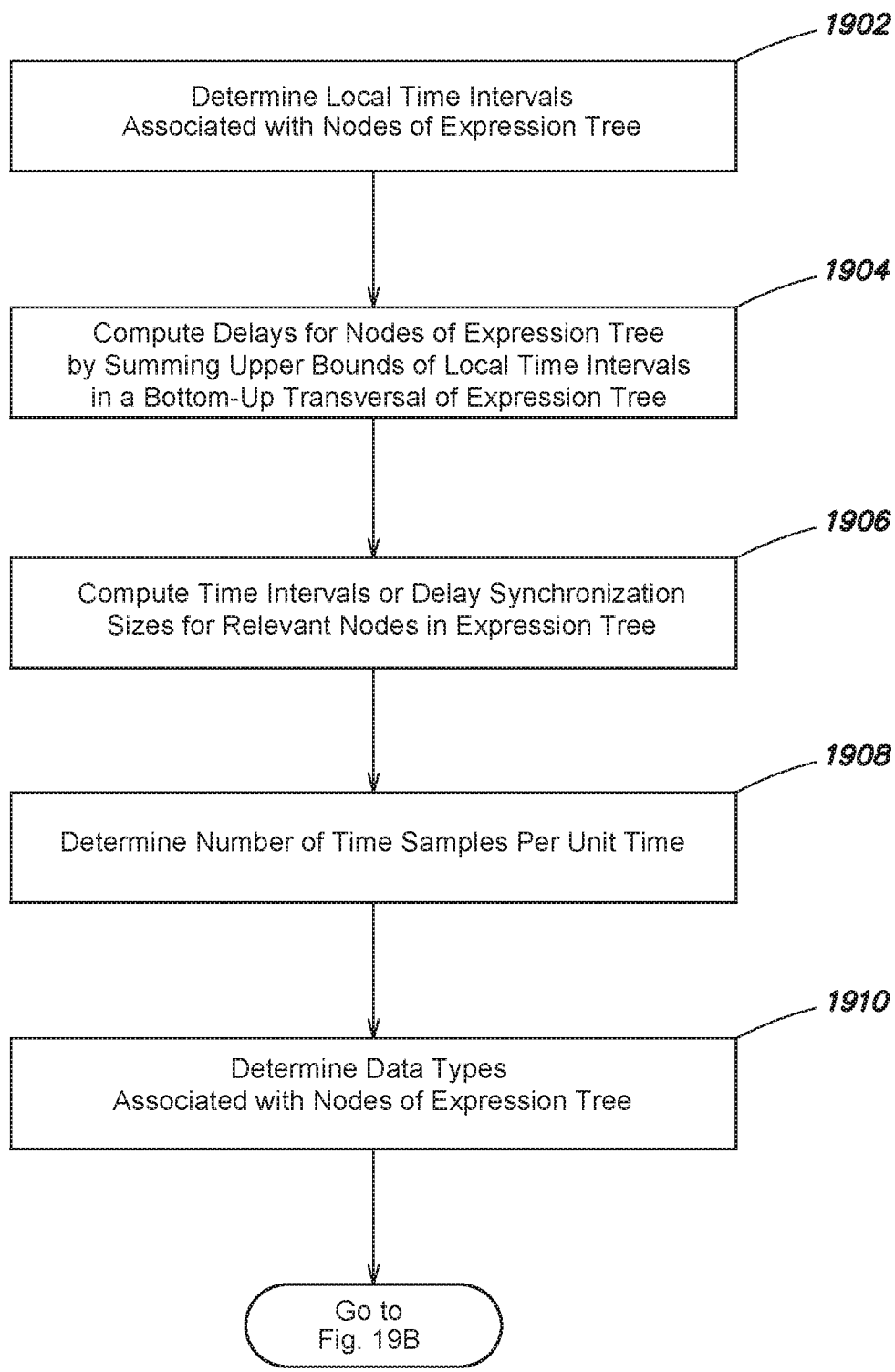
FIGS. 19A-B are partials views of a flow diagram of an example method in accordance with one or more embodiments.
Figure 19B:
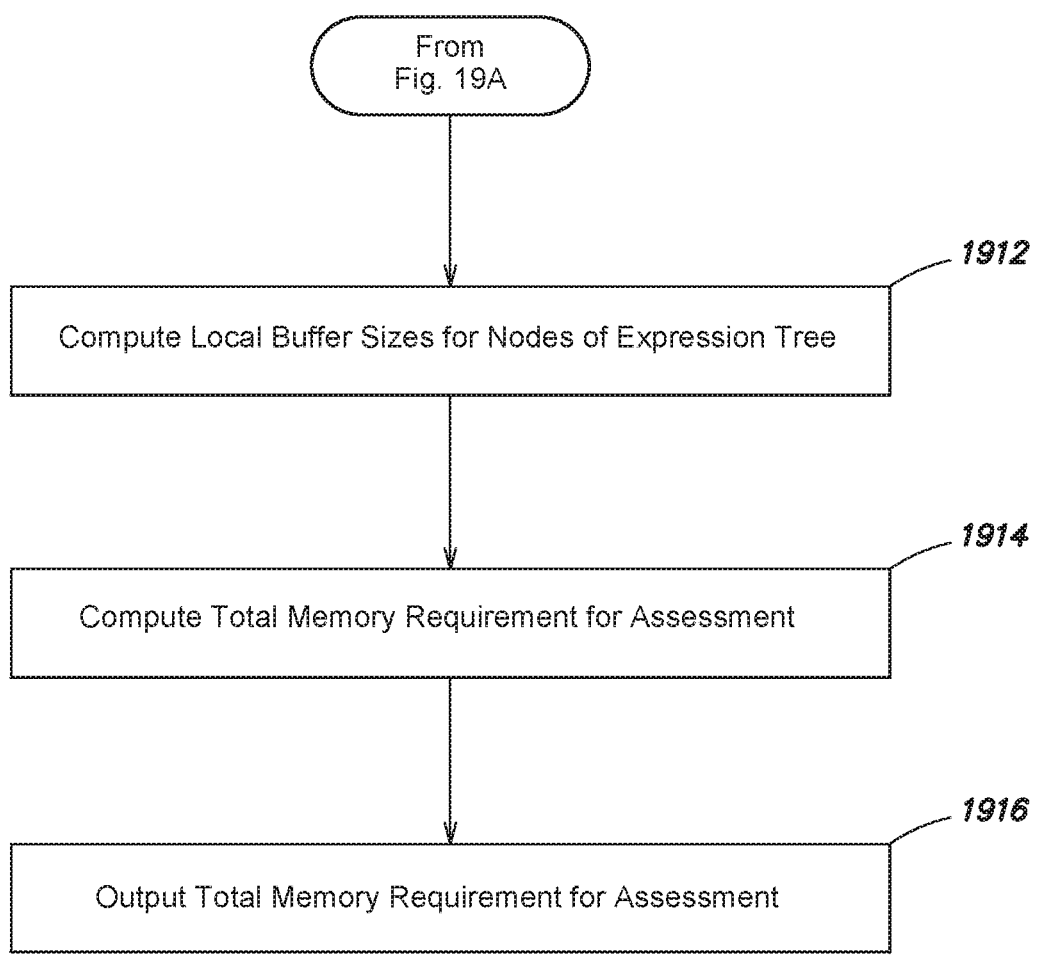

FIGS. 19A-B are partial views of a flow diagram of an example method for determining buffer sizes in accordance with one or more embodiments. The buffer size determination engine 224 may determine local time intervals associated with the nodes of an expression tree as indicated at step 1902. The buffer size determination engine 224 also may compute delays for nodes of the expression tree by summing upper bounds of local time intervals, e.g., in a bottom up traversal, as indicated at step 1904. In some cases, the buffer size determination engine 224 also may compute time intervals or delay synchronization sizes for nodes of the expression tree, as indicated at step 1906. The buffer size determination engine 224 may determine the number of data samples per time unit of the time series data as indicated at step 1908. The buffer size determination engine 224 also may determine the data types associated with the nodes of the expression tree as indicated at step 1910. The buffer size determination engine 224 may determine local buffer sizes associated with nodes of the expression tree, e.g., as a function of the determined delays, time intervals, delay synchronization sizes, the size of memory allocated for the data type, and the number of data type samples, as indicated at step 1912 (FIG. 19B). The engine 224 also may determine a total amount of memory required to evaluate an assessment, for example by summing the buffer sizes for the nodes of the expression tree, as indicated at step 1914. In some embodiments, the buffer size determination engine 224 may output the buffer sizes and/or memory requirement, as indicated at step 1916. Processing may then be complete.

Exemplary Data Processing Device

Figure 15:
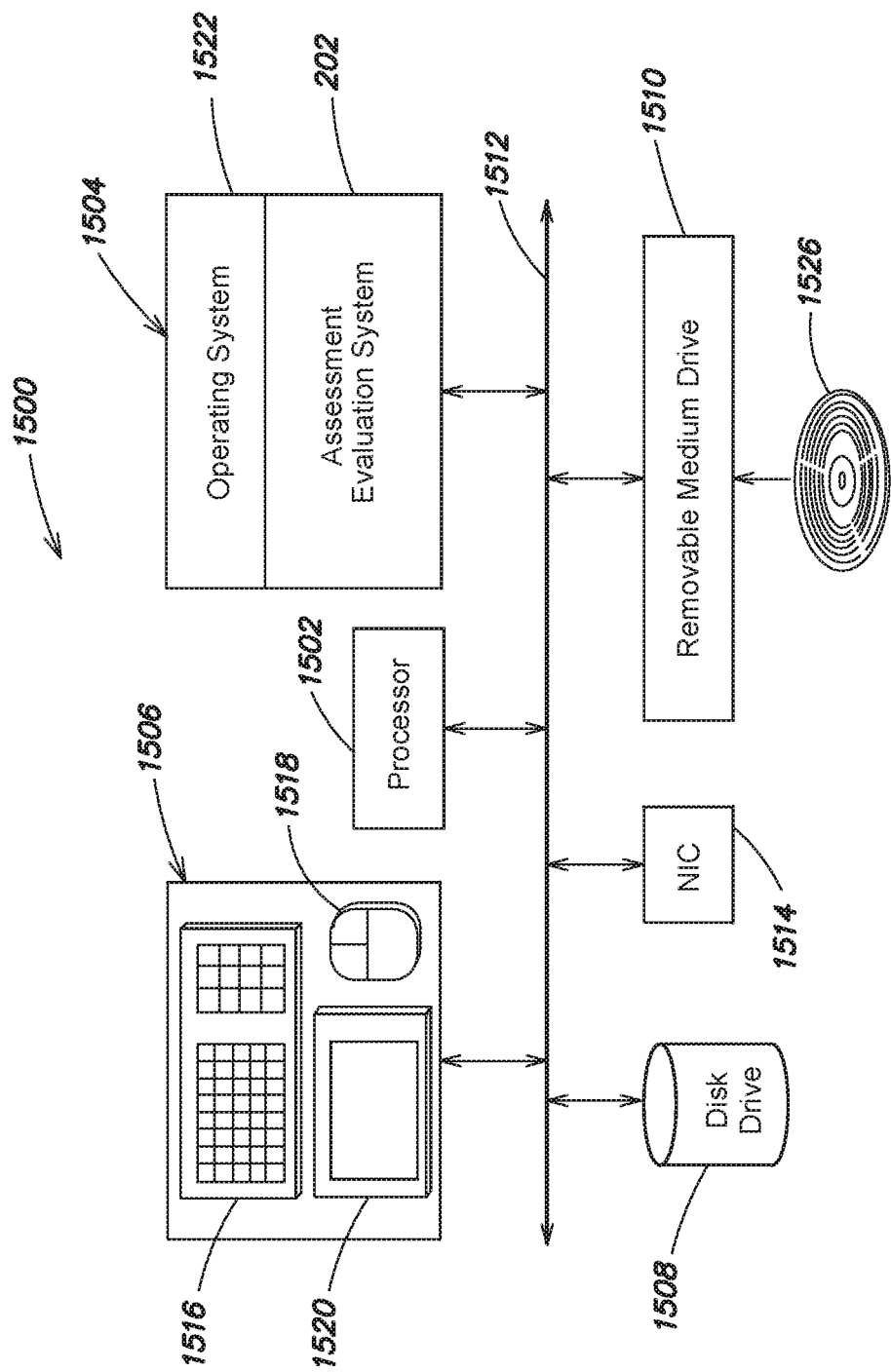
FIG. 15 is a schematic illustration of a computer or data processing system configured to implement one or more embodiments of the present disclosure.

FIG. 15 is a schematic illustration of a computer or data processing system 1500 for implementing one or more embodiments of the present disclosure. The computer system 1500 may include one or more processing elements, such as a processor 1502, a main memory 1504, user input/output (I/O) 1506, a persistent data storage unit, such as a disk drive 1508, and a removable medium drive 1510 that are interconnected by a system bus 1512. The computer system 1500 may also include a communication unit, such as a network interface card (NIC) 1514. The user I/O 1506 may include a keyboard 1516, a pointing device, such as a mouse 1518, and a display 1520. Other user I/O 1506 components include voice or speech command systems, touchpads and touchscreens, printers, speakers, projectors, haptic systems, etc. Exemplary processors include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 1504, which may be a Random Access Memory (RAM), among other memory devices, may store a plurality of program libraries or modules, such as an operating system 1522, and one or more application programs that interface to the operating system 1522, such as the assessment evaluation system 202 and/or the simulation environment 1400.

The removable medium drive 1510 may accept and read a computer readable medium 1526, such as a CD, DVD, floppy disk, solid state drive, tape, flash memory or other non-transitory medium. The removable medium drive 1510 may also write to the computer readable medium 1526.

Suitable computer systems include personal computers (PCs), workstations, servers, laptops, tablets, palm computers, smart phones, electronic readers, and other portable computing devices, cloud-computing systems, etc. Nonetheless, those skilled in the art will understand that the computer system 1500 of FIG. 15 is intended for illustrative purposes only, and that the present disclosure may be used with other computer, data processing, or computational systems or devices. The present disclosure may also be used in a computer network, e.g., client-server, architecture, or a public and/or private cloud computing arrangement. For example, the modeling environment 1400 may be hosted on one or more cloud servers or devices, and accessed by remote clients through a web portal or an application hosting system, such as the Remote Desktop Connection tool from Microsoft Corp.

Suitable operating systems 1522 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 1522 may provide services or functions for applications or modules, such as allocating memory, organizing data objects or files according to a file system, prioritizing requests, managing I/O, etc. The operating system 1522 may run on a virtual machine, which may be provided by the data processing system 1500.

As indicated above, a user may utilize one or more input devices, such as the keyboard 1516, the mouse 1518, and the display 1520 to operate the assessment evaluation system 202, e.g., authoring and evaluating assessments. The user may also operate the simulation environment 1400, e.g., to construct, revise, and/or debug one or more simulation models. As discussed, the models may be computational and may have executable semantics. In particular, the models may provide one or more of time-based, event-based, state-based, message-based, frequency-based, control-flow based, dataflow-based, and physics-based execution semantics. The execution of a model may simulate operation of the system that is being designed or evaluated. The term graphical model is intended to include graphical program.

Exemplary Distributed Environment

Figure 16:
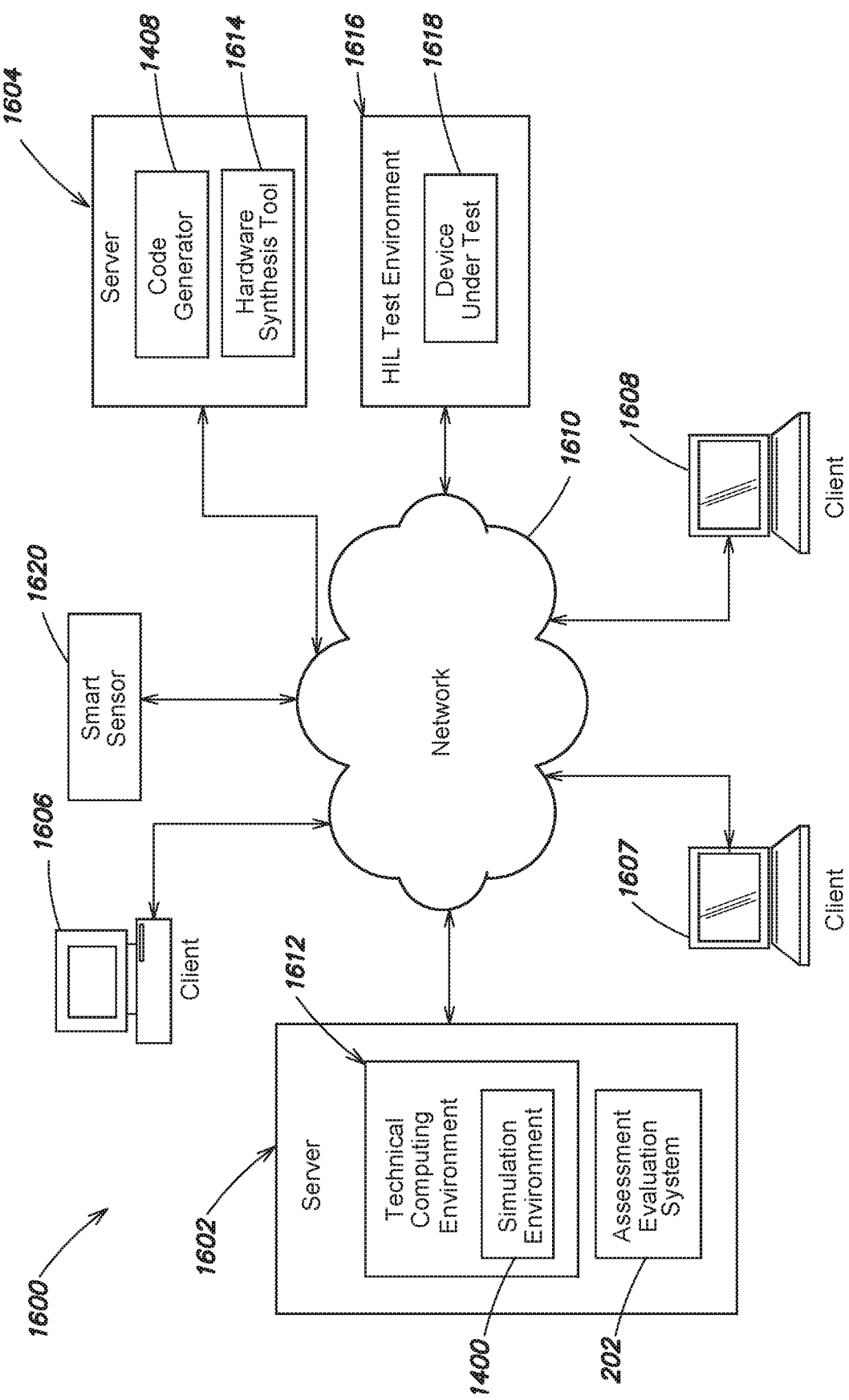
FIG. 16 is a schematic diagram of a distributed computing environment configured to implement one or more embodiments.

FIG. 16 is a schematic diagram of a distributed computing environment 1600 in which one or more embodiments of the systems and methods described herein may be implemented. The environment 1600 may include client and server devices, such as two servers 1602 and 1604, and three clients 1606-1608, interconnected by one or more networks, such as network 1610. The servers 1602 and 1604 may include applications or processes accessible by the clients 1606-1608. For example, the server 1602 may host a technical computing environment (TCE) 1612, such as the MATLAB programming language, in which the simulation environment 1400 may run. The server 1602 may also host the assessment evaluation system 202. The server 1604 may run the code generator 1408 and a hardware synthesis tool 1614. The devices of the environment 1600 may interconnect via wired connections, wireless connections, or a combination of wired and wireless connections.

The distributed environment 1600 may include a Hardware-in-the-Loop (HIL) test environment 1616, which may include a device under test (DUT) 1618. The hardware synthesis tool 1614 may utilize code generated by the code generator 1408 to configure the device under test 1618.

The distributed environment 1600 also may include one or more Internet of Things (IoT) devices, such as a smart sensor 1620. The smart sensor may stream data that may be processed by the assessment evaluation system 202.

The servers 1602 and 1604 may include one or more devices capable of receiving, generating, storing, processing, executing, and/or providing information. For example, the servers 1602 and 1604 may include a computing device, such as a server, a desktop computer, a laptop computer, a tablet computer, a handheld computer, or a similar device.

The clients 1606-1608 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 1606-1608 may download data and/or code from the servers 1602 and 1604 via the network 1610. In some implementations, the clients 1606-1608 may be desktop computers, workstations, laptop computers, tablet computers, handheld computers, mobile phones (e.g., smart phones, radiotelephones, etc.), electronic readers, or similar devices. In some implementations, the clients 1606-1608 may receive information from and/or transmit information to the servers 1602 and 1604.

The network 1610 may include one or more wired and/or wireless networks. For example, the network 1610 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The number of devices and/or networks shown in FIG. 16 is provided as an example. In practice, there may be additional devices and/or networks, fewer devices and/or networks, different devices and/or networks, or differently arranged devices and/or networks than those shown in FIG. 16. Furthermore, two or more devices shown in FIG. 16 may be implemented within a single device, or a single device shown in FIG. 16 may be implemented as multiple, distributed devices. Additionally, one or more of the devices of the distributed computing environment 1600 may perform one or more functions described as being performed by another one or more devices of the environment 1600.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 1500. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. Therefore, it is the object of the appended claims to cover all such variations and modifications as come within the true spirit and scope of the disclosure.

In view of the above, this application discloses the following items:

Item 1. A computer-implemented method comprising:

for an assessment that includes one or more input data elements, associating the one or more input data elements with one or more elements of time series data;

generating, by one or more processors, an expression for the assessment, the expression including operators that process the one or more input data elements of the time series data and compute an overall result of the assessment;

evaluating the expression for the assessment on the time series data, the evaluating including computing (i) intermediate results associated with the one or more of the operators and (ii) the overall result of the assessment, wherein the evaluating includes forward processing the time-series data;

generating at least one plot of at least one of the one or more input data elements, the intermediate results, or the overall result as a function of time of the time series data; and presenting the at least one plot on a display coupled to the one or more processors.

Item 2. The computer-implemented method of item 1 further comprising:

for a given time of the assessment, determining a cone of influence that defines a time bound encompassing the one or more input data elements of the time series data and the intermediate results capable of contributing to the given time of the assessment; and presenting a graphical affordance at the at least one plot wherein the graphical affordance indicates the cone of influence determined for the one or more input data elements of the time series data and the intermediate results capable of contributing to the given time of the assessment.

Item 3. The computer-implemented method of item 2 wherein the given time is a failure of the assessment or a passing of the assessment.

Item 4. The computer-implemented method of one or more of the previous items wherein the generating the at least one plot includes generating plots for the one or more input data elements and the intermediate results and the assessment has parts arranged in a structure, the method further comprising:

arranging the plots to match the structure of the assessment to provide traceability between the at least one plot and the parts of the assessment.

Item 5. The computer-implemented method of one or more of the previous items wherein the parts of the assessment are natural language elements that define the assessment.

Item 6. The computer-implemented method of one or more of the previous items further comprising:

identifying a failure of the assessment;

determining a cause of the failure of the assessment; and presenting a report with information describing the cause of the failure of the assessment.

Item 7. The computer-implemented method of one or more of the previous items further comprising:

detecting a failure of the assessment;

identifying a first value of the one or more input data elements that led to the failure of the assessment; and adding a graphical affordance to the at least one plot designating the first value of the one or more input data elements that led to the failure of the assessment.

Item 8. The computer-implemented method of one or more of the previous items further comprising:

identifying a second value of a given intermediate result that led to the failure of the assessment;

adding a second graphical affordance to the at least one plot designating the second value of the given intermediate result that led to the failure of the assessment.

Item 9. The computer-implemented method of one or more of the previous items wherein the expression is generated for the assessment according to an assessment language grammar.

Item 10. The computer-implemented method of one or more of the previous items wherein the time series data is streamed data from one or more devices.

Item 11. The computer-implemented method of one or more of the previous items further comprising determining fixed buffer sizes for (i) the one or more input data elements as mapped to the one or more elements of the time series data and (ii) the intermediate results.

Item 12. The computer-implemented method of one or more of the previous items further comprising:

when a failure of the assessment is identified, performing the following steps:

adding one or more graphical affordances to the at least one plot to indicate which values from the time series data and/or the intermediate results are capable of contributing to the assessment failing;

computing a time range for the time series data and the intermediate results of the assessment, wherein the time range includes all values of the time series data and the intermediate results that are capable of contributing to the failure of the assessment.

Item 13. The computer-implemented method of one or more of the previous items further comprising:
executing the assessment in a simulation model according to the time range.

Item 14. The computer-implemented method of one or more of the previous items wherein the operators included in the expression include at least one of one or more logical operators, one or more temporal operators, one or more relational operators, or one or more arithmetic operators.

Item 15. The computer-implemented method of one or more of the previous items wherein the one or more temporal operators are at least one of:
Metric Temporal Logic (MTL) operators,
Metric Interval Temporal Logic operators, or
Signal Temporal Logic operators.

Item 16. The computer-implemented method of one or more of the previous items further comprising:
arranging, by the one or more processors, the expression as a tree that includes a plurality of nodes including a root node associated with the overall result of the assessment and one or more leaf nodes associated with the one or more input data elements, wherein the evaluating includes performing a traversal of the tree.

Item 17. The computer-implemented method of one or more of the previous items wherein the tree further includes one or more non-leaf nodes associated with one or more of the operators included in the expression.

Item 18. The computer-implemented method of one or more of the previous items wherein the traversal of the tree is in a direction from the one or more leaf nodes to the root node.

Item 19. The computer-implemented method of one or more of the previous items wherein the time series data is generated during execution of a simulation model that includes model elements, the computer-implemented method further comprising:
when a failure of the assessment is identified, performing the following steps:
identifying at least one of the intermediate results that contributed to the failure; and
tracing the at least one of the intermediate results to one of the model elements.

Item 20. The computer-implemented method of one or more of the previous items further comprising:
utilizing a graphical affordance to designate the one of the model elements in the simulation model.

What is claimed is:

1. A computer-implemented method comprising:
for an assessment that includes one or more input data elements,
associating the one or more input data elements with one or more elements of time-series data, wherein the time-series data is generated during execution of a simulation model or is from a device or is from a game engine;
generating, by one or more processors, an expression for the assessment, the expression including operators that process the one or more input data elements of the time series data and compute an overall result of the assessment, wherein the overall result of the assessment is pass, fail, or untested;
evaluating the expression for the assessment on the time series data, the evaluating including computing (i) intermediate results associated with the one or more of the operators and (ii) the overall result of the assessment, wherein the evaluating includes forward processing the time-series data;
generating at least one plot of
the one or more input data elements and
the overall result as a function of time of the time-series data;
presenting the at least one plot on a display coupled to the one or more processors;
detecting a failure of the assessment;
identifying a first value of the one or more input data elements that led to the failure of the assessment; and
adding a graphical affordance to the at least one plot designating the first value of the one or more input data elements that led to the failure of the assessment.

2. The computer-implemented method of claim 1 wherein the at least one plot further includes at least one of the intermediate results, the method further comprising:
for a given time of the assessment, determining a cone of influence that defines a time bound encompassing the one or more input data elements of the time series data and the intermediate results capable of contributing to the given time of the assessment; and
presenting a graphical affordance at the at least one plot wherein the graphical affordance indicates the cone of influence determined for the one or more input data elements of the time series data and the at least one of the intermediate results capable of contributing to the given time of the assessment.

3. The computer-implemented method of claim 2 wherein the given time is a failure of the assessment or a passing of the assessment.

4. The computer-implemented method of claim 1 wherein the generating the at least one plot includes generating plots for the one or more input data elements and the intermediate results and the assessment has parts arranged in a structure, the method further comprising:
arranging the plots to match the structure of the assessment to provide traceability between the at least one plot and the parts of the assessment.

5. The computer-implemented method of claim 4 wherein the parts of the assessment are natural language elements that define the assessment.

6. The computer-implemented method of claim 1 further comprising:
identifying a failure of the assessment;
determining a cause of the failure of the assessment; and
presenting a report with information describing the cause of the failure of the assessment.

7. The computer-implemented method of claim 1 wherein the at least one plot further includes a given intermediate result of the intermediate results, the method further comprising:
identifying a first value of the given intermediate result that led to the failure of the assessment;
adding a second graphical affordance to the at least one plot designating the first value of the given intermediate result that led to the failure of the assessment.

8. The computer-implemented method of claim 1 wherein the expression is generated for the assessment according to an assessment language grammar.

9. The computer-implemented method of claim 1 wherein the time series data is streamed data from the devices.

10. The computer-implemented method of claim 1 further comprising determining fixed buffer sizes for (i) the one or more input data elements associated with the one or more elements of the time series data and (ii) the intermediate results.

11. The computer-implemented method of claim 1 wherein the at least one plot further includes the intermediate results, the method further comprising:
when a failure of the assessment is identified, performing the following steps:
adding one or more graphical affordances to the at least one plot to indicate which values from the time series data and the intermediate results are capable of contributing to the assessment failing; and
computing a time range for the time series data and the intermediate results of the assessment, wherein the time range includes all of the values of the time series data and the intermediate results that are capable of contributing to the failure of the assessment.

12. The computer-implemented method of claim 11 further comprising:
executing the assessment in a simulation model according to the time range.

13. The computer-implemented method of claim 1 wherein the operators included in the expression include at least one of
one or more logical operators,
one or more temporal operators,
one or more relational operators, or
one or more arithmetic operators.

14. The computer-implemented method of claim 13 wherein the one or more temporal operators are at least one of
Metric Temporal Logic (MTL) operators,
Metric Interval Temporal Logic (MITL) operators, or
Signal Temporal Logic operators.

15. The computer-implemented method of claim 1 further comprising:
arranging, by the one or more processors, the expression as a tree that includes a plurality of nodes including a root node associated with the overall result of the assessment, and one or more leaf nodes associated with the one or more input data elements, wherein the evaluating includes performing a traversal of the tree.

16. The computer-implemented method of claim 15 wherein the tree further includes one or more non-leaf nodes associated with one or more of the operators included in the expression.

17. The computer-implemented method of claim 15 wherein the traversal of the tree is in a direction from the one or more leaf nodes to the root node.

18. The computer-implemented method of claim 1 wherein the simulation model includes model elements, the computer-implemented method further comprising:
tracing the one or more input data elements that led to the failure of the assessment to one of the model elements of the simulation model.

19. The computer-implemented method of claim 18 further comprising:
utilizing a graphical affordance to designate the one of the model elements in the simulation model.

20. One or more non-transitory computer-readable media comprising program instructions for execution by one or more processors, the program instructions instructing the one or more processors to:
for an assessment that includes one or more input data elements,
associate the one or more input data elements with one or more elements of time-series data, wherein the time-series data is generated during execution of a simulation model or is from a device or is from a game engine;
generate an expression for the assessment, the expression including operators that process the one or more input data elements of the time series data and compute an overall result of the assessment, wherein the overall result of the assessment is pass, fail, or untested;
evaluate the expression for the assessment on the time series data, the evaluating including computing (i) intermediate results associated with the one or more of the operators and (ii) the overall result of the assessment, wherein the evaluating includes forward processing the time-series data;
generate at least one plot of
the one or more input data elements and
the overall result
as a function of time of the time-series data;
present the at least one plot on a display coupled to the one or more processors;
detect a failure of the assessment;
identify a first value of the one or more input data elements that led to the failure of the assessment; and
add a graphical affordance to the at least one plot designating the first value of the one or more input data elements that led to the failure of the assessment.

21. The one or more non-transitory computer-readable media of claim 20 wherein the at least one plot further includes the intermediate results, the media further comprising program instructions to:
for a given time of the assessment, determine a cone of influence that defines a time bound encompassing the one or more input data elements of the time series data and the intermediate results capable of contributing to the given time of the assessment; and
present a graphical affordance at the at least one plot wherein the graphical affordance indicates the cone of influence determined for the one or more input data elements of the time series data and the intermediate results capable of contributing to the given time of the assessment.

22. The one or more non-transitory computer-readable media of claim 20 wherein the generate the at least one plot includes generating plots for the one or more input data elements and the intermediate results and the assessment has parts arranged in a structure, further comprising program instructions to:
arrange the plots to match the structure of the assessment to provide traceability between the at least one plot and the parts of the assessment.

23. The one or more non-transitory computer-readable media of claim 20 further comprising program instructions to:
identify a failure of the assessment;
determine a cause of the failure of the assessment; and
present a report with information describing the cause of the failure of the assessment.

24. The one or more non-transitory computer-readable media of claim 20 wherein the at least one plot further includes a given intermediate result of the intermediate results, further comprising program instructions to:
identify a first value of the given intermediate result that led to the failure of the assessment;
add a second graphical affordance to the at least one plot designating the first value of the given intermediate result that led to the failure of the assessment.

25. The one or more non-transitory computer-readable media of claim 20 further comprising program instructions to:
   determine fixed buffer sizes for (i) the one or more input data elements associated with the one or more elements of the time series data and (ii) the intermediate results.

26. The one or more non-transitory computer-readable media of claim 20 wherein the at least one plot further includes the intermediate results, further comprising program instructions to:
   when a failure of the assessment is identified:
      add one or more graphical affordances to the at least one plot to indicate which values from the time series data and the intermediate results are capable of contributing to the assessment failing; and
      compute a time range for the time series data and the intermediate results of the assessment, wherein the time range includes all of the values of the time series data and the intermediate results that are capable of contributing to the failure of the assessment.

27. An apparatus comprising:
   a memory storing an assessment that includes one or more input data elements; and
   one or more processors coupled to the memory, the one or more processors configured to:
      associate the one or more input data elements with one or more elements of time-series data, wherein the time-series data is generated during execution of a simulation model or is from a device or is from a game engine;
      generate an expression for the assessment, the expression including operators that process the one or more input data elements of the time series data and compute an overall result of the assessment, wherein the overall result of the assessment is pass, fail, or untested;
      evaluate the expression for the assessment on the time series data, the evaluating including computing (i) intermediate results associated with the one or more of the operators and (ii) the overall result of the assessment, wherein the evaluating includes forward processing the time-series data;
      generate at least one plot of
         the one or more input data elements and
         the overall result
         as a function of time of the time-series data;
      present the at least one plot on a display coupled to the one or more processors;
      detect a failure of the assessment;
      identify a first value of the one or more input data elements that led to the failure of the assessment; and
      add a graphical affordance to the at least one plot designating the first value of the one or more input data elements that led to the failure of the assessment.

28. The apparatus of claim 27 wherein the at least one plot further includes at least one of the intermediate results, the one or more processors further configured to:
   for a given time of the assessment, determine a cone of influence that defines a time bound encompassing the one or more input data elements of the time series data and the intermediate results capable of contributing to the given time of the assessment; and
   present a graphical affordance at the at least one plot wherein the graphical affordance indicates the cone of influence determined for the one or more input data elements of the time series data and the at least one of the intermediate results capable of contributing to the given time of the assessment.

29. The apparatus of claim 27 wherein the one or more processors is further configured:
   determine fixed buffer sizes for (i) the one or more input data elements associated with the one or more elements of the time series data and (ii) the intermediate results.

30. The apparatus of claim 27 wherein the at least one plot further includes the intermediate results, and the one or more processors is further configured to:
   when a failure of the assessment is identified:
      add one or more graphical affordances to the at least one plot to indicate which values from the time series data and the intermediate results are capable of contributing to the assessment failing; and
      compute a time range for the time series data and the intermediate results of the assessment, wherein the time range includes all of the values of the time series data and the intermediate results that are capable of contributing to the failure of the assessment.

* * * * *

UNITED STATES PATENT AND TRADEMARK OFFICE
CERTIFICATE OF CORRECTION

PATENT NO. : 11,314,225 B2
APPLICATION NO. : 16/707941
DATED : April 26, 2022
INVENTOR(S) : Yit Phang Khoo et al.

Page 1 of 1

It is certified that error appears in the above-identified patent and that said Letters Patent is hereby corrected as shown below:

In the Claims

Claim 9:
Column 42, Line 65:
"the time series data is streamed data from the devices."
Should read:
--the time series data is streamed data from the device.--

Signed and Sealed this
Seventeenth Day of June, 2025

Coke Morgan Stewart
*Acting Director of the United States Patent and Trademark Office*